(12) United States Patent
Lablans

(10) Patent No.: US 12,425,189 B1
(45) Date of Patent: Sep. 23, 2025

(54) CRYPTOGRAPHIC COMPUTER MACHINES WITH NOVEL SWITCHING DEVICES

(71) Applicant: Peter Lablans, Morris Township, NJ (US)

(72) Inventor: Peter Lablans, Morris Township, NJ (US)

(*) Notice: Subject to any disclaimer, the term of this patent is extended or adjusted under 35 U.S.C. 154(b) by 355 days.

(21) Appl. No.: 18/097,396

(22) Filed: Jan. 16, 2023

Related U.S. Application Data

(63) Continuation-in-part of application No. 17/402,968, filed on Aug. 16, 2021, now Pat. No. 12,143,468, and a continuation-in-part of application No. 17/240,635, filed on Apr. 26, 2021, now Pat. No. 12,056,549, which is a continuation-in-part of application No. 16/532,489, filed on Aug. 6, 2019, now abandoned, said application No. 17/402,968 is a continuation-in-part of application No. 16/172,584, filed on Oct. 26, 2018, now Pat. No. 11,093,213, said application No. 16/532,489 is a continuation-in-part of application No. 15/499,849, filed on Apr. 27, 2017, now Pat. No. 10,375,252, said application No. 16/172,584 is a continuation-in-part of application No. 15/442,556, filed on Feb. 24, 2017, now Pat. No. 10,515,567, and a continuation-in-part of application No. 14/975,841, filed on Dec. 20, 2015, now abandoned.

(Continued)

(51) Int. Cl.
*H04L 9/06* (2006.01)
*H04L 9/08* (2006.01)

(52) U.S. Cl.
CPC .......... *H04L 9/0643* (2013.01); *H04L 9/0863* (2013.01)

(58) Field of Classification Search
CPC .......................... H04L 9/0643; H04L 9/0863
See application file for complete search history.

(56) References Cited

U.S. PATENT DOCUMENTS

| | | | | | |
|---|---|---|---|---|---|
| 3,818,452 | A | * | 6/1974 | Greer | H03K 19/17712 326/38 |
| 3,958,081 | A | * | 5/1976 | Ehrsam | H04L 9/0625 380/37 |

(Continued)

OTHER PUBLICATIONS

Zeyad Abdel-Hameed Al-Odat, Analyses, Mitigation and Applications of Secure Hash Algorithms, Doctoral Thesis, 2019, downloaded from https://library.ndsu.edu/ir/bitstream/handle/10365/32058/Analyses%2C%20Mitigation%20and%20Applications%20of%20Secure%20Hash%20Algorithms.pdf?sequence=1&isAllowed=y.

(Continued)

*Primary Examiner* — Jason Chiang

(57) ABSTRACT

Circuits defined by n-state switching tables with n>2 are transformed by at least one n-state inverter which may be a Finite Lab-transform (FLT) into a Finite Lab-transformed (FLTed) n-state switching devices. Computer operations defined by transformed or modified n-state switching tables are applied in cryptographic operations, including one or more message digests or hashing methods or computer one-way functions. A keyword is generated from a public keyword by at least one modified known hashing method. A known hashing method may be selected from the group consisting of SHA-1, SHA-2, SHA-3, MD5, MD6, Blake2, Blake3 and CubeHash. Internal states of known hashing methods are modified to generate unpredictable hash values.

19 Claims, 10 Drawing Sheets

Related U.S. Application Data

(60) Provisional application No. 63/420,995, filed on Oct. 31, 2022, provisional application No. 63/338,249, filed on May 4, 2022, provisional application No. 63/301,385, filed on Jan. 20, 2022, provisional application No. 63/162,995, filed on Mar. 18, 2021, provisional application No. 63/118,374, filed on Nov. 25, 2020, provisional application No. 63/067,281, filed on Aug. 18, 2020, provisional application No. 62/610,921, filed on Dec. 27, 2017, provisional application No. 62/455,555, filed on Feb. 6, 2017, provisional application No. 62/435,814, filed on Dec. 18, 2016, provisional application No. 62/299,935, filed on Feb. 25, 2016.

(56) References Cited

U.S. PATENT DOCUMENTS

| | | | | |
|---|---|---|---|---|
| 3,962,539 | A * | 6/1976 | Ehrsam | H04L 9/0625 380/37 |
| 4,165,444 | A * | 8/1979 | Gordon | H04L 9/0662 380/265 |
| 4,405,829 | A | 9/1983 | Rivest et al. | |
| 4,597,083 | A | 6/1986 | Stenerson | |
| 4,987,324 | A * | 1/1991 | Wong | H03K 19/09429 326/27 |
| 4,995,082 | A | 2/1991 | Schnorr | |
| 5,054,066 | A * | 10/1991 | Riek | H04L 9/304 713/170 |
| 5,995,539 | A * | 11/1999 | Miller | H04L 25/03343 375/222 |
| 6,052,704 | A * | 4/2000 | Wei | G06F 7/724 708/492 |
| 6,111,952 | A * | 8/2000 | Patarin | H04L 9/3247 380/259 |
| 6,990,624 | B2 | 1/2006 | Dohmen | |
| 7,343,472 | B2 | 3/2008 | Porten et al. | |
| 7,831,895 | B2 | 11/2010 | Lin | |
| 8,332,727 | B2 * | 12/2012 | Kim | G06F 11/1068 714/763 |
| 8,458,575 | B2 | 6/2013 | Dohmen | |
| 8,666,062 | B2 * | 3/2014 | Lambert | G06F 7/726 713/169 |
| 9,485,087 | B2 | 11/2016 | Van Assche et al. | |
| 9,652,200 | B2 | 5/2017 | Bos et al. | |
| 10,515,567 | B2 * | 12/2019 | Lablans | G06F 5/012 |
| 11,093,213 | B1 * | 8/2021 | Lablans | G06F 5/012 |
| 11,336,425 | B1 * | 5/2022 | Lablans | H04J 13/0029 |
| 12,056,549 | B1 * | 8/2024 | Lablans | H04L 9/3066 |
| 2002/0038420 | A1 * | 3/2002 | Collins | H04L 9/3249 713/156 |
| 2003/0106014 | A1 | 6/2003 | Dohmen et al. | |
| 2004/0078555 | A1 | 4/2004 | Porten et al. | |
| 2004/0202317 | A1 | 10/2004 | Demjanenko | |
| 2005/0058285 | A1 | 3/2005 | Stein | |
| 2005/0094806 | A1 * | 5/2005 | Jao | G06F 7/725 380/30 |
| 2005/0267926 | A1 * | 12/2005 | Al-Khoraidly | G06F 7/724 708/492 |
| 2006/0149962 | A1 * | 7/2006 | Fountain | H04L 9/0897 713/151 |
| 2007/0011453 | A1 * | 1/2007 | Tarkkala | H04L 9/3247 713/168 |
| 2007/0150794 | A1 | 6/2007 | Naslund et al. | |
| 2007/0152710 | A1 * | 7/2007 | Lablans | H03K 19/20 326/59 |
| 2008/0013716 | A1 * | 1/2008 | Ding | H04L 9/3093 380/30 |
| 2008/0054944 | A1 * | 3/2008 | Kwon | H03K 19/094 326/83 |
| 2008/0069345 | A1 * | 3/2008 | Rubin | H04L 9/0841 380/44 |
| 2008/0130873 | A1 | 6/2008 | Bolotov et al. | |
| 2008/0143561 | A1 * | 6/2008 | Miyato | H04L 9/0618 341/79 |
| 2008/0180987 | A1 * | 7/2008 | Lablans | G06F 7/49 365/189.08 |
| 2008/0244274 | A1 * | 10/2008 | Lablans | H04L 9/0662 708/492 |
| 2008/0273695 | A1 * | 11/2008 | Al-Gahtani | G06F 16/13 380/30 |
| 2009/0092250 | A1 * | 4/2009 | Lablans | G06F 7/582 380/255 |
| 2009/0220083 | A1 * | 9/2009 | Schneider | H04L 9/0662 380/42 |
| 2009/0310775 | A1 * | 12/2009 | Gueron | H04L 9/0643 380/28 |
| 2010/0057823 | A1 | 3/2010 | Filseth et al. | |
| 2010/0086132 | A1 * | 4/2010 | Tavernier | H04L 9/304 380/255 |
| 2010/0115017 | A1 * | 5/2010 | Yen | G06F 7/724 708/492 |
| 2010/0208885 | A1 * | 8/2010 | Murphy | H04L 9/004 380/28 |
| 2010/0271100 | A1 * | 10/2010 | Le | G05F 1/46 327/269 |
| 2010/0299579 | A1 * | 11/2010 | Lablans | H03M 13/3983 714/781 |
| 2010/0306299 | A1 | 12/2010 | Reidenbach | |
| 2010/0306525 | A1 * | 12/2010 | Ferguson | H04L 63/06 713/151 |
| 2011/0016321 | A1 * | 1/2011 | Sundaram | H04L 67/34 713/171 |
| 2011/0033046 | A1 * | 2/2011 | Nonaka | H04L 9/3093 380/46 |
| 2011/0211691 | A1 * | 9/2011 | Minematsu | H04L 9/0618 380/46 |
| 2011/0213982 | A1 * | 9/2011 | Brown | H04L 9/3252 713/176 |
| 2011/0243320 | A1 * | 10/2011 | Halevi | H04L 9/0861 380/30 |
| 2012/0023336 | A1 * | 1/2012 | Natarajan | H04L 9/0841 713/179 |
| 2012/0027198 | A1 * | 2/2012 | He | H04L 9/06 380/28 |
| 2012/0027210 | A1 * | 2/2012 | Takeuchi | H04L 9/3263 380/255 |
| 2012/0121084 | A1 * | 5/2012 | Tomlinson | H04L 9/304 380/30 |
| 2017/0230509 | A1 * | 8/2017 | Lablans | H04J 13/0033 |
| 2021/0405518 | A1 * | 12/2021 | Lablans | H04N 13/243 |
| 2023/0125560 | A1 * | 4/2023 | Lablans | H03M 7/00 380/28 |
| 2024/0356727 | A1 * | 10/2024 | Lablans | H04L 9/32 |

OTHER PUBLICATIONS

Koelbl et al. Haraka v2—Efficient Short-Input Hashing for Post-Quantum Applications, 2016, downloaded from https://eprint.iacr.org/2016/098.pdf.

Lyubashevsky et al., SWIFFT: A Modest Proposal for FFT Hashing, 2008, downloaded from https://web.eecs.umich.edu/~cpeikert/pubs/swifft.pdf.

List of hash functions, downloaded from Wikipedia https://en.wikipedia.org/w/index.php?title=List_of_hash_functions&oldid=1121968052.

NIST hash function competition, downloaded from Wikipedia https://en.wikipedia.org/w/index.php?title=NIST_hash_function_competition&oldid=1071046632.

Master Thesis by Claude Elwood Shannon, entitled A Symbolic Analysis of Relay and Switching Circuits and marked as Submitted in Partial Fulfillment of the Requirements for the Degree of Master of Science from the Massachusetts Institute of Technology 1940.

FIPS 180-4 Secure Hash Standard (SHS), dowloaded from https://nvlpubs.nist.gov/nistpubs/FIPS/NIST.FIPS.180-4.pdf.

FIPS 186-2, Digital Signature Standard (Dss), downloaded from https://csrc.nist.gov/csrc/media/publications/fips/186/2/archive/2000-01-27/documents/fips186-2.pdf.

(56) References Cited

OTHER PUBLICATIONS

NIST SP 800-38D, Recommendation for Block Cipher Modes of Operation: Galois/Counter Mode (GCM) and GMAC, downloaded from https://nvlpubs.nist.gov/nistpubs/legacy/sp/nistspecialpublication800-38d.pdf.

FIPS-PUB 198-1, The Keyed-Hash Message Authentication Code (HMAC), downloaded from https://nvlpubs.nist.gov/nistpubs/FIPS/NIST.FIPS.198-1.pdf.

FIPS 202 SHA-3, SHA-3 Standard: Permutation-Based Hash and Extendable-Output Functions downloaded from https://nvlpubs.nist.gov/nistpubs/FIPS/NIST.FIPS.202.pdf.

HMAC: Keyed-Hashing for Message Authentication downloaded from https://www.rfc-editor.org/rfc/rfc2104.html.

GlobalPlatform Technology Cryptographic Algorithm Recommendations Version 1.0, downloaded from https://globalplatform.org/wp-content/uploads/2019/03/GP_TechnicalNoteCryptoAlgorithmRecs_v1.0_PublicRelease.pdf.

Leifman, 2014, Secret and Verifiable Delegated Voting for Wide Representation, downloaded from https://eprint.iacr.org/2014/351.pdf.

Dobraunig et al. Ascon v1.2 Submission to NIST, 2021, downloaded from https://csrc.nist.gov/CSRC/media/Projects/lightweight-cryptography/documents/finalist-round/updated-spec-doc/ascon-spec-final.pdf.

ChaCha20 and Poly1305 for IETF Protocols RFC 7539, downloaded from https://datatracker.ietf.org/doc/rfc7539/.

RFC4880 OpenPGP Message Format, downloaded from https://www.rfc-editor.org/rfc/rfc4880.

The SHA-3 Zoo, downloaded from https://ehash.iaik.tugraz.at/wiki/The_SHA-3_Zoo.

Badilles Talirongan et al. A Modified MD5 Algorithm Incorporating Hirose Compression Function, 2018 IEEE 10th International Conference on Humanoid, Nanotechnology, Information Technology, Communication and Control, Environment and Management (HNICEM).

Cortez et al. Cryptanalysis of the Modified SHA256, HPCCT & BDAI 2020: 2020 4th High Performance Computing and Cluster Technologies Conference & 2020 3rd International Conference on Big Data and Artificial Intelligence.

Alok kumar kasgar et al. New Modified 256-bit MD5 Algorithm with SHA Compression Function, International Journal of Computer Applications (0975-8887)vol. 42—No. 12, Mar. 2012.

Quilala et al. Modified SHA-1 Algorithm, 2018, Indonesian Journal of Electrical Engineering and Computer Science vol. 11, No. 3, Sep. 2018, pp. 1027~1034.

Matusiewicz et al. Analysis of simplified variants of SHA-256, C. Wolf, S. Lucks, P.-W. Yau (Eds.): WEWoRC 2005, LNI P-74, pp. 123-134, 2005.

* cited by examiner

```
function y=labtransform(table,invert)
% lab-transform or Finite Lab-transfor or FLT inverts n-state
% switching table 'table' with n-state inverter 'invert'at inputs and
% reversing inverter 'rinvert' at output
% the table and inverter are in origin 1
% Copyright 2023 Peter Lablans. All right reserved
% determine size of 'table'
lent=size(table);
len=lent(2); % len is n
% initialize 'tableinv' and 'rinvert'
rinvert=ones(1,len);
tableinv=zeros(len,len);
% determine 'rinvert' from 'invert'
for i=1:len
    ind=invert(i);
    rinvert(ind)=i;
end
rinvert;
% determine modified table 'tableinv'
for i1=1:len
    for i2=1:len
        k1=invert(i1); % invert input 1
        k2=invert(i2); % invert input 2
        aa=table(k1,k2);
        tableinv(i1,i2)=rinvert(aa);% invert output
    end
end
y=tableinv; % the Lab-transformed switching table
```

```
function y=labtransformpp(table,invx1,invx2,invy)
% modified finite lab-transform or mL-transformation or mFLT
% inverts n-state switching table 'table' with
% n-state inverter 'invx'at inputs and
% inverter 'invy' at output
% the table and inverter are in origin 1
% Copyright 2023 Peter Lablans. All right reserved
% determine size of 'table'
lent=size(table);
len=lent(2); % len is n
% initialize 'tableinv'
tableinv=zeros(len,len);
% determine modified table 'tableinv'
for i1=1:len
    for i2=1:len
        k1=invx1(i1); % invert input 1
        k2=invx2(i2); % invert input 2
        aa=table(k1,k2);
        tableinv(i1,i2)=invy(aa);% invert output
    end
end
y=tableinv; % the mLab-transformed switching table
```

FIG. 11

```
function y=makerinvnn(inv)
% Copyright 2023 Peter Lablans. All rights reserved
% make reverse inverter for inv in origin 1 over limited range
lent=size(inv);  % determine size of inv
len=lent(2);     % number of elements
rinv=zeros(1,len);
for i=1:len
    ind=inv(i);  % the index of rinv is the state of inv
    if ind==0
        rinv(i)=0;
    else
        rinv(ind)=i; % the state of rinv is the index of inv
    end
    end
y=rinv;  % result in origin 1
```

FIG. 14

```
% make ch8f
% modified finite lab-transform or mL-transformation
% of function Ch(x,y,z)
% the functions are in origin 1
% Copyright 2023 Peter Lablans. All right reserved
% inverters are: inv8x, inv8y, inv8z, inv8out
% switching functions are and8 and xor8
% general 8-state 3-bits inverter is notn
ch8f=ones(8,8,8);
for z=1:8
    zi=inv8z(z);
    for x=1:8
        xi=inv8x(x);
        for y=1:8
            yi=inv8y(y);
            xn=notn(xi,3);
            par2=and8(xn,zi);
            par1=and8(xi,yi);
            ch8f(x,y,z)=inv8out(xor8(par1,par2));
        end
    end
end
```

FIG. 15

```
function y=labtransformplugrule(i1,i2,status)
% lab-transform or Finite Lab-transforms or FLTs
% n-state switching rule 'oprule'
% all operations are origin-1
% status is ID/number last used inverter
% Copyright 2023 Peter Lablans. All right reserved % check which inverter number was used last and update
k=status;
% determine FLTed output
        k1=invertrule(i1,k); % invert input 1
        k2=invertrule(i2,k); % invert input 2
        aa=oprule(k1,k2);
        cc=rinvertrule(aa,k);% invert output
        y=cc; % the Lab-transformed output
```

FIG. 16

```
function out = ch( x, y, z )
    % Function maj : Performs CH operation.(S4.1.2)
    out = bitxor( x & y ,~x & z );
end
```

FIG. 17

```
function out=chf(x,y,z,inv,rinv)
% Copyright 2023, Peter Lablans, all rights reserved
xz=~x;
xni=split4winv(zx,inv);
xi=split4winv(x,inv);
zi=split4winv(z,inv);
yi=split4winv(y,inv);

r1=(xni&zi);
r2=(xi&yi);
rr=bitxor(r1,r2);
out=split4winv(rr,rinv);
end
```

FIG. 18

```
function out=split4winv(x,inv)
% Copyright 2023, Peter Lablans, all rights reserved
% split word of 32 bits into 4 256-state elements and invert
w1=x(1:8)+1;
w2=x(9:16)+1;
w3=x(17:24)+1;
w4=x(25:32)+1;
d1=b2dec(w1);
d2=b2dec(w2);
d3=b2dec(w3);
d4=b2dec(w4);
out1=[d1 d2 d3 d4];
out2=inv(out1);
xx1=dec2b(out2(1),8)-1;
xx2=dec2b(out2(2),8)-1;
xx3=dec2b(out2(3),8)-1;
xx4=dec2b(out2(4),8)-1;
out=[xx1 xx2 xx3 xx4];
end
```

| name | type | op 1 | size 1 | op 2 | size 2 | state | mod | rnd | hash | # |
|------|------|------|--------|------|--------|-------|-----|-----|------|---|
| a0...77 | sha256 | Ch | 256 | ID | ID | ID | ID | ALL | bb...09 | 1 |

CRYPTOGRAPHIC COMPUTER MACHINES WITH NOVEL SWITCHING DEVICES

CROSS-REFERENCE TO RELATED APPLICATIONS

This application claims the benefit and is a continuation-in-part of U.S. patent application Ser. No. 17/402,968 filed on Aug. 16, 2021. U.S. patent application Ser. No. 17/402,968 claims the benefit and is a continuation-in-part of U.S. patent application Ser. No. 16/172,584 filed on Oct. 26, 2018. now U.S. Pat. No. 11,093,213 issued on Aug. 17, 2021. U.S. patent application Ser. No. 16/172,584 claims the benefit and is a continuation-in-part of U.S. patent application Ser. No. 16/717,691 filed on Dec. 17, 2019 now U.S. Pat. No. 11,336,425 issued on May 17, 2022. This application claims the benefit and is a continuation-in-part of U.S. patent application Ser. No. 17/240,635 filed on Apr. 26, 2021. Application Ser. No. 17/240,635 claims the benefit and is a continuation-in-part of U.S. patent application Ser. No. 16/532,489 filed on Aug. 6, 2019 now abandoned. U.S. patent application Ser. No. 16/532,489 claims the benefit and is a continuation-in-part of U.S. patent application Ser. No. 15/499,849 filed on Apr. 27, 2017 now U.S. Pat. No. 10,375,252 issued on Aug. 6, 2019. Application Ser. No. 16/172,584 claims the benefit and is a continuation-in-part of U.S. patent application Ser. No. 14/975,841 filed on Dec. 20, 2015, now abandoned. U.S. patent application Ser. No. 16/172,584 claims the benefit of and is a continuation-in-part of patent application Ser. No. 15/442,556 filed on Feb. 24, 2017 now U.S. Pat. No. 10,515,567 issued on Dec. 24, 2019. U.S. patent application Ser. No. 16/172,584 claims the benefit of U.S. Provisional Patent Application No. 62/610,921 filed on Dec. 27, 2017, which is incorporated herein by reference. U.S. patent application Ser. No. 15/442,556 claims the benefit of U.S. Provisional Patent Application No. 62/299,935 filed on Feb. 25, 2016, and of U.S. Provisional Patent Application No. 62/435,814 filed on Dec. 18, 2016, and of U.S. Provisional Patent Application No. 62/455,555 filed on Feb. 6, 2017. U.S. patent application Ser. No. 17/402,968 claims the benefit of U.S. Provisional Patent Application No. 63/067,281 filed on Aug. 18, 2020 and of U.S. Provisional Patent Application No. 63/118,374 filed on Nov. 25, 2020 and of U.S. Provisional Patent Application No. 63/162,995 filed on Mar. 18, 2021. U.S. patent application Ser. No. 16/717,691 claims the benefit of U.S. Provisional Patent Application No. 62/902,350 filed on Sep. 18, 2019. This application claims the benefit of U.S. Provisional Patent Application No. 63/301,385 filed on Jan. 20, 2022. This application claims the benefit of U.S. Provisional Patent Application No. 63/338,249 filed on May 4, 2022. This application claims the benefit of U.S. Provisional Patent Application No. 63/420,995 filed on Oct. 31, 2022. All the above Provisional and Non-provisional U.S. Patent Applications and Patents are incorporated herein by reference in their entirety.

COPYRIGHT NOTICE

A portion of the instant disclosure contains material which is subject to copyright protection by Peter Lablans. Peter Lablans has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Aspects of the present invention relate to machine cryptography. Data exchange between computing devices often takes place over communication channels that are not secure. Furthermore, networked devices are often a (unintended) gateway to the management, control and security of the network and devices attached to a network, wherein the network is often connected or part of a public network such as the Internet and may provide access to a bank account or access to a house, a garage, a car, a refrigerator, a camera, a thermostat, a cell phone, a tv device, a tablet, a PC, an industrial facility, the electricity network or other utility network, radar installation, or any other computing device that is enabled to communicate. It is important to guard against unauthorized access of connected devices and to keep the information that is exchanged as private as possible.

Cryptographic procedures performed by machines of authentication, public and private key generation and distribution, encipherment and decipherment rely on public and standard procedures wherein at least one aspect is secret and user specific, but the steps of a procedure are known, including logic functions and/or logic circuits that are used. Many cryptographic procedures are for instance published as standards by the National Institute of Standards and Technology (NIST) of the US Department of Commerce. An advantage is that some of the best procedures are made publicly available. Because such procedures are so widely used they are also widely studied and susceptible to ever improving attacking procedures. Because the published security procedures are recognized as being among the best available, the general user is generally unable to develop a new procedure that is better than the standard ones.

It would increase security if one can modify existing cryptographic procedures in an unpredictable or hard to predict way that would make attacks on security procedures harder to be successful while maintaining strong aspects of known security and cryptography programs and procedures.

Accordingly, novel and improved methods and devices are required that use difficult to predict parameters in modifying standard cryptographic methods and devices.

SUMMARY OF THE INVENTION

In accordance with an aspect of the present invention a cryptographic apparatus to modify one or more signals into one or more cryptographic signals is provided. The cryptographic apparatus applies at least one realization in either a memory or a combinational circuit of a Lab-transformed bitwise XORing.

In accordance with an or more aspects of the present invention a computer device is provided, comprising a memory enabled to hold data, including processor instructions, a processor enabled to retrieve instructions from the memory that enable the processor to perform the steps: computing a hash value from a data set, wherein the computing includes a processing of a modified first word of q bits and a modified second word of q bits, by a computer operation and providing on an output a result including a word of q bits with q an integer greater than 2; modifying a first word of q bits derived from the data set based on a first $2^q$-state reversible inverter into the modified first word of q bits and modifying a second word of q bits based on a second $2^q$-state reversible inverter into the modified word of q bits and the computer operation after processing the modified first and second words of q bits generating the output result of q bits that is based on a modification of a word of q bits with a third $2^q$-state reversible inverter; generating the hash value based on the output result; and transmitting over a communication channel connected to the computing device at least one of the hash value and the data set.

In accordance with yet a further aspect of the present invention the finite field GF(n) has n elements with n being a prime number, wherein n is preferably greater than 2, more preferably greater than 10, even more preferable greater than 100, even more preferable greater than 1000, and most preferably greater than 10,000.

In accordance with yet a further aspect of the present invention the finite field GF(n) has n elements with n being $n=2^k$ with preferably k>2, more preferably k>7, even more preferably k>255, even more preferably k>300.

In accordance with yet a further aspect of the present invention the finite field GF(n) has n elements with n being $n=q^k$ with k>2 and q being a prime number, with preferably k>2, more preferably k>7, even more preferably k>255, even more preferably k>300.

In accordance with an aspect of the present invention cryptographic methods to modify one or more signals into one or more cryptographic signals is provided.

DESCRIPTION OF THE DRAWINGS

FIGS. 3, 4 and 5 are screenshots of switching tables generated by a computing device in accordance with one or more aspects of the present invention;

FIGS. 10 and 11 are screenshots of computer instructions that modify a switching table in accordance with one or more aspects of the present invention;

FIG. 14 is a screenshot of a computer program listing that performs computer instructions in accordance with one or more aspects of the present invention;

FIG. 15 is a screenshot of a computer program listing that performs computer instructions in accordance with one or more aspects of the present invention;

FIG. 16 is a screenshot of a computer program listing that performs computer instructions in accordance with one or more aspects of the present invention;

FIG. 17 is a screenshot of a computer program listing that performs computer instructions;

FIG. 18 is a screenshot of a computer program listing that performs computer instructions in accordance with one or more aspects of the present invention;

FIG. 19 is a screenshot of a computer program listing that performs computer instructions in accordance with one or more aspects of the present invention; and FIG. 20 illustrates a configuration mask in accordance with an aspect of the present invention.

DESCRIPTION OF THE INVENTION

Figure 1:
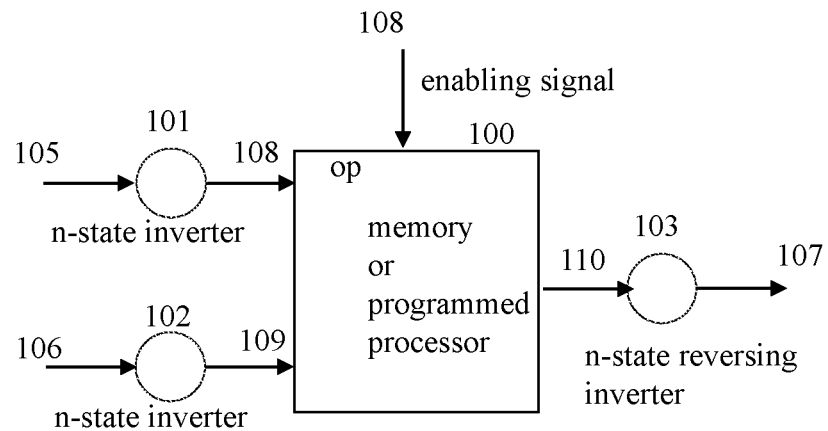
FIGS. 1 and 2 are diagrams of a device that modifies a switching operation in accordance with various aspects of the present invention.

Embodiments of the present invention are directed to application of new n-state switching functions in cryptographic machines. A cryptographic machine is a processor or processor-type device, such as a Field Programmable Gate Array (FPGA), digital circuitry with discrete digital switching components, memory with stored switching tables and programs and limited functional circuitry (micro-programmed device), an ASIC or any other digital circuitry, that is enabled or configured to receive and process signals that represent data and to generate signals being cryptographic data. Cryptographic data include, but is not limited to encrypted data, a digital signature, an authentication, a public key, a private key, a message digest or hash, a Cyclic Redundancy Code (CRC), scrambled data. In general cryptographic data is encoded or enciphered data of which the original data from which it is derived is not easy to determine. Security or cryptography procedures include: generating and distributing public keys, authenticating messages, creating message digests or hash functions, generating digital signatures, enciphering and deciphering messages and others. A message herein is digital data that is represented by one or more signals. Signals are generated by a device and are received by a device. Data as processed by cryptographic devices are commonly represented in binary form. Transmission of signals can be wired or wireless. Signals can for instance be an electrical, a magnetic, an electromagnetic, or an optical signal. Signals may also be a mechanical signal such as a state of a device or a presence or absence of a material. Signals may be modulated and may be transduced from one form into another. Most data signals are in some form designated to represent binary data. Data signals are often represented or described by symbols. Both the signals and their descriptive symbols can be binary or non-binary or a combination thereof. For instance a QAM-n signals with n>2 are generated by devices. A QAM-n signal may be characterized by a discrete state of phase and/or amplitude in a constellation. In 64-QAM or QAM-64 each state may be characterized by or transmit 6 bits. ASCII characters such as in an alphabet may include at least 26 different lower case symbols. These symbols can be further described or represented by bytes of 7 or 8 bits. Internally a computing device uses the byte, but on a display 26-state symbols (lower case characters) are used and may include other ASCII symbols.

Fundamental to digital circuits such as processors, FPGAs and memories is that they are state machines or switching machines. That is, for their useful purposes, digital circuitry changes a physical state, based on an input signal and provides an output signal due to a new state. Commonly, states of devices are characterized by their input and output signals and are represented by binary states, commonly indicated as "high" and "low" when discussed in a physical sense and commonly labeled as "1" and "0." The "0" and "1" are merely labels for true signals. It is understood herein that switching devices characterized by states "0" and "1" are physical devices that switch between physical states. A two input device that switches from state "0" to "1", for instance may change from physical state "ground" to +4.9 Volt. The device may be a logic "AND" gate and the change may take place because two inputs are placed in state "1". The literature sometimes as operational representation of the AND gate that the product of two input states is the output state, like a multiplication 1*1=1. It is to be understood that this is a human representation that does not correctly describe the physical reality of the AND gate. The physical reality is that 4.9 V on a first input and 4.9 V on a second input will generate 4.9 V on the output. No mathematical multiplication takes place inside the device. One of ordinary skill would realize that 4.9*4.9 is not 4.9.

The meaning of the term switching table herein means a table that labels physical states with symbols. The symbols correspond with measurable and detectable physical states. A switching table means herein also that it is realized or implemented on a physical device including a combinational circuit or a memory. Cryptographic devices generally operate on bits or words of bits. A bit herein means a binary signal that can assume one of two states. The use of the symbols "0" and "1" only indicate that a signal is "low" or "high" using signal levels that are common in the computer and switching devices industry. For convenience n-states are used in numerical form, usually in origin 0 in [0, 1, 2, . . . n−1] or in programs like Matlab in origin 1 in [1, 2, 3, . . . n]. It is to be understood that each of n states corresponds to a real physical state that may be a word of binary signals.

Accordingly, n-state switching tables herein correspond to physical switching and n-state switching devices and are physical devices. None of the devices herein performs any arithmetical operation in a human sense, even though for convenience arithmetical terms may be used. In general one speaks of machine arithmetic. This means that machine switching is applied with interface conversion that makes it look to a human that arithmetic is performed.

Characters and other symbols may be represented by a numerical or decimal or hexadecimal representation, while internally being processed as words of bits. Memories now exist wherein a memory is multi-level rather than binary. For ease of use nonbinary or multi-state representation for signals is used herein. Computers or processors have generally no awareness of a value or meaning of any representation. Such meaning is provided by the ways signals represented by symbols are processed by a processor. An example of that is a ripple adder in hardware. In binary form XOR devices and AND devices as switching devices are applied to perform functions that coincide with the modulo-2 addition and the modulo-2 carry generation.

Methods provided herein in accordance with one or more aspects of the present invention represent configurations or enablement of hardware devices that perform one or more switching tasks. A description may be provided in Matlab or any other computer language that is executable and executed on a processor with memory. A switching device is characterized by a matrix or a vector and can be realized in combinational circuitry or by addressable memory devices that store a switching matrix or vector. Many books and articles exist that describe "logic" representation of switching circuitry. One of the first articles on the subject is the Master Thesis by Claude Elwood Shannon, entitled A Symbolic Analysis of Relay and Switching Circuits and marked as Submitted in Partial Fulfillment of the Requirements for the Degree of Master of Science from the Massachusetts Institute of Technology 1940, but created around 1938, which is incorporated herein by reference. Thus while formulas, expressions and tables are provided herein to describe or illustrate methods, procedures and devices it is to be understood that these all can and are realized in hardware and device form.

One aspect of the present invention relates to the use of non-binary or n-state inverters which can be reversible or non-reversible. An n-state inverter is characterized by n symbols of which each can assume one of n-states. For convenience a numerical representation is used running from 0 to (n−1) or from 1 to n. An n-state inverter is assumed to have n possible input states. Each input generates an output. The n-state inverter is represented by the vector expression: [0 1 2 . . . n−1]→[$a_0$ $a_1$ $a_2$ . . . $a_{n-1}$]. The left side represents the possible input states and the right side the output, wherein $a_0$ is the output state generated by input state 0, ai is the output state generated by input state 1, $a_2$ is the output state generated by input state 2, and $a_{n-1}$ is the output state generated by input state n−1. The states of $a_0$, $a_1$, $a_2$, . . . $a_{n-1}$ are selected from states 0, 1, 2, . . . n−1 and can be all different, in which case the inverter is reversible or at least two output states are the same, in which case the inverter is non-reversible.

An example of a reversible 4-state inverter is [0 1 2 3]→[2 0 3 1] in which input state 0 generates output state 2; input state 1 generates output state 0; input state 2 generates output state 3 and input state 3 generates output state 1. An example of a non-reversible 5-state inverters is [0 1 2 3 4]→[2 2 3 1 3]. Both input states 0 and 1 generate output states 2. It is impossible in that case to determine from the output state what the input state was. The reversing n-state inverter reverses the n-state inverter back to [0 1 2 . . . n−1]. The reversing inverter of 4-state inverter [0 1 2 3]→[2 0 3 1] is [0 1 2 3]→[1 3 0 2].

There are $n^n$ n-state inverters of which about n! are reversible including the identity. Herein the term n-state inverter means an inverter that is not identity or not represented by identity. There are over 16 million 8-state inverters of which 40,320 are reversible and includes [0 1 2 3 4 5 6 7]→[0 1 2 3 4 5 6 7] which is the identity 8-state inverter. The number of reversible inverters becomes very large when n increases. For n=16 there are over $2*10^{13}$ reversible inverters. Accordingly, the probability to predict an n-state inverter or to analyze data to determine use of an n-state inverter becomes extremely low.

Cryptography and error correction codes commonly uses functions that determine a finite field or Galois Field GF(n). The functions that determine the Galois field are generally called the addition and multiplication. However, there is often no direct relation between "normal" or radix-n addition and multiplication and Galois Field addition and multiplication for extension fields of Galois Fields. All Galois Fields have a neutral element $e_{scn}$ for the operation "addition" designated by "scn" so that scn(ak,$e_{scn}$)=ak. Such neutral element is also called the "zero element." Its connection with the second operation which is usually called multiplication or "mn" is that operation mn(ak,$e_{scn}$)=$e_{scn}$. For understanding one can assume the Galois Field GF(5) wherein the addition operation is "sc5" and is the modulo-5 addition. The neutral element or zero element $e_{sc5}$ is 0. The multiplication operation "m5" is the modulo-5 multiplication, wherein multiplication of any element with $e_{sc5}$=0 provides 0. The operation "mn" also has a neutral element $e_{mn}$ so that mn(ak,$e_{mn}$)=ak. For the multiplication m5 over GF(5) the neutral element $e_{m5}$ is 1. The inventor found that this aspect of using field operations over GF(n) facilitates cryptanalysis and that modification of the finite field GF(n) into an alternate finite field aGF(n) with modified addition and multiplication and modified zero and neutral elements would make cryptanalysis much more difficult. These aspects are disclosed in for instance U.S. patent application Ser. No. 12/952,482 filed on Nov. 23, 2010, which is incorporated herein by reference ('the 482 application').

How to create an alternate finite field aGF(n) from GF(n) with reversible n-state inverters was disclosed earlier by the inventor in U.S. patent application Ser. No. 14/064,089 filed Oct. 25, 2013 (the "089 application") and is repeated here to provide context. Now referring to FIG. 1, a switching table representing the n-state function "scn" or "mn" is stored in an addressable memory 100 with two inputs and one output. Different realizations of switching tables are possible as one of ordinary skill in the art knows. The input states represented by signals on inputs form the address of the memory where upon the output state is stored. The memory 100 has two inputs 108 and 109 which determine the address of memory elements that outputs its content on output 110. Reversible n-state inverter 101 with input 105 is connected to input 108 of memory 100. N-state inverter 102 which is identical to inverter 101 with input 106 is connected to input 109. The output 110 of memory 100 is connected to n-state inverter 103 with output 107. N-state inverter 103 reverses inverter 101 back to the identity state [0 1 2 . . . n−1]. An input 108 on the memory may be enabled to receive an enabling signal to make sure that memory 100 is ready to provide appropriate output.

An n-state inverter, which may be reversible, can be realized in different components, like the n by n switching table, as one of ordinary skill will know. An n-state symbol in binary technology in one embodiment of the present invention is represented by a binary word, which by itself is usually represented by a plurality of binary signals. A first realization of an n-state inverter is by storage of the inverter output states (or rather signals) in an addressable memory wherein an input state forms an address in the memory that is activated and the output is the inversed state stored at the memory address. A second realization is by way of a combinational binary circuit. One can for instance define the input and output states as binary words in a Karnaugh map and construct a combinational binary circuit on that basis as is known in the art. A third realization is on a processor with a memory. For instance in Matlab one defines a 4-state inverter as a 1 by 4 array, which may be called inverter 'invert4'. For example a Matlab instruction is: invert4=[4 3 2 1]. Matlab works origin 1. Assume one variable 'input1' has the value 3 or: input1=3. Matlab then inverts 'input1' to 'invinput1' in accordance with inverter invert4 by the instruction: invinput1=invert4 (input1). The result is invinput1 is 2. And thus the input is inverted with an inverter.

The underlying realization of the instructions and inversion by the processor is known to one of ordinary skill in computer circuit design and is well aware of the physical processes that are being performed, even though a user may only see symbols on a screen. The symbols on a screen are only for human consumption and are not needed for performing the actual inversion. For instance a device may receive a signal representing a 256-state signal that needs to be processed, for instance in accordance with a 256-state inverter. The received signal is demodulated and otherwise processed to provide for instance an 8-bit byte to an inverter execution that generates the inverted 8-bit byte. The inverted 8-bit byte may be used for further processing by the processor or may be processed to be displayed on a screen by the processor.

The device illustrated in FIG. 1 transforms the n-state switching table that characterizes the device between inputs 108 and 109 and output 110 to a device with a transformed n-state switching table that characterizes the device between inputs 105 and 106 and output 107. The terminology is used herein that says that the original n-state switching table as stored and realized in memory or realized in a circuit is 'transformed' to a new or Lab-transformed n-state switching table that characterizes the device in FIG. 1 between 105, 106 and 107. The transformation of an operation and/or a transformation of a device as shown in FIG. 1 is called the Finite Lab-Transform or FLT for short. It has as requirement that there are two or more identical reversible n-state inverters at every input that receives n-state data that is being processed by the FLTed method and/or device and a corresponding reversing n-state inverter at the output wherein a combination of the input inverter with the output inverter establishes identity. One may represent that relation as inv(rinv(x))=x.

In some cases one may apply an n-state inverter at the output that is not a corresponding reversion inverter to the input inverter. This is herein considered to be an equivalent to an FLTed modification of an operation and/or circuit and without an explicit exception will be assumed to be an FLT.

The FLT has as an important property that it preserves meta-properties of an operation and or switching circuit. In some cases, such as one-way functional operations, this preservation of properties such as associativity may not be significant. In that case one may apply a modified FLT or mFLT as described herein later.

A Lab-transformed n-state switching table is a first n-state n by n switching table transformed by using identical n-state reversible inverters to transform first and second inputs to the first n-state n by n switching table and transforms the output with a reversing inverter to the n-state reversible inverter that combined with the n-state reversible inverter forms an n-state identity inverter. An input to a table is an index or address of a row or a column of a 2-dimensional n by n table. For convenience a top input of a 2-input device such as in FIG. 1 corresponds with a row index of an n-state switching table and a bottom input corresponds to a column index of the n-state switching table. One is again reminded that inputs on a device receive a signal, not a symbol or a state. The symbol or state indication is merely used for convenience to represent that a symbol represents a signal and that different symbols indicate different signals.

The switching table of 100 performs an operation that may be called 'op' for convenience or 'sc' for addition or 'm' for multiplication. One of ordinary skills knows that with known techniques, such as Karnaugh map, the switching table can be performed by a combinational digital circuit.

Figures 4, 5:
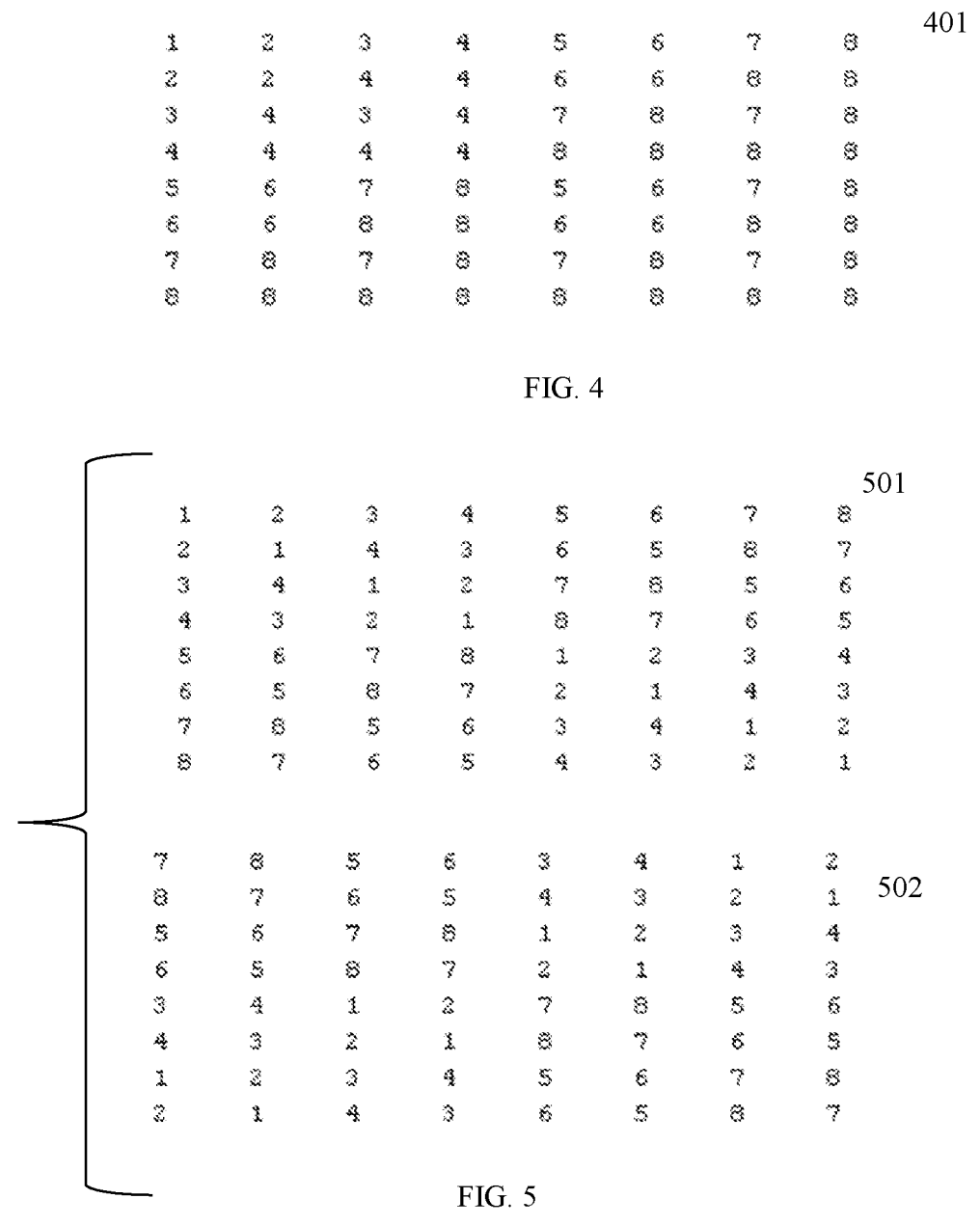

The effect of the device of FIG. 1 is that de addition and multiplication over GF(n) are modified in such a manner that the new operations also define a finite field which is called aGF(n). As an illustrative example a modification of a finite field GF(8) with 8-state inverter inv8: [0 1 2 3 4 5 6 7]→[2 3 4 5 6 7 0 1] and reversing inverter rinv8::[0 1 2 3 4 5 6 7]→[6 7 0 1 2 3 4 5] is provided. FIG. 5 shows switching table 501 of sc8, sc8 being the decimal representation of XORing 3-bit words, or XOR8, as stored in memory and display on a screen of which FIG. 5 is a screen shot. The processor is controlled by Matlab® and all output matrices are in origin 1. To interpret 8-state table switching 501 in elements [0 1 2 3 4 5 6 7] a number 1 should be subtracted from the table elements. One can see that 0 (displayed as 1) is the zero element of sc8. As a reminder: a modified addition over aGF(n) continues to have the properties of an addition and a modified multiplication over aGF(n) continues to have the properties of a multiplication, be it with possibly different zero- and one- or neutral elements.

The 8-state switching table 502 in FIG. 5 shows a screenshot of the FLTed switching table 5010 in origin 1. One can see that the element 7 in origin−1 is the zero element of switching table 502. One can test some of the finite field properties of aGF(8) (associativity and distributivity). FIG. 10 provides a screenshot 1000 of the Matlab program that configures and enables the processor to realize the device of FIG. 1 in this 8-state example.

All operations that can be performed over a finite field GF(n) can be performed over the alternate finite field aGF(n). Furthermore, a modified addition of the alternate field GF ($n=2^p$) is also the subtraction over the alternate finite field. In accordance with an aspect of the present invention the properties of the alternate finite field aGF(n) are kept confidential. For instance a cryptographic method applies one or more additions and/or multiplications over a standard finite field GF(n). A standard finite field GF(n) has as zero element for the addition 'scn' and the multiplication 'mn' the element 0. Thus scn(ak,0)=ak and mn(ak,0)=0 and the one element of the multiplication is 1 and thus mn(ak,1)=ak over a standard finite field. From the previous 8-state example it should be clear that sc8i(ak,6)=ak and m8i(ak,6)=6, while m8i(ak,7)=ak. So, an alternate finite field may be characterized by its zero element not being 0 and its one element not being 1.

A general n-state Lab-transform for an n-state switching table is provided in accordance with an aspect of the present invention in in screenshot in FIG. 10 a general Matlab function labtransform(table,invert). A processor executing the instructions of this function is provided with an n by n n-state switching table 'table' and an n-state inverter 'invert.' Lines 10 and 11 determine 'n' from the dimensions of 'table.' Lines 18-21 determine the reversing (to identity) inverter of 'invert.' Lines 24-31 perform the Lab-transform and the Lab-transformed table 'tableinv' is outputted in line 32.

It has been shown in detail by the inventor in U.S. patent application Ser. No. 15/442,556 (hereinafter the "556 application," which is incorporated herein by reference) how the Lab-transform is applied. In case of Lab-transformed associative n-state switching functions one starts with an n-state switching function that is known to be associative. For instance an n-state switching function that can be represented by a modulo-n addition; or an n-state function that can be represented by a modulo-n multiplication with n being prime; or an n-state switching function that is called a "consecutive n-state multiplication" in the 556 application. (A consecutive n-state multiplication is characterized by the expression prod(i1,i2,n)=mod((i1+i2−1),n)+(((i1+i2−1)>=n)*1) for n>0 and prod(0,0,n)=0 in its base form for any integer n>2). All these n-state switching functions are associative and form the basis of a finite group. Applying a Lab-transform on these associative n-state switching functions will create associative n-state switching functions. Similarly, two different n-state switching functions that are generally called "addition" and "multiplication" may represent a basis for an n-state finite field. The two Lab-transformed "addition" and "multiplication" represent the basis for a Lab-transformed or alternate finite field, as described in the 556 application.

One application of the Lab-transform in cryptography in accordance with one or more aspects of the present invention is to obfuscate a cryptographic operation to unauthorized machines or users. Even if a basic flow of operations is known, such as in published and standardized cryptographic operations such as AES and public key exchange and Elliptic Curve Cryptography and message-digests or hash functions then the use of "unknown" or Lab-transformed functions in known basic flow processes will render a result very hard to predict. One reason for that is the enormous number of Lab-transforms, which is factorial n or close to factorial n. A 256-state switching function has over 10100 possible Lab-transformed versions.

It is beneficial to have more than one base n-state function or combination of base n-state switching functions to further obfuscate the result of a Lab-transformed cryptographic operation.

It turns out that different, currently believed to be not used, single or combinations of n-state functions exist that represent an n-state finite field and that can be Lab-transformed. There may be different ways to generate and evaluate different n-state switching functions. In accordance with an embodiment of the present invention, a computer program such as a Matlab program is used to generate all possible commutative n-state switching tables that are similar to n-state switching tables that represent addition-like and multiplication like switching tables. In one embodiment of the present invention an n-state addition-like switching table is an n by n switching table with as zero element the element 0. That is, if the n-state switching table is represented as scn then scn(0,0)=0; scn(a,0)=a and scn(a,a$^{-1}$)=0, wherein a$^{-1}$ is the additive n-ste inverse of a. Without too many details one may represent as an illustrative 5-state example the following partial 5-state switching table:

| sc5 | 0 | 1 | 2 | 3 | 4 |
|---|---|---|---|---|---|
| 0 | 0 | 1 | 2 | 3 | 4 |
| 1 | 1 | c11 | c12 | c13 | c14 |
| 2 | 2 |  | c22 | c23 | c24 |
| 3 | 3 |  |  | c33 | c34 |
| 4 | 4 |  |  |  | c44 |

The above 5-state table is commutative and the 'unfilled' elements mirror around the diagonal. In fact, in this example one has to find the elements c11, c12, c13, c14, c22, c23, c24, c33, c34 and c44 all from the set set5=[0, 1, 2, 3, 4]. The selected elements (and their mirrors) should create rows and columns that are reversible 5-state inverters and such that each element of the set set5 only appears once in each row and column. From that only those tables are selected that are associative. It turns out that there are 6 such 5-state tables of which one is the mod-5 addition. It also turns out that these tables can be formed from Lab-transforming the 5-state mod-5 addition with all possible reversible 5-state inverters wherein the 0 and 1 element are unchanged or [0 1 2 3 4]→[0 1 a b c] wherein a, b and c each are different elements of [2, 3 4]. This offers 6 different tables for additions. Running a Matlab program that generates all unique different commutative and associative 5-state tables provides the same 5-state switching tables.

In a next step in accordance with an aspect of the present invention one generates different 5-state multiplication-like switching tables that are commutative and associative and that have 0-element 0 and 1-element 1. Call these tables m5. This mean that m5(a,0)=0; ma5(a,1)=a and ma5(a,a$^{-1}$)=1. The element a$^{-1}$ in this case is the multiplicative inverse of a. As an example the 5-state prototype multiplicative switching table looks like the following table

| m5 | 0 | 1 | 2 | 3 | 4 |
|---|---|---|---|---|---|
| 0 | 0 | 0 | 0 | 0 | 0 |
| 1 | 0 | 1 | 2 | 3 | 4 |
| 2 | 0 | 2 | c22 | c23 | c24 |
| 3 | 0 | 3 |  | c33 | c34 |
| 4 | 0 | 4 |  |  | c44 |

In an illustrative example there are actually two 5-state base multiplication switching tables: a first one is the modulo-5 multiplication and the other is the 5-state consecutive multiplication, which is shown in the following table as m5c.

| m5c | 0 | 1 | 2 | 3 | 4 |
|---|---|---|---|---|---|
| 0 | 0 | 0 | 0 | 0 | 0 |
| 1 | 0 | 1 | 2 | 3 | 4 |
| 2 | 0 | 2 | 3 | 4 | 1 |
| 3 | 0 | 3 | 4 | 1 | 2 |
| 4 | 0 | 4 | 1 | 2 | 3 |

It turns out that the Matlab program generates one 5-state switching table that cannot be generated by Lab-transforming a base (5-state consecutive or modulo-5) multiplication. That table is m5new, shown below.

| m5new | 0 | 1 | 2 | 3 | 4 |
|---|---|---|---|---|---|
| 0 | 0 | 0 | 0 | 0 | 0 |
| 1 | 0 | 1 | 2 | 3 | 4 |
| 2 | 0 | 2 | 1 | 4 | 3 |
| 3 | 0 | 3 | 4 | 1 | 2 |
| 4 | 0 | 4 | 3 | 2 | 1 |

The table m5new is associative. Using this switching table as a base will generate all the same switching tables by using the above inverters with the Lab-transform. This table thus is Lab-transform invariant. Multiplication-like n-state switching functions wherein an element has itself as multiplicative inverse may not be useful in cryptography wherein powers of generator terms are determined. Each power in that case is either 1 or itself. Thus, one should evaluate those n-state switching tables for such an occurrence. However, these self inversions may be useful in other encryption operations or in error-correcting codes. The availability of this type of functions can be shown to be enabled in not only n-state switching 'multiplication' switching tables with n being prime but also for numbers that are powers of prime numbers.

Furthermore, it is possible to create 'designer' switching tables that meet certain requirements. For instance, the n-state consecutive multiplication has a regular pattern for the location of the symbol 1, which determines the multiplicative inverse of a switching table mn, as mn(a,a$^{-1}$)1. The symbol 1 has a fixed place in the n-state consecutive multiplication table. This enables a simple determination of a multiplicative inverse. Below, as an illustrative example, the 9-state consecutive multiplication table is provided. The multiplicative inverse herein follows a defined pattern.

| mncon | 0 | 1 | 2 | 3 | 4 | 5 | 6 | 7 | 8 | mn mod | 0 | 1 | 2 | 3 | 4 | 5 | 6 | 7 | 8 |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 1 | 2 | 3 | 4 | 5 | 6 | 7 | 8 | 0 | 0 | 1 | 2 | 3 | 4 | 5 | 6 | 7 | 8 |
| 2 | 0 | 2 | 3 | 4 | 5 | 6 | 7 | 8 | 1 | 0 | 0 | 2 | 3 | 8 | 7 | 6 | 1 | 5 | 4 |
| 3 | 0 | 3 | 4 | 5 | 6 | 7 | 8 | 1 | 2 | 0 | 0 | 3 | 8 | 4 | 5 | 1 | 2 | 6 | 7 |
| 4 | 0 | 4 | 5 | 6 | 7 | 8 | 1 | 2 | 3 | 0 | 0 | 4 | 7 | 5 | 1 | 3 | 8 | 2 | 6 |
| 5 | 0 | 5 | 6 | 7 | 8 | 1 | 2 | 3 | 4 | 0 | 0 | 5 | 6 | 1 | 3 | 4 | 7 | 8 | 2 |
| 6 | 0 | 6 | 7 | 8 | 1 | 2 | 3 | 4 | 1 | 0 | 0 | 6 | 1 | 2 | 8 | 7 | 5 | 4 | 3 |
| 7 | 0 | 7 | 8 | 1 | 2 | 3 | 4 | 5 | 6 | 0 | 0 | 7 | 5 | 6 | 2 | 8 | 4 | 3 | 1 |
| 8 | 0 | 8 | 1 | 2 | 3 | 4 | 5 | 6 | 7 | 0 | 0 | 8 | 4 | 7 | 6 | 2 | 3 | 1 | 5 |

The switching table of the consecutive multiplicative switching table 'mncon' has multiplicative inverse 1s located on diagonal that rises when the column number increases. Rather than calculating the location of 1 in the table using for instance the extended Euclidean algorithm one can determine the location of 1 (and thus of the multiplicative inverse) based on the row or column number of a symbol. One can design a desired n-state switching table with any diagonal of 1s at least when n is prime or a power of a prime number. In mnmod above for n=9 the diagonal of 1s starts at (6,2) moves to (5,3) to the top at (2,6) and re-starts at the bottom (8,7) up to (7,7). A similar 8-state multiplicative switching table can be found of which an example m8mod is shown below. With the 1 diagonal starting at the bottom of the 2$^{nd}$ column and going upward to (2,7).

| m8 mod | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 0 | 1 | 2 | 3 | 4 | 5 | 6 | 7 |
| 2 | 0 | 2 | 6 | 7 | 3 | 4 | 5 | 1 |
| 3 | 0 | 3 | 7 | 5 | 6 | 2 | 1 | 4 |
| 4 | 0 | 4 | 3 | 6 | 2 | 1 | 7 | 5 |
| 5 | 0 | 5 | 4 | 2 | 1 | 7 | 3 | 6 |
| 6 | 0 | 6 | 5 | 1 | 7 | 3 | 4 | 2 |
| 7 | 0 | 7 | 1 | 4 | 5 | 6 | 2 | 3 |

Another unexpected result is that there are at least 2 finite fields defined by one n-state multiplicative associative switching table. A first finite field is defined by for instance in 'n is prime' case by a mod-n multiplication switching table and a mod-n addition table. Unexpectedly there is at least one other "addition" that combined with the same multiplicative switching table defines a finite field GF(n). The following switching tables illustrate this for a 7-state case.

| m7 | 0 | 1 | 2 | 3 | 4 | 5 | 6 | scla | 0 | 1 | 2 | 3 | 4 | 5 | 6 | sc7b | 0 | 1 | 2 | 3 | 4 | 5 | 6 |
|---|---|---|---|---|---|---|---|---|---|---|---|---|---|---|---|---|---|---|---|---|---|---|---|
| 0 | 0 | 0 | 0 | 0 | 0 | 0 | 0 |  | 0 | 1 | 2 | 3 | 4 | 5 | 6 |  | 0 | 1 | 2 | 3 | 4 | 5 | 6 |
| 1 | 0 | 1 | 2 | 3 | 4 | 5 | 6 |  | 1 | 2 | 5 | 4 | 0 | 6 | 3 |  | 1 | 6 | 5 | 2 | 0 | 4 | 3 |
| 2 | 0 | 2 | 6 | 5 | 3 | 4 | 1 |  | 2 | 5 | 6 | 0 | 1 | 3 | 4 |  | 2 | 5 | 1 | 0 | 3 | 6 | 4 |
| 3 | 0 | 3 | 5 | 6 | 2 | 1 | 4 |  | 3 | 4 | 0 | 5 | 6 | 1 | 2 |  | 3 | 2 | 0 | 4 | 6 | 1 | 5 |
| 4 | 0 | 4 | 3 | 2 | 1 | 6 | 5 |  | 4 | 0 | 1 | 6 | 3 | 2 | 5 |  | 4 | 0 | 3 | 6 | 5 | 2 | 1 |
| 5 | 0 | 5 | 4 | 1 | 6 | 2 | 3 |  | 5 | 6 | 3 | 1 | 2 | 4 | 0 |  | 5 | 4 | 6 | 1 | 2 | 3 | 0 |
| 6 | 0 | 6 | 1 | 4 | 5 | 3 | 2 |  | 6 | 3 | 4 | 2 | 5 | 0 | 1 |  | 6 | 3 | 4 | 5 | 1 | 0 | 2 |

This unexpected result is caused by in this case by a 7-state self-reversing inverter, represented by [0 1 2 3 4 5 6]→[0 1 6 5 4 3 2]. A Lab-transform of table sc7a based on this inverter creates sc7b, but a Lab-transform of m7 with this inverter leaves m7 unchanged. Almost every associative n-state 'multiplicative' switching table is invariant under a Lab-transform based on at least one n-state reversible inverter, while a corresponding n-state 'additive' n-state switching table is not. Thus when a combination of such an 'additive' and 'multiplicative' n-state switching table define a finite field GF(n), then their above Lab-transformed tables, of which one remains unchanged under certain inverters also define a finite field. For illustrative purposes the symbols 0 and 1 remain unchanged for selected inverters.

It is emphasized (again) that the n-state switching tables that are provided, illustrated and/or used herein are representations of one or more properties of a physical device. The symbols used in the n-state switching tables are a symbolic representation of physical states of a physical device and/or of physical signals. The symbols thus are merely labels that facilitate an understanding of switching behavior. A 0, 1 or 7 or any other symbol merely indicates that they are different from each other. A 0 is not necessarily 0 volt or 0 any other physical entity. It only means that a 0 is assigned to a particular physical state or signal and that it is different from other states or signals being represented by different symbols. States designated with the same symbol are identical states or represent identical or close to identical signals within for instance a certain noise margin. In general a binary "high" signal is represented by a 1 and a "low" binary signal by a 0. Combinations (or words) of bits may be represented by for instance as their decimal equivalent. Words may be processed in their entirety as a unit and thus can be represented by a symbol such as a decimal symbol. However, other representations are possible and would be appropriate, such as letters or colors etc. Such representations may not be helpful in analyzing a performance of a switch device represented or characterized by a switching table.

The n-state switching tables do not perform an arithmetic or mathematical operation, they merely perform a physical switching operation between switching states in which humans provide a meaning.

The 'meaning' of a state is thus provided by its use in a switching table and not by an inherent meaning of a switching state. As explained elsewhere by the inventor, for instance in the 556 application, for instance a state represented by a symbol 0 is not always a zero-element in a 'multiplicative' switching table. Only the state 'z' in an n-state switching table mn for which mn(z,x)=z for all valid states x is the zero element. A switching table that has this property is not and would not be recognized as a valid arithmetical or mathematical operation. Even though terms like addition, multiplication, power of, multiplicative and additive inverse, group field and the like are used herein, it is only applied to enable description and understanding of certain operations. However, all operations herein are physical switching or machine operations and are fully intended to be considered as such.

The Finite Lab-transform (FLT) applies n-state inverters to known primitive operations in cryptographic methods, such as encryption, hash generation and private/public key operations. Primitive computer operations include operations characterized as modulo-n multiplications and operations over finite fields GF(n). Much of the literature assumes that there is only one finite field GF(n) with n a prime greater than 2. [1]. It will be shown that the FLT transforms GF(n), with n being a prime or with n=qp and q being a prime, in another different finite field. The FLT preserves properties such as associativity and distributivity, but may change the one-element and/or the zero-element of an operation. The FLT is achieved by using n-state inverters, which will be explained. Worked-out examples will be provided of FLT modified AES, SHA-2, Diffie-Hellman, RSA and Elliptic Curve Cryptography. An example of a modification of an FLT modified pseudo-random number generator is also provided. Modified Merkle-Hellman knapsack is also illustrated. An extremely large number of FLT modifications is possible while leaving basic integrity of known cryptographic methods intact, enabling easy and secure modifications of known cryptographic methods.

The subject matter, as well as its description, is unusual compared with literature in cryptography. It introduces novel primitive n-state computer functions with n>2. The subject matter falls somewhat between machine arithmetic, which provides machine logic design of arithmetical functions and machine cryptography.

The first unusual aspect is the explanation of operational functionality in terms of n-state computer or switching functions, rather than well-known binary circuits and functions or mathematical expressions. All n-state functions provided and explained in the following were implemented and tested on binary computers with Matlab pro-grams. Rather than a mathematical approach an empirical implementation approach is used.

The second unusual aspect is the lack of mathematical expressions. These are avoided as much as possible. The cryptographic methods that are modified herein are known. One is expected to be familiar with the basic operation of encryption, hash functions, signatures, key generation and Elliptic Curve Cryptography (ECC). The focus is on modification of these methods by way of a functional transformation.

The third unusual aspect is the description of n-state functions by way of computer implemented arrays. This may require getting used to. One reason for this is that there is no agreed upon notation for general non-binary logic functions. One way could be to use standard field/ring/group notations. However, such a notation does not reflect the changes made by the transformation. Further, an n-state equivalent of binary Boolean algebra is not common and every article seems to provide novel notations, it seems. Most known n-state switching functions are a description of equivalent mathematical functions, such as addition and multiplication over finite fields GF(n) or operations modulo-n. There are huge numbers of possible modifications of these functions generated by FLT as explained in this article. For illustrative purposes switching tables or truth tables for small values of n (like n=8) will be used and tables will be represented as n-by-n arrays. An array will be given a name like sc8 and an output will be represented as an element of the array: e.g. out=sc8(i1,i2).

The factual approach herein is that the FLT leaves meta-properties of switching functions unchanged. The focus of the examples is to show how the FLT is applied to known cryptographic methods.

N-State Processing

Gerrit Blaauw, in Gerrit. A. Blaauw, Digital System Implementation, Prentice-Hall, Englewood Cliffs, NJ, 1976 and Gerrit A. Blaauw, Frederick P. Brooks, Jr., Computer Architecture, Concepts and Evolution, Addison Wesley, Reading, MA, 1997, both co-architects with Amdahl of IBM System/360, make a distinction in computer machine design between Architecture (what a designer sees), Implementation (the logic design of functions, such as adders), and the Realization (the physical components). There are many different realization technologies of switching and logic devices and thus description (and testing) on the Implementation level is preferred. Blaauw uses APL to describe (and emulate) parts of logic machines. The functions that Blaauw uses are represented by symbolic operations (like the '∧' for the AND function and the '∨' for the OR operation, which are dyadic operations on 2 input operations).

The symbolic representation makes description by Boolean algebra of binary circuits easy on the logic level. There are just 16 possible 2-input/1-output binary switching functions. Blaauw uses NANDS as adequate connectives. It is relative easy to represent each of these functions with a symbol that is operationalized such as the AND and OR. It is also possible, though not common, to represent a binary operation by its truth table or switching table in a design program. Instead of a symbolic binary operations like 'a∧b' in APL or 'a&b' in C#, one may use the AND truth table as the operator. The AND may be represented as an addressable 2-by-2 matrix using origin 0. This Blaauw/Brooks approach allows the functional design and testing of computer circuits without being concerned with the realization aspects.

The indices of rows and columns start at 0 (hence origin 0) and may be considered input states. Output states are also in origin 0. This representation has as a benefit that an output state can be applied as an input state for a next operation. The representation in matrices or switching tables may be considered awkward and less flexible than symbolic representation. However, there are almost no common symbols for non-binary dyadic operations. Some symbolic representation may be developed for modulo-n arithmetic and for arithmetic over finite fields $GF(2^k)$. However, as in Blaauw's approach one would like to use n-state functions that are at the logic design level, not at the realization or architecture design level. Furthermore, there are enormous numbers of different n-state switching functions (n to the power n squared). Furthermore, n-state switching herein is used for n being a discrete state greater than 2, also called non-binary switching.

Table 501 shown in FIG. 5 has some important properties: 1) it is commutative; 2) it is associative; 3) it is reversible and self-reversing; 4) there is a zero-element which is 0; 5) the output represents a closed operation. The term 'reversible' means that one can recover a first input state from the output state and the other input state. Or: when out=sc8(in1, in2) then in1=sc8(out,in2) and in2=sc8(in1,out). A zero-element is known to be a neutral element z for which out=sc8(z,in2) will generate out-in2 for all in1. In mathematics z is almost always 0, which it is not in this article.

Similar properties exist for properties of the table 502 in FIG. 5: 1) commutative; 2) associative; 3) reversible; 4) there is a zero-element; 5) the output represents a closed operation.

The zero-element 'z' of m8 of a multiplication over GF(8) related to sc8 is identical to the zero-element of sc8 but has a different significance, in that out=m8(z,in2) with out=z for all in2. The one element t has as significance that out=m8(t,in2) with out=in2 for all in2. The one-element in mathematics is mostly 1, but not herein. Furthermore, the one-element t is used to determine a multiplicative inverse. One may detect the zero-element of sc8 as the index that has identity ([0 1 2 . . . (n−1)]) as a row or a column. The zero-element in m8 is the index for which a row or column has identical output states and the one-element is the index for which the row or column is identity.

Reversible n-State Inverters

One purpose of this article may be to modify an n-state switching table as shown in FIG. 5 but maintain key meta-properties. Output states may be modified, and so may be the zero-element and/or the one-element, but properties such as associativity and reversibility should be maintained.

For that purpose the concept of reversible n-state inverter will be introduced. An n-state inverters is a substitution of states in a device. All or part of the states may be substituted. Well known is of course the 2-state or binary inverter [0 1]→[1 0]. The left side of the arrow shows the original states ordered in numerical order. This ordering is for convenience, as in binary and n-state switching there is no requirement about the actual physical value or magnitude of a related signal. The basic binary states are often called 0 and 1 and are ordered as [0 1] with state 0 in the 0 position and the state 1 in the 1 position. The right of the arrow, [1 0], is read as the substitution of the symbols in the corresponding positions to the left of the arrow. Because it is known that origin 0 is used, one may abbreviate the binary inverter as the [1 0] inverter.

There are actually 4 binary inverters: [0 1]→[1 0] (as shown); [0 1]→[0 1] (identity); [0 1]→[0 0] (always off) and [0 1]→[1 0] (always on). The identity inverter and the [1 0] inverter are the only two reversible binary inverters. That is: one can reverse a state that was inverted by [1 0] to its original state by applying [1 0] again. An inverter is reversible if an inverter exists that reverses an output of the inverter to identity. In this case [1 0] is its own reversing inverter and is called self-reversing.

There are n! reversible n-state inverters, including identity. There are 6 reversible 3-state inverters. For instance the inverter [0 1 2]→[2 1 0] is self-reversing. The 3-state inverter [0 1 2]→[2 0 1] has 3-state inverter [0 1 2]→[2 0 1] as its reversing inverter.

The greater the value of n, the greater the number of n-state reversible inverters. For n=8 there are over 40,000 reversible inverters, for n=256 there are over 10 to the power 100 reversible 256-state inverters. Even if one narrows the requirements for applicable inverters (for instance, no state is the same as in the identity) there are still (n−1)! or even when considering other limitations at least (n−5)! n-state inverters to be applied.

A reversible n-state inverter may also be considered to be a reversible transposition rule.

The Finite Lab-Transform or FLT

Existing cryptographic methods are carefully calibrated, tested and tried in practice. It seems that it may be beneficial to modify these methods so they become more unpredictable in outcome if one keeps the modifications secret. However, there may be downsides to modifications: of which the most serious is that the fundamental security may be affected if random changes are applied, rendering the modified methods more susceptible to attacks. Furthermore, it may be unclear how to cause meaningful modifications.

Because finite extension fields of the same order are isomorph, one modification may be an isomorph polynomial transformation. This is not always simple to execute and in a way is predictable for smaller values of n, in particular because for instance the zero-element and the one-element are not being transformed.

The modification that is specified herein, is one wherein basic binary switching functions that operate bit-wise on words of k bits or on binary representations of decimal numbers, are characterized by an equivalent n-state switching function and the n-state switching function is modified so that meta-properties are maintained. For instance operations (like point-doubling on an elliptic curve) with a switching operation, should still be valid with the modified switching operation. In another example one would want to apply an associative n-state switching operation in a Diffie-Hellman key generation.

A simple substitution may be expected to do the trick. But that is generally not the case. One can easily check with the 8-state switching function of FIG. 5 modified by using the 8-state inverter A simple substitution may expected to do the trick. But that is generally not the case. One can easily check with the 8-state switching function of FIG. 5 by using the 8-state inverter inv8-[0 1 4 2 3 7 6 5] to transform the output states or the input states. An immediate effect of this substitution is that there is no longer a zero-element as defined in the meta-properties. It is known that finite fields of the same order are isomorph. However, the creation of isomorph finite fields is up till now easier done with generating irreducible polynomials than with a transformation, which is physically achieved by the circuit as illustrated in FIG. 1.

The FLT is a modification of an n-state circuit or n-state operation of a 2-input/1-output n-state switching function with 3 n-state inverters. Two identical n-state reversible inverters inv1 101 and 102 are placed at the inputs of operation or device characterized as operation 'op' or 'scn' and a reversing n-state inverter 103 that reverses inv1 is placed at the output. The operation can be characterized as follows: d=scn(a,c); a=inv1(i1); b=inv1(i2) and out=rinv1 (d). This leads to: out=rinv1(scn(inv1(i1),inv1(i2))).

FIG. 14 provides a screenshot 1400 of Matlab computer instructions that generate a reversing n-state inverter from an n-state inverter "inv".

As simple as it looks, the above FLT preserves meta-properties of the n-state switching function scn but makes it appear different.

Examples of FLTed n-State Switching Function Tables

In this section some examples of FLTed n-state switching functions will be provided that have significance for cryptographic operations. The first FLTed switching function is of the above 8-state switching function which is represented as an addition over GF(8). Switching functions that are characterized as additions over GF ($n=2^k$) are often part of encryption/decryption operations such as AES and of hash function generators. One reason being that they are self-reversing, they are easily realized as bit-wise XORs, and they are simple ways to capture input signals to be entered into a procedure, such as SHA-2. In that sense additions over GF ($n=2^k$) are probably one of the dominant switching functions in cryptography.

One can check that an operation characterized by the above 8-state table is commutative and associative. The operation sc8mod is still self-reversing. Furthermore, there is a neutral element 'e' or zero-element for which sc8mod (e,in2)=in2 for all in2. The zero-element in the FLTed switching function is 6. Furthermore, the elements of an FLTed table are not a simple substitution of the elements of the original table. Furthermore, an inverter may be a self-reversing inverter. It appears to be counterintuitive to first convert inputs, generate a result with a function and then invert the result with the same inverter to get a result that is different from not using inverters. However, the above demonstrates the resulting FLT modification.

In certain cases, wherein an order of processing is maintained, be it in reverse order, the associative aspect of the functions may be not important. In one case one may still want the commutative and the self-reversing properties. In that case n-state switching functions characterized by the formula scn(i1,i2)=(n-i1-i2-offset-1)mod-n. The variables i1 and i2 are the row and column indices and offset is an integer number. The simplest implementation is for offset=0.

Another useful n-state switching function is the one that is characterized by modulo-n addition. The reversing function is of course the modulo-n subtraction. Modulo-n subtraction is not associative and is not commutative. Thus, in applications one has to keep careful watch on order and place of these switching functions. However, the reversing properties of the subtraction are preserved in the FLT.

FLT of Multiplications or Multiplication-Like Operations

In a next example of the FLT a 7-state or modulo-7 multiplication will be modified. The modulo-n multiplication or a multiplication over GF(n) with n being prime is an important function in cryptography. The 7-state inverter applied in the FLT in the example is inv7=[6 5 4 3 1 0 2].

One can see that the zero-element of the FLTed function is 5 and the one-element is 4. The FLTed function m7m is associative and reversible for all elements except the zero-element. The FLT is not a direct substitution. This provides unpredictability for its use in cryptography.

An important aspect of using multiplications modulo-n or over GF(n) in cryptography is the existence of a multiplicative inverse. A definition of a multiplicative inverse in GF(n) is that each element of GF(n) a (except the zero-element) has an inverse a-1, being also an element of GF(n), of which an operation $OPn(a,a^{-1})=e$, wherein 'e' is the one element. For n being reasonably small, for instance n=1000 or smaller) the entire FLTed switching table may be stored and one searches a row or a column for the index for which the output is 'e.' For n greater than 1000, for instance up to 10,000,000,000 one may generate all output values and determine the value for which 'e' is generated. One may also apply a modified Extended Euclidean Algorithm (EEA), using the FLTed operations, to determine the inverse in the FLTed function of a selected element. Because the FLT is not a direct substitution, it is not possible to determine the new inverse directly from a reverse substitution. One may also apply the standard EEA and perform reverse inversions.

A switching device that performs mod-7 multiplication m7 has inverters inv7 at its inputs and a reversing inverter rinv7 at the output. Inverter inv7=[6 5 4 3 1 0 2] and its reversing inverter is rinv7=[5 4 6 3 2 1 0]. The FLT preserves major properties such as having a multiplicative inverse. The multiplicative inverse of m7m is determined for its one-element 4. Out=4 for m7m is generated from output e=1 of m7. One may say that out looking towards m7 sees inverter inv7, which is the reverse of rinv7. Furthermore, one wants to determine the multiplicative inverse of i1=6. Input i1=6 generates a, which may be determined with inv7 as inv7(6)=2. With the EEA the 'normal' multiplicative inverse of a=2 of m7 can be determined, which is c=4. The output of inv7 looking towards i2 sees the reverse of inv7 which is rinv7. One determines i2=rinv7(4)=2. Or m7m(6,2)=4, which can be checked in the above switching table of m7m.

The above approach is useful for large and very large values of n, wherein rule-based inverters have to be applied.

Rule Based Reversible n-State Inverters

For very large values of n, for instance as applied in RSA methods, it may not be possible to store an entire n-state reversible inverter. In that case a rule based n-state inverter may have to be used. The rule must be reversible to represent, and generate an unambiguous result that can be applied to the execution of individual FLT operations. For instance, in RSA and Diffie-Hellman, terms like ga are developed. It is clear that $g^a=g*g*g* \ldots *g$. Or $g^a$ is the result of at most (a−1) multiplications, for ignoring the 'square and multiply' method. The FLT requires an n-state inversion at each input. The n-state inverter may be considered a substitution, wherein an input is converted to an output. All rows and columns in a switching table of an n-state addition over GF(n) are reversible n-state inverters, and with exception of the row/column for the zero-elements, so are the rows and columns in the multiplication over GF(n). In RSA the addition/multiplication may be modulo-k, wherein k is not prime. All rows/columns in the modulo-k addition are still reversible inverters, but that is no longer the case in an arbitrary multiplication mod-k. However, all rows/columns with an index that is relative prime with k, are reversible k-state inverters. One rule-based k-state inverter with k being very large, is to select/generate a number that is smaller than but relative prime to k. Assume that number to be p. The multiplier *p-mod-k is a k-state reversible inverter. However, it still has the zero-element 0. To modify also the zero-element, one may add mod-k another number q to the product of the multiplication. The inverse of an input i1 then becomes a=((i1*p)+q)mod-k. One can determine i1 from a through: i1=(a−q)*p−1 mod-k.

If the n in n-state is relatively small, it may be expected that an attacker will generate n-state inverters that may be deemed obvious. For that reason, in accordance with an aspect of the present invention, a random n-state inverter is generated by a computer program, wherein the generated n-state inverter is preferably different from a rule-based inverter and thus highly unpredictable. For instance the Matlab statement inv=randperm(n) will generate a sequence of 256 different integers ranging from 1 to 256 without any element repeating, which is of course a 256-state reversible inverter. One may easily up this number to n=10,000 or even greater.

The number n=256 is significant because a byte is 8 bits and is a 256-state word. There are in the order of 10500 different 256-state reversible inverters. One approach in accordance with an aspect of the present invention is to generate, for instance with inv=randperm(256) large series (in the 10,000s) of inverters, create the FLT of a base 256-state reversible function and select only those inverters that create FLTed functions that have a small set, preferably less than 10%, more preferably less than 5% and most preferably less than 1% (for instance 128) states in common with the original function and preferably also with each other. In one example, the inventor generated a set of 1000 random 256-state inverters that meets the above criteria.

While an example was provided above for n=256, one may easily expand that to n being in the order of 10,000 if so desired. In accordance with an aspect of the present invention n may be any n=2q, with q greater than 1, preferably q greater than 2, or more preferably q>4, or more preferably q>7.

In many cases cryptographic operations are applied to words of 32-bits. In many cryptographic operations processing takes place bitwise on words. In that case one may split up a word of for instance 32-bits in 4 words of 8-bits and apply an FLT to these 8-bit words. This applies to hashing as well as encryption operations. Hashing is a one way operation and should not give any problems. In encryption one has to make sure that the splitting is reconstructed properly during decryption. Again, the inventor has demonstrated in for instance AES encryption/decryption and Cha-Cha20 encryption/decryption that this works. It will be demonstrated for hashing approaches further below.

Repeated FLTed Operations (Exponentiation)

Exponentiation in cryptography is repeated application of an operation, such as addition or multiplication. One issue is then if exponentiation of FLTed functions leads to repeated execution of the FLT for the individual function, thus creating a much slower overall operation in methods that apply exponentiation like RSA and Diffie-Hellman.

Fortunately that is not the case. It turns out that the basic structure of the FLT leads to considerable simplification of exponentiation of FLTed functions. The exponentiation of an operation 'opn' FLTed with inverter 'inv' and its reverse 'rinv' as (i1)4.

There are two simplifications that can be applied. One—the inverse of input i1 or inv(i1) is determined at the beginning of the exponentiation and can be stored and does not have to be recalculated. Second, the reversing inverter rinv at the output is followed by an inverter inv at the input of the next stage. However inv(rinv(i1))=i1 because in combination rinv and inv form identity.

For an exponentiation with an FLTed function 'opn' requires only insertion of inverters 'inv' at the inputs of the first 'opn' operation and an inverter 'rinv' at the output of the last operation 'opn.' As an example determine 64 for opn=m7m. The 7-state function m7m is the FLTed multiplication modulo-7 using inverter inv7=[6 5 4 3 1 0 2] and its inverse rinv7=[5 4 6 3 2 1 0]. Applying m7m 3 times on 6 (m7m(6,6)=2; m7m(6,2)=4 and m7m(6,4)=6) generates 6. Applying inv7(6)=2 on both inputs, followed by applying m7 3 times, generates 2 (m7(2,2)=4, m7(2,4)=1 and m7(2,1)=2). Applying rinv7 generates rinv7(2)=6.

Examples of FLT Modified Cryptographic Methods

Modification of known cryptographic methods will be illustrated, usually referring to published standards.

Zero-element not 0 and/or one element not 1

Two computer functions or operations are represented by an arithmetical operation. Those are the addition and multiplication. Commonly in cryptography one uses these operations over finite field GF(n) with n a prime number or GF (n=$q^p$) with q a prime number and p being and integer 1 or greater. Often one uses modulo-n operations for which (if n is not prime) the multiplication does not always have a multiplicative inverse. Commonly all computer operations additions ADD(a,b) have a zero-element z so that ADD(z, a)=a for any valid a and z is 0. In the multiplication MUL(a,b) the zero element has the property that MUL(z,a)=z for any valid a. Furthermore, a multiplication MUL(a,b) has a one element e so that MUL(e,a)=a for any valid a. The one element e is commonly 1. The FLT as disclosed herein may change the representation of z and e. It may be modified so that the FLTed operations may have a zero-element that is not 0 and/or a one element that is not 1.

Some cryptographic operations involve multiple operations. Rather than modify each operation in accordance with an FLT one may modify by FLT or FLT related (n-state inverter) modification of one or more components in a cryptographic operation. This may achieve a customization that is difficult to attack and assures that only devices with access to the FLT or to the FLT related n-state inverted is able to correctly perform the cryptographic operation.

One such cryptographic operation is a digital signature. A digital signature involves a message or document and a characterization of the message or document, a private key to generate a public key and/or a signature. A verifier receives the message or document with the signature and uses the signature with the public keys in combination with a characterization of the message or document to verify that the signature is correct. Commonly, a characterization in many digital signatures is a hash generated from a message or document. The hash can be generated by applying commonly known hash methods such as SHA-2 or SHA-3 as standardized in related FIPS documents. One does not want to generate a completely new hashing operation for generating signatures. To customize signatures, one may modify the hashing method with an FLT to modify some of the internal hashing functions. This does not modify the secure and proven data flow internal to the hashing method but dramatically and unpredictably modifies the outcome of the hash value.

For instance SHA-256 as described in FIPS 180-4 Aug. 2015, which is incorporated herein by reference, requires bitwise operations on words of bits in accordance with section 4.1.2 in FIPS 180-4: Ch(x,y,z)=(x∧y)⊕(x∧z) and Maj(x,y,z)=(x∧y)⊕(x∧z)⊕(y∧z) (see equations (4.2) and (4.3) in sections 4.1.2 of FIPS 180-4). These expressions have 3 variables. Instead of a bit, an n-state equivalent of words of p bits will be considered herein. As illustrative example, words of 8-bits as 256-state symbols are considered. That is: instead of considering bitwise operations on AND and XOR operations, a device operating on 8-bit words, or 256-state operations, will be created and modified by an FLT. Unless a computer is programmed to apply the FLT to a required hash, it will be unable to verify a signature. This renders a signature more secure. Also because known attacks will be ineffective as long as the modification is held as a secret between two machines.

FIPS 180-4 describes a series of hashing configurations, including SHA-1, SHA-224, SHA-256, SHA-384, SHA- 512, SHA-512/224 and SHA-512/256 which may all be modified with the herein taught processes and/or modifications.

In some cases not the entire hash is used but only part of the hash. This does not affect the generation and verification of a signature. As an example one may use the Digital Signature Algorithm DSA as in FIPS PUB 186-2 Digital Signature Standard (DSS) 2000 which is incorporated herein by reference. This document defines in Section 5 on page 8 and following that $s=(k^{-1}(SHA-1(M)+xr)) \bmod q$ with SHA-1(M) being a 160-bit string of which the computation conversion is provided in Appendix 2.2 of FIPS PUB 186-2. An FLT of SHA-1(M) by combining words of 8-bits into a 256-state symbol and modifying the related XOR256 and AND256 operations by a 256-state reversible inverter will still generate a 160-bit string. However, the new FLT string using an FLTed hash $SHA_{FLT}$-1(M) may only be generated when the correct FLT (or related 256-state inverter) is available to communication computers.

A modification of a hash, or part of a hash, by FLT is illustrated above for certain SHA expressions, such as SHA-1 and SHA-2. However, such modification works for any hash that either generates a sequence of bits or n-state symbols with n>2. In using a hash in for instance DSA one wants a characterization of the message M that is smaller than q (or mod-q). One may cut-off excess bits from the generated hash value. The DSA signature works with mod-q and mod-p. The FLT of the hashing may be based on an n-state FLT that is independent (and smaller than q. In general a hashing, such as SHA-1, SHA-2, SHA-3 and MD5 and others work on bitwise operations on words of bits. For instance RIPEMD160 and 360 hashing use binary operations bitwise on words of bits, which may be FLTed. For instance words of 8 bits or 32 bits are processed. But rather than doing this bitwise and in accordance with an aspect of the present invention a word of k-bits may be considered to represent a $2^k$-state symbol. And the operation may be considered to be a $2^k$-state operation which may be modified by a $2^k$-state FLT. Accordingly, even when the signature is generated and verified by p-state and q-state operations, the FLT may be an n-state modification of a component (the hash H(m)) of the signing or verifying operation.

A modification in modifying a 2-term signature is by treating signature [r s] as for instance a Gaussian integer [r+is] with a real component r and an imaginary component s. Keeping in mind that this merely presents a computational approach. There are in computer technology no such things as real and imaginary signals. The signature data that is to be transmitted is then (r+is) FLT or the FLTed multiplicative inverse of (r+is), which is defined as: $(r+is) \circledast_{FLT}(r+is)^{-1}{}_{FLT}=E_{FLT}$. $\circledast_{FLT}$ is the FLT of the t-state multiplication and $e_{FLT}$ is the one element of $\circledast_{FLT}$. In general $i^2=-1$ in Gaussian integers. This leads to: $1/(r+is)=(r-is)/\{(r+is)*(r-is)\}$. Or $1/(r+is)=(r-is)/(r^2+s^2)$. One may simply check that $(r^2+s^2)/(r-is)=(r+is)$ in a t-state operation.

Other FLTed combinations of two or more public data elements are possible. For instance two elements R and S may transmitted as $R_{FLT}$ and $R^{-1}{}_{FLT}+S^{-1}{}_{FLT}$ or as $R^{-1}{}_{FLT}$ and $R_{FLT}\circledast_{FLT}S^{-1}{}_{FLT}$. Or as any FLTed combination of n-state data-elements wherein data-element itself may be modified in accordance with the FLT related inverter and using an FLTed operation. The modifications are all reversible, in that access to the n-state inverter allows a computer to untangle the received data into the original data element from which the transmitted and FLTed data was generated.

Any digital signature scheme that applies a hash function may apply at least an FLT of the hash function. In case of signature schemes like RSA and Schnorr digital signatures one may also FLT n-state switching functions that are used to generate public and/or private keys and/or intermediate signature elements.

The RSA signature is related to $s=h^d$ with d a private key and with exponentiation operations being modulo-n as in RSA encryption. A verifier receives the message m and signature s and has a public key e and computes $v=s^e$. This should generate hash H(m).

The RSA signature in essence uses the same approach as in RSA encryption. In the signature as usual not a message per se is used but rather a hash H(m) of a message m. One may call the above "schoolbook" RS or "schoolbook RSA signature." In practice additional measures may be used to ensure security. However, the basic principle remains the same. One may FLT the exponentiation or multiplication in accordance with an FLT that is known to both the signer and the verifier.

HMAC as defined in FIPS-PUB 198-1 entitled The Keyed-Hash Message Authentication Code (HMAC), 2008 which is incorporated herein by reference defines a keyed MAC as: MAC(text)=HMAC(K, text)=H((K0⊕opad)∥H ((K0⊕ipad)∥text)), with K as secret key and padding opad and ipad and as illustrated in FIG. 1 of FIPS 198-1. The operation ⊕ is a bitwise XORing of bits in the words of the HMAC operation. In accordance with an aspect of the present invention at least a set of q bits in two words in the HMAC operation are treated as an $n=2^q$ symbol and are combined by an operation $\oplus_q$ which is the FLT of operation ⊕ based on an $n=2^q$ reversible inverter.

Zero-element 0 and/or one element 1 in FLTed cryptographic method.

In accordance with an aspect of the present invention, an FLTed is applied wherein the zero-element of the FLTed switching function remains 0 and the one-element of the FLTed switching function remains 1 but other elements are modified. This may be achieved by applying an inverter defined by inv=[0 1 . . . ] which has a reversing inverter rinv=[0 1 . . . ]. One has to keep in mind that certain extension fields, for instance GF ($n=2^k$), may be generated by such an inverter. It is believed that operations generated in known extension fields by FLT as in FIG. 1 is entirely novel. However, it may be susceptible to attacks as an attacker may try to use known extension fields as generated from irreducible polynomials. In accordance with an aspect of the present invention one or more FLTs are provided with zero-element 0 and one-element 1 that cannot be generated by irreducible polynomials over the related base field.

Keyword Generation by Modified Hashing Methods

One of the recognized problems in creating secure data exchange between two computing devices connected through an insecure network is how to establish a common key word that can be used by the connected parties to encrypt and decrypt the transmitted data. This issue is especially urgent when keywords need to be changed. Cryptography experts are generally adamant that a regular change of passwords and/or keywords that are used for authentication, signatures and encryption are changed often to limit attackers' opportunities to break the security. For instance the Advanced Encryption Standard (AES) encryption method is deemed fairly safe. One of the effective effects of attacking AES is to obtain the keyword. This problem is exemplified in traffic between a central server and a user device that seeks ad hoc connection. Such connections take place by the thousand and millions per day, for instance between Google servers, or Amazon AWS servers and user devices. In effect any ad hoc connection between two devices has this problem.

A solution to this problem are the existing and proposed algorithms of the Public Key Infrastructure (PKI) also known as Public Key Exchange (PKE). This approach is based on solving a computational problem by a machine based on one or more public keys and one or more private keys. The Diffie-Hellman method is an example of PKE. So is Elgamal and RSA (Rivest Shamir and Adleman). RSA is different from Diffie-Hellman (DH) in that it is an encryption method. However, it is so computationally involved that RSA in general is used for establishing a keyword or a signature and not to encrypt lengthy messages or files. Both RSA and DH have in common that both methods require lengthy computational efforts by a computer. The breaking of a strong PKE is made difficult by using relatively long private keywords. In general it is required for an attacker to discover a private keyword in a PKE data exchange to determine a keyword. However, once the keyword is cracked an attacker can use it to decrypt the encrypted data for which it is used.

Several successful attacks on DH and RSA have been developed over the years. Years ago RSA parameters based on a 512 bit keyword were deemed secure. Right now, because of successful attacks, the length of a secure keyword is recommended to be 4096 bits to achieve security against attacks. The increase of size of keywords puts performance pressure on computers as it takes longer to compute a keyword. Some relief can be found in applying Elliptic Curve Cryptography (ECC) which is computationally faster than more classical methods.

However, both current DH and RSA methods are susceptible to Quantum Computer (QC) attacks by applying for instance Shor's algorithm that is used to solve factoring and discrete logarithm based computational routines. In essence this means that an attacker who has access to a working QC with sufficient stable qubits is able to discover the PKE keywords and can use them to decrypt encrypted methods that were presumed to be secure. This is of course not acceptable and methods are being developed that would be less susceptible to QC attacks. The National Institute of Standards and Technology (NIST) is currently conducting a contest to establish a recommendation on a secure PKE and Signature method. This program is known as Post-Quantum Cryptography (PQC). All publications in this program are available from NIST website https://csrc.nist.gov/projects/post-quantum-cryptography and its subpages and are all incorporated herein by reference. Some of the proposed Post-Quantum methods in this program are Classic McEliece, Lattice based methods, Isogeny based methods and Multi-variate methods.

While secure against Post Quantum attacks, many of these proposed methods have currently performance issues. They either require lengthy computations, generate long keywords and/or require significant bandwidth to establish a keyword. Methods like Isogeny based SIKE/SIDH has made tremendous progress in realizing speedy generation of keywords. However, from many comments in the cryptographic community it is clear that actual users are not ready to implement any of the proposed methods on a massive scale.

Apart from QC attacks, current attacks have become more effective and there are few immediate solutions beyond increasing size of parameters.

Application of the FLT provides an effective solution to cheaply and easily generate high security keywords, which may be called hyper-secure as compared to current PKE methods.

One aspect of generating a hyper secure keyword is by using a message digest or hashing method. The disadvantage of a known hashing message is of course that it is known. And anyone with the same hashing method is able to generate the same hash from the same input. This is the purpose of a secure hashing method. Security of a good hashing method like SHA256 and others is that it is virtually impossible to generate a preimage of a hash and the chance for a collision is negligible. That is, it is impossible to fake or to modify a hash value without detection.

A hashing method can be modified by applying an FLT to the applied computing functions.

FLT in Hashing/Message Digest Generation

A message digest herein is defined as a cryptographic hash function or processing operation on an input signal represented by a string of digits resulting in an output signal represented by a different string of digits and created by a one-way processing circuit, one-way meaning that no reversing circuit exists. To illustrate the FLT in hashing applications, the SHA-2 standard FIPS 180-4 which is incorporated herein by reference, will be used. The term message digest There are many hashing/message digest algorithms. Virtually all apply bitwise XOR operations on words of k bits. A main purpose of the application of k XORs is to enter or capture message data from which a hash value has to be generated. Bitwise XORing of words of bits is a vital part of additional steps in known SHA algorithms, such as the sponge mechanism in SHA-3.

One may want to modify a hash procedure to generate a new, unknown result from a same input, compared to the original hash procedure. This can be used for instance to detect if a man-in-the middle attack is in play. One may also modify a defined hash procedure to increase unpredictability of a hash value of a message. Or, a hashing procedure may be modified to create a different type of crypto currency mining.

Bitwise XORing often takes place in hashing on words with a large bit-count, like 32, 64, 512 or even higher. Depending on how powerful a processor is, or the need for more security, a word of k bits may be divided in multiples of p bits, for instance in bytes of 8 bits. The bytes (or words of p bits) are treated as $2^p$-state symbols. The addition over $GF(2^p)$ which represents bitwise XORing of p bits, can then be FLTed as for instance explained above as related to AES.

Procedures like SHA-2 and also SHA-3 also include processing that change outputs. These processes can be FLTed, while leaving a basic structure in place. For instance SHA-256 as described in requires bitwise operations on words of bits in accordance with section 4.1.2 in FIPS 180-2: $Ch(x,y,z)=(x \wedge y) \oplus (\neg x \wedge z)$ and $Maj(x,y,z)=(x \wedge y) \oplus (x \wedge z) \oplus (y \wedge z)$ (see equations (4.2) and (4.3) in sections 4.1.2 of FIPS 180-4). These expressions have 3 variables. Instead of a bit, an n-state equivalent of words of p bits will be considered herein. As illustrative example, words of 3-bits as 8-state symbols are considered. That is: instead of considering bitwise operations on AND and XOR operations, a device operating on 3-bit words, or 8-state operations, will be created and later modified by an FLT. Details on $Maj(x,y,z)$ and other aspects of SHA-2 are found in FIPS PUB 180-4 downloaded from https://nvlpubs.nist.gov/nistpubs/FIPS/NIST.FIPS.180-4.pdf which is incorporated herein by reference.

Figure 3:
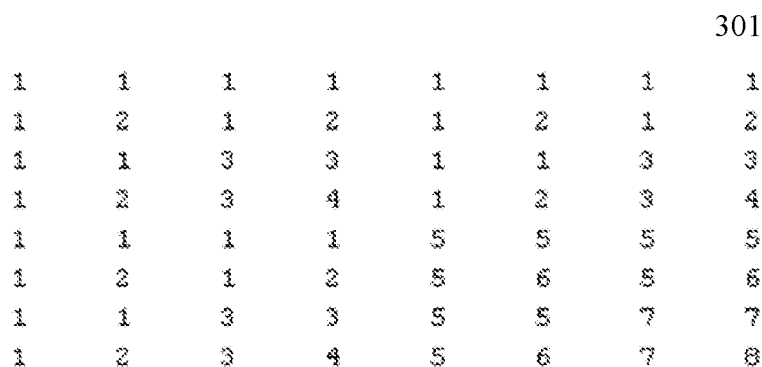

Table 301 in FIG. 3 shows a computer screenshot of a Matlab generated AND8 switching function. It is a decimal representation in origin-1 of a bitwise AND operation on bit pairs in 2 words of bits. For example bitwise [0 0 1 1] A [0 1 0 1] generates output [0 0 0 1] or decimal origin-0 $3(AND8_0)5=1$ in decimal or $4(AND8_1)6=2$ in origin-1. Table 401 in FIG. 4 shows a computer screenshot of a Matlab generated OR8 switching function based on bitwise ORing of 3-bits words. These n-state functions may be modified with an FLT. The NOT function ¬x is also performed bitwise. The inversion NOT8 [1 0 1 0]=[0 1 0 1] or $NOT8_0(10)=5$.

There are different opportunities for customization in the SHA standard. For instance Hash Values (h) which are fractional parts of the square roots of the first 8 primes as well as Initial Round Constants. These may be modified. Furthermore operations include addition of words with carry modulo-2. One of ordinary skill will realize that all these operations may be modified in accordance with an FLT or related n-state inverter(s) in accordance with one or more aspects of the present invention. In accordance with an aspect of the present invention at least one function as described in section 4.1 of PUB FIPS 180-4 is FLTed. One may also modify at least 1 of the constants as provided in section 4.2 of PUB FIPS 180-4.

In SHA-256 a message schedule Wt is computed as explained in section 6.2.2 of PUB FIPS 180-4. Step 3 in section 6.2.2 of PUB FIPS 180-4 teaches performing 64 iterations of step 3 which includes the functions Ch(e,f,g) and Maj(a,b,c) that each or one of each may be FLTed. These functions distribute bits over words of bits. One may apply an FLT wherein the 0 element remains 0. Because step 3 goes through 64 iterations one may apply an FLT to at least 1 iteration of step 3. One may also apply the same FLT to more than 1 iteration of step 3. One may also apply the same FLT to all 64 iterations of step 3. One may also apply at least 2 different FLTs to step 3. One may apply 2 different FLTs to different instructions in a single iteration of step 3. One may also apply one FLT to one instruction in an iteration of step 3. One may also apply different FLTs to different instructions in one or in more than one iteration of step 3.

A hashing method such as defined in PUB FIPS 180-4 has repetitive steps, known as iterations, repeats or rounds. In accordance with an aspect of the present invention at least one step in a hashing method has an FLT applied. When a step in a hashing method is a step that is repeated then at least one of the steps that is being repeated has an FLT applied at least once. When a step in a hashing method is a step that is repeated then at least one of the steps that is being repeated has an FLT applied at least twice. In accordance with an aspect of the present invention, an FLT that is applied more than once is the same FLT. In accordance with an aspect of the present invention, an FLT that is applied more than once has at least two different FLTs.

In the above SHA-2 has been used as an illustrative example of an FLTed hashing method. It should be clear to one of ordinary skill that the FLT may be applied to almost any computerized hashing method. For instance the older and broken MD5 hashing method also has functions that may be FLTed. In fact, FLTing steps in MD5 will make it secure again against attacks. The same applies to SHA-1. Furthermore, the current hashing methods such as SHA-3 and BLAKE2 apply bitwise XORing or other bitwise switching operations on words of bits. Furthermore many hashing methods apply mod-n addition with $n=2^k$. One may FLT these addition operations also. In one embodiment one may leave the zero-element of such an FLT remain 0.

Accordingly, one may create a private and customized and unbreakable FLTed hashing method from existing and even broken hashing methods. It should be clear that a broken hashing method that is FLTed and the FLT is known to an attacker that the known FLTed hashing method still can be broken. On the other hand, even if an attacker knows or guesses the applied hashing method (let's say MD5) but does not know the FLT then even when the input to the FLTed method is known, the attacker will be unable to generate the FLTed hash if the FLT and/or the steps that are FLTed are unknown. In general one wants to protect the reconstruction of a secret input against a known hash, but the FLT further protects via a secret FLT a hash from a known input against attacks. Furthermore, an FLT of an unbroken hashing method like SHA-256 provides an additional level of protection against reconstructing the input. Furthermore, FLTing unbroken hashing methods allows for customization of hashing of exchanged data. For instance in a man-in-the middle attack an attacker may intercept a message, modify it and generate the correct hash with a known and unbroken hashing method which will be authenticated at a receiver end. For security reasons a response message may be hashed with an FLTed version of the hashing method. An attacker with no knowledge and access to the FLTed hashing method is unable to modify either the response message and/or the FLTed hash of the response message adequately, alerting a receiver that the response message is not authentic to the intended message.

It is further observed that an FLTed cryptographic method in general provides an output that is by itself indistinguishable from a non-FLTed method as far as for instance encryption and hashing are concerned. That is: an attacker is generally unable to tell from data from FLTed methods that the method was FLTed. An exception to that may be outputs (public keys) in Elliptic Curve Cryptography (ECC). There, if not-FLTed parameters are published and an FLTed public key is transmitted, an attacker may check if such public key is on the required Elliptic Curve. One can take counter measures that ensures that public data and public parameters are consistent. This must be an item of interest to be dealt with if one wants to keep secret that an FLT was used. One the other hand, especially for large n-state parameters as used in ECC, the number of possible FLTs is so large that revealing that an FLT was used has almost no relevance upon the security of the method.

FLT in Hashing/Message Digest Generation

To illustrate the FLT in hashing applications, the SHA-2 standard FIPS 180-4 which is incorporated herein by reference, will be used. There are many hashing/message digest algorithms. Virtually all apply bitwise XOR operations on words of k bits. A main purpose of the application of k XORs is to enter or capture message data from which a hash value has to be generated. Bitwise XORing of words of bits is a vital part of additional steps in known SHA algorithms, such as the sponge mechanism in SHA-3.

One may want to modify a hash procedure to generate a new, unknown result from a same input, compared to the original hash procedure. This can be used for instance to detect if a man-in-the middle attack is in play. One may also modify a defined hash procedure to increase unpredictability of a hash value of a message. Or, a hashing procedure may be modified to create a different type of crypto currency mining. An FLTed hashing method may also be used to generate a common but secret keyword, for instance to be applied in an encryption/decryption such as AES. In that case, the secret hash (or FLTed has, or series of secrete hashes wherein at least one hashing is FLTed) generates a keyword much faster than known PKE methods such as RSA and DH. An additional benefit is that generally except a one-time and one-direction data exchange of public data no other data exchange is required and attacks are only possible on the use of the secret keywords in encrypted data.

Bitwise XORing often takes place in hashing on words with a large bit-count, like 32, 64, 512 or even higher. Depending on how powerful a processor is, or the need for more security, a word of k bits may be divided in multiples of p bits, for instance in bytes of 8 bits. The bytes (or words of p bits) are treated as 2P-state symbols. The addition over GF(2P) which represents bitwise XORing of p bits, can then be FLTed as for instance explained above earlier and as illustrated in FIG. 5.

Procedures like SHA-2 and also SHA-3 include switching operations or processing that change outputs. These processes can be FLTed, while leaving a basic structure in place. For instance SHA-256 as described in FIPS 180-4 requires bitwise operations on words of bits in accordance with section 4.1.2 in FIPS 180-4: $Ch(x,y,z)=(x \wedge y) \oplus (\neg x \wedge z)$ and $Maj(x,y,z)=(x \wedge y) \oplus (x \wedge z) \oplus (y \wedge z)$ (see equations (4.2) and (4.3) in sections 4.1.2 of FIPS 180-4). Herein $\wedge$ is the binary AND switching function, $\oplus$ is the binary XOR switching function and $\neg$ is the inversion of the related signal. This inversion in words of bits applies bitwise to each bit is a words of bits. Accordingly word [0 0 0]=0-dec will be inverter to [1 1 1]=7-dec and [1 0 1]=5-dec to [0 1 0]=2-dec in origin-0. These expressions Ch and Maj have 3 variables (x, y and z). Instead of a bit, an n-state equivalent of words of p bits will be considered herein. As illustrative example, words of 3-bits as 8-state symbols are considered. That is: instead of considering bitwise operations on AND and XOR operations, a device operating on 3-bit words, or 8-state operations, will be created and later modified by an FLT.

A function AND8 in binary form is created by bitwise AND operations of 3 bits in corresponding positions in the input words. One may represent the switching table in decimal form, which is shown as a screenshot of a computer generated 8-state table in FIG. 3 as 301. Also shown are the screenshot of Matlab computer generated decimal tables of OR8 as a result of bitwise OR operations of 3-bits words in FIG. 4 401 and the screenshot of Matlab computer generated decimal tables of XOR8 as a result of bitwise XOR operations of 3 bits words in FIG. 5 501, all in origin−1.

Similar combined functions are for instance used in MD5, such as $F(B,C,D)=(B \wedge C) \vee (\neg B \wedge D)$, $G(B,C,D)=(B \wedge D) \vee (C \wedge \neg D)$; and $I(B,C,D)=C \oplus (B \vee \neg D)$, with $\vee$ representing the binary OR switching function.

All the above composite switching functions have in common that there is a uniform distribution of n-state symbols over all possible output states when considering all possible input states. For instance the 8-state switching function Ch8(X8,Y8,Z8) may be represented by a 3-dimensional switching table of 8 8-by-8 switching tables, each output in that table being an 8-state symbol. One when runs all possible input combinations, one will get a uniformly distributed output with 64 occurring symbols for each of the 8 states. This may prevent an n-state bias in the actual hash. The same lack of bias is in any of the above composite functions.

Figure 6:
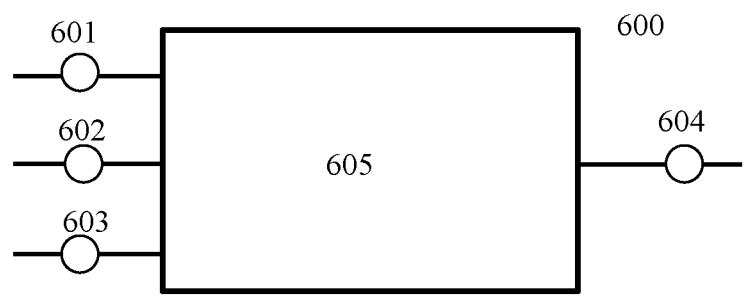
FIGS. 6 and 7 are diagrams of a device that modifies a switching operation in accordance with various aspects of the present invention.

In accordance with an aspect of the present invention an FLT is applied to computer computation of one of the above hashing expressions. This is illustrated in FIG. 6 wherein a circuit 605 with at least 3 inputs is FLTed by input inverters 601, 602 and 603 respectively. These inverters may be n-state reversible inverters. These inverters are preferably the same inverters, but they need not be. Furthermore an output is provided with an n-state inverter 604, which may be a reversing inverter of one of the input inverters. Inverter 604 may also be different from other inverters as long it is a reversible n-state inverter.

A screenshot of Matlab computer instructions that perform in accordance with the diagram 600 is shown in listing 1100 in FIG. 11. FIG. 15 provides a screenshot 1500 of Matlab computer instructions that generate as output 8-state signals in accordance with an 8-state inverter modified 3-bit bitwise processed function Ch(x,y,z) as defined in SHA-256 for instance.

One is reminded that hash functions such as MD5, SHA-256 and SHA-3 are one-way functions and that reversal of these functions is preferably impossible. The FLT keeps basic properties of switching functions intact. For instance the Maj and Ch functions have no bias in output. This remains so after applying an FLT. It may not be required that the bitwise XOR represented as an $2^q$-state function remains associative or even commutative. However, changing these properties by using different inverters at inputs and outputs that do not comply with the above stated FLT rules may be applied and is explicitly provided as an embodiment of a changed function in accordance with an aspect of the present invention. In order to rely on the known security of published standards such as MD5, SHA-256 and SHA-3, the examples herein will apply the FLT in order not to introduce uncertainties about security. However, a consequence of using an FLT-like modification with unrelated n-state inverters may be an increase of security. However, no analysis has been done about how security may be affected.

A purpose of the composite expressions in hashing such as in SHA 256 and MD5 is to further scramble bits. One is reminded that even though the symbols are represented by decimal numbers, in an actual switching device these are words of bits. As disclosed before, the n-state inverters may be realized in different ways, but will currently still be implemented in binary switching based technology. As long as reversible n-state inverters are used, the overall distribution of output symbols will still be uniform, which makes successful attacks on the FLTed or modified hashing operation unlikely. Preferably one may use inverters 601, 602 and 603 being identical and 604 being the reversing inverter thereof. This limits the requirement for n-state inverters as inverter 604 may be easily determined from for instance 601 if one keeps n from being too large.

However, one may also use 4 different inverters, 3 different inverters, 2 different inverters and perhaps 1 inverter. One may also apply one or more n-state inverter while using for one or more inputs or output an identity inverter. Using actual inverters such as the identity inverter is believed to make a side-channel attack more difficult when the identity inverter also needs to be implemented.

One aspect of the present invention is to FLT a known hashing method to make the method more secure without deteriorating known and established security properties. From that perspective it is probably beneficial to use a single inverter and its reversing inverter for FLTing an operation in a hashing application. However, one may generate for instance a common keyword by applying at least one FLTed hashing method, possible involving one or more additional hashing applications which may be the same or different hashing applications which may or may not be modified individually by n-state inverters. The keyword is generated internally by a machine from for instance a public keyword by using the at least one FLTed hashing method. An attacker presumably knows not any of the applied n-state inverters. The only way to determine a generated keyword is from its use in an encrypted AES message which may itself be generated by an FLTed encryption method. Especially if one limits the use of the same configuration of modified hashing methods, for instance only once, it may be beneficial to use for instance 4 different inverters in a setup as illustrated in FIG. 6. One may even use a non-reversible inverter by including at least 2 inversions that generate the same output. This will skew the distribution of output signals. However, a single application of certain non-reversible inverters may throw off an attacker, who (if only used once) may not know where a distribution of symbols is coming from.

One aspect that enables the generation of secret keywords is that a properly FLTed hashing method has identical or similar meta properties as the unmodified hashing method that it is FLTed from. However, the output, or generated hash of an FLTed hash is different from the output generated by the same input to the un-FLTed or unmodified hashing method. This disclosure is not the place to show an exhaustive list of different hashes from FLTed and unmodified hashing method. However, the effect of the FLT may be illustrated with the following. Data entry of an input to a hashing method generally takes place with XORn as a mixing function. It is generally impossible, certainly after a number of iterations, to reconstruct the input from a generated hash. But assume in an 8-state example that a 3-bit word [1 0 1] is created from an 8-state XOR8. This has the following possibilities if X1≠X2→[1 0 1]. Then X1 may be one of 8 possible inputs and consequently X2 may be one of 8 possibilities. However, with an 8-state FLT there are at least 8 times as many possibilities or at least 64 possibilities and in effect there may be more. The number of possibilities further increase at least by n!. Rendering brute force attacks impossible with current computer technology. These numbers as applied to FLTed composite expressions further render successful attacks on FLTed hashing methods highly unlike and at least an order of magnitude or at least 256 (using 8 bit words) times less likely and presumably in the order of 250! (using 8 bits) less likely than a successful attack on an unFLTed hashing method. This establishes a very secure and fast way to generate a common keyword that is presumably faster and more secure than standard PKE and as best understood will resist Quantum Computing attacks as the FLT itself does not depend on a factoring or a discrete logarithm problem.

FIG. 15 is a screenshot of Matlab computer instructions to generate outputs of an 8-state FLTed Ch(x,y,z) operation where the operation Ch8 (x,y,z)=(x∧y)⊕(¬x∧z) operated on words of 3 bits. The functions and8 and xor8 are the decimal representations of bitwise AND and XOR. The used inverters are inv8x=[7 6 8 5 4 2 1 3]; inv8y=[7 3 1 8 4 5 6 2]; inv8z=[4 5 6 7 8 3 2 1]; and inv8out=[1 2 3 6 8 5 4 7]. The unmodified Ch8 (2,3,6)=5 (in origin−1) while modified Ch8f(2,3,6)=3. Both composite functions modified and unmodified have uniformly distributed output states.

By far the most widely used n-state switching function in hashing applications (and in encryption) is the bitwise XOR operation. For encryption/decryption this is a very convenient operation because this operation (also called addition over GF(n)) is self-reversing, which makes designing and implementing decryption that corresponds to an encryption fairly simple. The aspect of decryption is not required in hashing. The n-state equivalent of bitwise XORing may be represented by XORn. As an example one is referred to table 501 in FIG. 5 for n=8 in origin−1.

Figure 7:
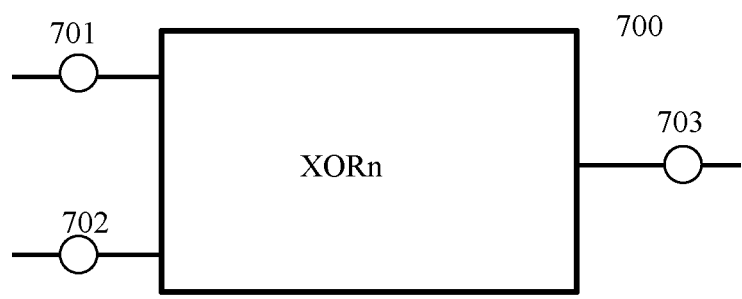

For a modified hashing operation one may use a modified XORn operation as illustrated in 700 of FIG. 7. The bitwise XORn circuit has two inputs with n-state inverters 701 and 702 and output inverter 703. For a true FLT 701 and 702 are identical and 703 is the reversing inverter of 701.

Figure 8:
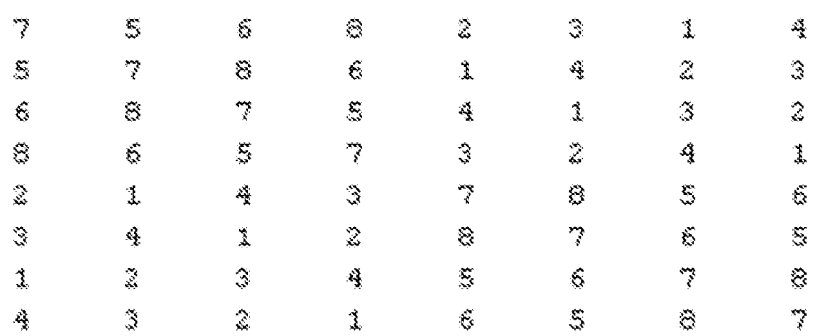
FIGS. 8 and 9 are screenshots of a switching table generated by a computing device in accordance with one or more aspects of the present invention.
Figure 9:
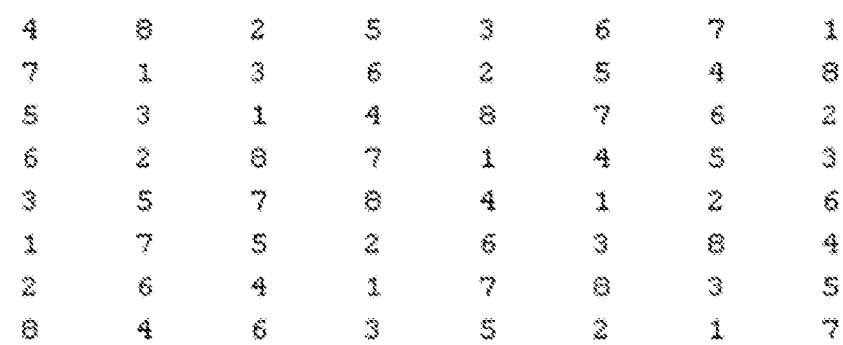

For instance apply 8-state inverter inv8=[7 6 8 5 4 2 1 3] in an FLT to XOR8. This will generate screenshot of computer FLT XOR8F table 801 in FIG. 8. This FLTed function is also self-reversing, be it with zero-element 7 in origin−1. For secret hashing purposes one may apply inv81=[7 3 1 8 4 5 6 2] for inverter 702 and inv83=[4 5 6 8 3 2 1] for inverter 703. This will generate a modified switching function as illustrate by screen shot of computer generated table 901 in FIG. 9. This function is no longer self-reversing and it is not associative. However, the distribution of output states is still uniform, which may be a factor that matters in a secret hashing method. Accordingly, a method and device to modify a computer hashing operation with n-state inverters has been provided.

Replacement of AND8 with AND8FLT provides a significant change in output. The 3-bit example has been provided to give some impression what the FLT modification can do in changing an output of an operation. Clearly, the change is significant compared to the original bit-wise AND. Similar changes are applied to the XOR operation, preferably using the same 8-state reversible inverter. For instance: Ch(x,y,z)=(x∧y)⊕(¬x∧z) will become Ch(X,Y,Z)=(X AND256flt Y) XOR256flt (NOTX AND256flt Z), wherein X, Y and Z are 256-state inputs of 8-bit words and AND256flt and XOR256flt are the FLTed variants of the 256-state representations of 8-bit-wise operations.

The above illustrates how a computer hashing routine may be modified in place by modifying operations on words of bits by the FLT. The in-place means that the order of operations is maintained. So the data flow in the FLTed method remains the same as the unmodified one. One may of course also change an order of operations. However this changes the data flow.

The in-place FLT that keeps the same dataflow does not change the fundamental security of the hashing method. It changes the distribution of 1s and 0s in words of bits. Which means that an FLTed modified hashing method has the same property of being impossible to fake or modify or fake without detection. However, if the FLT is not identity, the outcome of the FLTed hash operating on an input will be different from the non-FLTed hash applied to the same input.

For example, a first data input applied to an un-FLTed straight SHA256 routine will generate a first hash. Exactly the same input applied to a FLTed SHA256 will generate a second hash that is different from the first hash. All FLTed SHA256 computer operations using the same FLT and the same input will generate the same second hash that is different from the first hash.

The earlier example of the 8-state FLT of the SHA-2 Ch(x,y,z)=(x∧y)⊕(¬x∧z) operation illustrates the resulting different distribution of 0s and 1s in this FLTed operation. One of ordinary skill is able to perform the FLT on the words of bits in SHA-2, SHA-3 and earlier hashing methods such as MD5, SHA-1 and others that apply computer functions on words of bits. The result of the FLT of hashing is a FLTed hashing method that is as secure as the un-FLTed method and that provides a unique and unfakeable result. The additional enormous benefit is that when the FLT is kept confidential, the hash is confidential. That is, without knowledge of the FLT, it is impossible to generate the same hash.

One may transmit a cleartext or public key message from one computer to another one, which both have access to the FLTed hash. Both will generate the same (FLTed) hash, which is impossible to generate without knowledge of the applied FLT. This FLTed hash is then an extremely secure keyword, as no one without access to the FLT is able to construct and generate the FLTed hash.

In accordance with an aspect of the present invention a successful attacks can be made even less likely by applying the FLT multiple times. For instance a cleartext message is transmitted and a FLT1 SHA256 hash is applied using a first 256-state or other relevant n-state inverter. The generated FLT1-HASH is then hashed again using a second n-state inverter in a FLT2 SHA256 hash to generate FLT2-HASH.

In accordance with a further aspect of the present invention, one may use different subsequent hashing methods. For instance the first hash is a FLTed SHA256 hash and the second hash is a FLTed SHA-3 or FLTed MD5 hash or FLTed SHA-1 hash (taking into consideration different lengths of different hash methods). Subsequent hashing methods may be FLTed or not and if FLTed may use a different FLT or the same FLT. This allows a regular changing of keywords by exchanging cleartext or public key data or by exchanging encrypted data that may be weakly encrypted. Almost any additional step makes it more intractable for an attacker to discover the used keyword, which is and should not be published and is only discoverable from the public transmission or from its application in an encryption like AES.

Examples of FLTed Hashes

Hashes like MD5, SHA-256 and SHA-3 all apply bitwise XOR while MD5 and SHA-256 apply composite expressions like Maj and Ch and SHA-3 applies permutations and modifications known as theta, rho, pi, xi and iota. Furthermore, MD5 and SHA-256 apply mod-232 addition. One may modify one or several or all of the functions with an FLT. In general modification of bytes is fairly simple and effective. The storage of 32-bit inverters may not be possible due to the required storage requirement. In that case one may split a word of 32-bits or longer in a number of smaller size binary words of q or other size bits, modify these q-bit words with a $2^q$-state inverter, translate back in binary and reconstitute a full word that is applied to the long word size operation. The same happens at the end of the operation but now with a reversing inverter. One may use a same inverter to each word. One may also use different inverters to each word, and one may use different or same inverter to each operation. For instance SHA-256 applies bitwise XOR, a Ch operation and a Maj operation as well as a add mod-232 operation. One may apply a single 256-state inverter and related reversing inverter to all modifications. One may also use different inverters. If more convenient, one may use 16-bit words or 65,536-state inverters. Or any other combination of size and number of different inverters.

In a first example, a SHA-256 implementation is FLTed in several functions and is used to hash a common message 'hello world'. Online SHA-256 facility at https://emn178.github.io/online-tools/sha256.html generates a hash in accordance with the SHA-256 standard. The generated hash value is: 'b94d27b9934d3e08a52e52d7da7dabfac484efe37a5380ee9 088f7ace2efcde9'. Using a published Matlab implementation downloaded from https://github.com/lostpfg/SHA-256-Matlab/blob/master/sha256.m, posted by Peter Fousteris the following has value was generated: "'B94D27B9934D3E08A52E52D7DA7DABFAC484EFE3 7A5380EE9088F7ACE2EFCDE9'". Because the generated hash value should be considered as hexa-decimal characters, they are the same. Together with additional checks it was established that the Matlab implementation is correct. The Matlab implementation, credited to Peter Fousteris, has no copyright limitation posted and can be downloaded from Github and is incorporated herein by reference. For illustrating the FLT only a single 256-state inverter will be applied and only the modified functions will be disclosed. It is further observed that SHA-256 is available for download online in different source codes like C, C++, Python and Java for instance. The Matlab implementation is selected for ease of reading as being close to pseudo-code. It is to be understood that the FLT and other modifications may be done in any working computer language, ranging from machine-code, to Assembler code to high level interpreted or compiled source code included C, C++, C#. Java, Python or any other computer language that enables execution of computer instructions. Furthermore any of the instructions may be realized as customized fixed computer circuits including Field Programmable Gate Arrays or any other set of circuits.

One functional statement in the original SHA-256 program is: "T1=mod32add (h, capSigma1(e),ch(e,f,g),hex2bin (K(t,:), 32), W(t,:)); "This is a mod-232 addition of different components, including a result of the function "ch (e, f, g)," which is the Ch function in SHA-256 on 3 words of 32-bits as per CH operation of section 4.1.2 of FIPS PUB 180-4 Secure Hash Standard (SHS) 2015, which is incorporated herein by reference.

An implementation of the Ch function is illustrated as a Matlab function in computer screenshot 1700 in FIG. 17. It shows the bitxor of two preceding instructions (x&y) and (~x&z) and operates on a word size of 32 bits as per SHA-256 rules. A FLTed version of CH being named CHF is illustrated in computer screen shot 1800 in FIG. 18. It shows how the 32-bits words x, y and z are split into 4 8-bit words, inverted by 256-state inverter inv and recombined as a 32-bit word by operation 'split4winv'. The split in 8-bit word allows the use of fairly small 256-state inverters. If so desired one may split and recombine from different sizes, like 2 16-bits words, 3 10-bits words and 1 2-bit word or one 32-bit word. The function as displayed in 1800 performs the required CH operations on inverter 32-bit words which are then XORed. That result is then again split and inverted, but now with the reversing inverter 'rinv.' One may wonder why the reversing inverter is not applied to the intermediate operations. In that case the reversing inverter of that step is reversed with the inverter at the next step, which creates identity. Accordingly, one may omit those steps without changing the outcome. In accordance with an aspect of the present invention a function operation such as XOR, Maj and Ch in SHA-256 is FLTed, in order to not modify an overall data flow. If one so desired one may further split operations like Ch and Maj in their constituting parts and FLT these parts with different inverters. The bitwise XOR operation on 32-bits may be split-up in different words wherein each word FLTed bitwise XOR is FLTed with a separate and different inverter. This may further increase security, but requires additional management of inverters.

The working of splitting of words of bits, inverting these smaller words and recombination is further illustrated in computer screenshot 1900 as shown in FIG. 19. Herein a word of 32-bits is split into 4 words of 8-bits, each subword of 8-bit is inverted by creating a decimal value of an 8-bit word through 'b2dec' and inverting that value with 'inv' and recreating 8-bit words through 'dec2b' and then recombining the 8 bit words into a 32-bit word. One of ordinary skill in the art of computer programming will understand that different ways may be used to achieve this result and that the instructions as provided are illustrative, It is also observed that whatever way is selected to achieve the FLT, the FLT itself as disclosed herein is unique.

One may apply a similar approach of course to the bitwise XOR in any hashing operation. In SHA-256 one may split a 32-bit word again in for instance 4 8-bit words, invert the 8-bit words in accordance with a 256-state inverter, apply the bitwise XOR om the inverted 8-bit words and reverse invert the result to generate reverse inverted 8-bit words that are combined into a 32-bit output word. With the understanding that, again, if one so desired one may split into different size words and use different inverters or invert the entire word with a single inverter.

Another operation that is used in SHA-256 is the modulo-232 addition as per section 3.2.1 of the SHA-256 standard. For illustrative purposes, this mod-232 addition is FLTed. Operands are again 32-bit words. One approach in the not-FLTed program is to convert 32-bit words into decimal number, add all operands and determine the remainder of the sum mod-232. The FLT is realized in an illustrative embodiment in a similar way as shown in CHF. The 32-bit words are split into 4 8-bit words which are inverted and recombined into an inverted 32-bit word. The inverted 32-bit word is the converted into a decimal number and all 32-bit words are decimally added modulo-232. The remainder of the sum is converted into a 32-bit word, which is then split into 4 8-bit words and inverted with the reversing inverter in decimal form, then reconstituted into 4 8-bit words and recombined into the result being a FLTed 32-bit word.

For simplicity one FLT 256-state inverter is used and applied to CH and Addmod32 in the following example. To keep the example simple the bitwise XOR has not been FLTed, but can easily be applied of course. To check the result an online SHA-256 calculator at https://emn178.github.io/online-tools/sha256.html is used to check the result. A simple message 'hello world' is submitted to the calculator and generates hash value: 'b94d27b9934d3e08a52e52d7da7dabfac484efe37a5380ee9 088f7ace2efcde9'. Using the FLTed program with inverter inv256=[1 2 3 . . . 255 256] or identity in origin−1 generates exactly the same hash value for this message. The program has been checked against other messages and provides the correct result.

The following 256-state inverter is then applied to the FLTed SHA-256 operation in accordance with above steps: inv256a=[106 234 75 233 142 188 134 215 224 96 162 208 8 230 102 42 122 61 66 256 72 121 166 138 81 228 161 158 114 107 30 172 151 248 227 185 253 113 85 59 196 168 238 145 60 240 141 7 35 86 71 190 136 198 46 52 118 100 226 255 124 175 39 120 163 101 210 214 135 180 109 197 5 29 139 252 70 169 119 156 206 41 76 170 130 84 218 146 149 77 164 26 21 1 178 108 236 225 57 88 207 55 213 154 192 34 40 159 222 250 103 67 17 194 14 177 53 123 174 45 243 74 182 51 148 247 115 127 32 80 43 116 82 195 50 90 150 144 104 189 38 201 94 137 4 245 95 204 93 221 160 36 184 56 176 73 99 117 232 217 62 128 126 220 157 83 9 105 254 147 65 58 191 155 165 22 10 12 183 49 2 246 78 64 193 48 205 209 239 179 152 24 3 91 153 31 89 79 27 186 133 237 69 18 68 211 199 235 63 140 187 223 44 173 6 202 47 132 19 11 98 176 229 167 249 244 131 216 37 25 20 111 242 97 23 13 110 92 112 231 15 33 219 181 171 200 129 16 203 28 212 54 125 87 241 251 143] in origin−1. A corresponding reversing inverter rinv256a that in combination with inv256a establishes identity in origin−1 is also computed. The FLTed hash value generated by the FLTed SHA-256 of 'hello world' is then: '6153E1ABE104E3052DF07FC1B02141592AAF32B91E 1EAA1674AEE278453F19ED' which is a different from the non-FLTed hash value. The hash value is provided in hexdecimal format and hex 'E1' for instance is the same as hex 'e1'.

The program has been tested with different inverters and different messages. As far any comparison has been done, it is clear that there is no prediction as to how the FLT will change the hash value. This is in particular the case if one FLTs certain parts of the SHA-256 operation. It actually supports the strength of the SHA-256 hashing which shows an amazing "avalanche". To test that effect an inverter has been applied that is basically identity with only two states modified. That is the last and first states have been exchanged and the inverter is inv256b=[256 2 3 4 . . . 254 255 1]. The inverter is substantially the same as identity. This is a self-reversing inverter. The thus FLTed SHA-256 of 'hello world' will generate hash value '9866F4A11E9C73157C50E1F10E77F1E1FC93CF1CE87 9849C91AF82F09D55E5E4' which is substantially different from the not-FLTed hash value.

For illustrative purposes the FLT is also applied to MD5 an older hashing method that is no longer considered secure. It is fairly easy, it seems, to generate collision messages in MD5. A popular example are files "order.ps" and "letter_of_rec.ps" that will both generate the same MD5 hash value 'a25f7f0b29ee0b3968c860738533a4b9' and thus form a constructed collision and makes MD5 insecure. The inventor used a published Matlab MD5 implementation, posted and copyrighted by Stefan Stoll, ETH Zurich, 2006 and downloaded from Stefan Stoll (2023). MD5 signature of a file (https://www.mathworks.com/matlabcentral/fileexchange/5498-md5-signature-of-a-file), MATLAB Central File Exchange and which is incorporated herein by reference. This implementation of MD5 has a function Fun with iRound having 4 switch cases with case 3 being: q=bitxor (bitxor (b,c),d). Or first determine bitxor (b,c) and then bitxor the result with word d. In this case the words b, c and d are uint32 (unsigned integer) representations.

For illustrative purposes only case 3 of the program has been FLTed. It is to be understood that other parts of the of the MD5 operation may and can also me FLTed, including the cases which apply the bitor operation and the bitadd32 operation. The FLTed modified bitxor operation is called bitxorf and has two parts. Because this particular implementation works with integers rather than with words of bits, one first has to convert the uint32 integer into a 32 bit word, split the word into for instance 4 8-bit words, convert the 8-bit words back into a 256-state integer, invert the integers, reconvert back into an 8-bit word, recombine the 4 8-bit word into a 32-bit word and convert into a uint32 integer and perform the bitxor on the inverted uint32 integers. The result of that bitxor has to be reverse inverted as explained earlier, using similar steps.

This has been done to illustrate that any implementation of the MD5, SHA-256 or other hashing method such as SHA-3 can and may be FLTed using the appropriate steps of the FLT. All other steps of MD5 have been left unchanged to illustrate the effect of an FLT of a single operation, even though if so desired, any computational step involving words of 2 or more bits may and can be FLTed. This includes rotational of shifting steps which will however not be modified per se by a complete FLT. However, in that case one may apply only a single inversion before or after a rotation to create a different outcome from an original rotation.

The effect of the FLT is quite remarkable on the collision. The FLT of 'hello world' in MD5 is "'5eb63bbbe01eeed093cb22bb8f5acdc3'. The FLT with the "close to identity" inverter on the 'hello world' message is that the FLTed hash is: 'b7b67900fbcceb7d2f7d6698cd645f31'. The hash value of the two ".ps" documents that collide in the original MD5 is with FLT with "close to identity" are '19b0651edd7a1cf3b8b2366da14e3415' and '00ba4c3ffcb2b6468e5628d8dc03da9b' respectively, all hashes presented in hexadecimal format and the collision has disappeared. Currently MD5 is secure from pre-image attacks it is believed. Accordingly, if one keeps the inverters secure or confidential, one still has a secure but FLTed MD5 hash.

It is emphasized that the FLT is applied to modify existing hashing methods such as MD5 and SHA-256. It is possible and envisioned to create novel hashing methods. However, it is well known to ones of ordinary skill in the art of cryptography that proving that a cryptographic primitive such as a hashing method or an encryption method is complicated and may take a long time. It involves different ways in attacking published aspects of such primitives. The FLT in essence does not change the data-flow or the fundamental properties of the digital switching functions. It merely changes the numerical properties of such functions, but leaves the overall properties intact. If such properties contribute to security of a primitive, they also contribute to the security of the FLTed primitive. In general, a hashing method such as MD % or SHA-1 is deemed insecure because collisions can be constructed. A secret FLT changes the output of functions in a primitive such as a hashing method. This makes it impossible or close to impossible to reconstruct internal states of the FLTed hashing method. Especially when the selected inverters are used a limited number of times, it will be impossible or close to impossible to create a successful attack.

In one embodiment of the present invention an FLTed hash or a message from which it is computed will be transmitted. FLTed hashing may be used to create a secret shared password as will be further explained down below. If a message is kept secret and only its FLTed hash value is transmitted, or a message is transmitted but the FLTed hash is computed secretly, it is again impossible or close to impossible to reconstruct one from the other. Thus the FLTed hash is at least as secure as the method that is modified and when the FLT is kept secret, the security is increased with a factor commensurate with the resistance against finding the inverters applied in the FLT. It is believed that that security is in the order of unpredictability of an n-state reversible inverter. Theoretical permutations are in the order of factorial n or n!. However, one should probably exclude some easily predictable inverters. Even for a 256-state inverter that will leave well over an estimation of 10400 different inverters. This may be considered pretty much secure.

For the above reason as illustrative examples, published and readily available implementations of SHA-256 and MD5 (in this case in Matlab) are used to be FLTed. The proper workings of the implementation are checked against public online hashing implementations. If one so desires, one may use public test vectors. These (Matlab) implementations have been FLTed in certain aspects as described above and the hash value of test messages have been computed. This demonstrates the power of the FLT. It generate consistently different hash values for, even slightly, different messages. It also generates hash values that are different from the standard method. Thus providing greater security. Thus the FLT of internal functions if existing hashing methods creates useful and more secure hash values, in line and with greater security than the hashing methods that have been FLTed.

In light of the different switching functions and operations that are applied in a hashing method it may be useful to clarify what is intended with switching function and switching operation herein. A binary switching function is a two operand digital device that provides a result. While the term 'function' is used to describe it as to the functional working in the context of computer or computerized operations it is an actual, usually electronic, device with two inputs and an output. Thus the term function herein explicitly means a device. The standard binary switching functions are 16 functions which include the XOR, the AND, the OR, the NAND, the NOR, and the EQUAL functions and devices. These devices are also applied to operate on words of bits. This may be called bitwise operations on words of q bits resulting in a word of q bits. A well known use of bitwise operations in cryptography is the bitwise XOR.

A bitwise operation on q bits with q an integer greater than 1 may be called an $n=2^q$-state operation. So a bitwise operation on 8 bits may be called a $n=2^8=256$-state operation. Such an operation has 2 operands or 2 inputs of q bits and a result of q bits. To facilitate description one may use decimal representation as n=256-state. One is reminded that in practice still words of bits are use, as decimal numbers in computers do not normally exist. As explained herein, one may modify the bitwise operation or FLT the n-state operation with n>2 by applying n-state inverters. An n-state inverter is also a binary operation in hardware, even if it is described as n-state. In certain cases the states are stored in a computerized look-up table. Again, these tables in general as binary devices. Nowadays non-binary storage may be used by using elements that can assume 3 or more physical states. Even in that case we are talking about discrete physical states being represented by a decimal number.

An FLTed bitwise function is a device with a first input enabled to accept a signal of q bits and a second input enabled to accept a signal of q bits and an output that provides a signal of q bits bitwise generated by bitwise processing of the words of bits, wherein the input signals are modified with an n-state (n=24) reversible inverter and the output signal is inverted by the n-state ($n=2^a$) reversing inverter, wherein a combination of the n-state reversible inverter with its reversing inverter creates identity. In formula inv (rinv (i))=i and rinv (inv (i))=i. For theoretical analysis one may use mathematical terms such as bitwise XOR of q bits is an addition over GF (n=24). This does NOT mean that the computer performs an addition over a finite field. Computers merely switch and the mathematical elements as described in a finite field do not actually exist, as only signals LOW and HIGH basically occur in a processor.

A distinction is made herein between a function and an operation. An operation may be a function or bitwise function, but it also may be a combination of functions or bitwise functions. As shown herein the SHA-256 operations Maj(x, y,z) and Ch(x,y,z) are operations that operate on 3 operand (of 32 bits) with different bitwise functions (AND and XOR for instance). In order to enter a multibit message into a state of a hashing method commonly bitwise XOR is used and in that case the bitwise XOR is also an operation, in that case consisting of the bitwise XOR function. Another example is the mod-232 addition, which is a multi-function operation. A bitwise operation herein is created by processing at least 2 words of q bits as input operands and processing the at least 2 operands with one or more bitwise functions to generate at least one word of q bits as a result. The FLTed operation uses a first n-state inverter to invert the at least 2 operands and a corresponding reversing inverter to invert the generated output word. Another operation in that sense is the multiplication of two operands to create a product described as a multiplication over GF(n). In essence, an FLT as used herein applies the inverters to the inputs and output, even if the operation has multiple functions. The use of multiple functions that are sequential, that is an output of a first function is the input of a second function, eliminates the need for the internal inverter and reversing inverter. For that reason one may say that an FLTed operation with at least 2 input operands and a resulting output is characterized by the unchanged operation with inverters at the input and reversing inverter at the output. As has been shown earlier, one does not really have to perform the inversion at execution. One may compute a switching table of the FLTed function or operation and use this stored table to have the computer perform the FLTed operation. In that case the operation is still characterized as an FLTed operation with inverters at the input and a reversing inverter at the output of an unmodified operation.

A novel approach in hashing was introduced as Keccak and in its version as SHA-3. SHA-3 is much more bit-oriented than earlier methods. However, the enter a message into a state of Keccak or SHA-3 still bitwise XOR is applied.

The above FLT approach may also be applied to SHA-3 as provided in FIPS 202 SHA-3 Standard published by NIST Computer Security Resource Center CSRC in August 2015 which is incorporated herein by reference be downloaded from and may https://nvlpubs.nist.gov/nistpubs/FIPS/NIST.FIPS.202.pdf.

As base implementation a Matlab implementation of SHA-3 available from https://www.mathworks.com/matlab-central/fileexchange/71760-sha-3-hash?s_tid=srchtitle created and copyrighted by David Hill ("the Hill Implementation") is used. The SHA-3-256 hash-values from messages such as 'hello world' are generated and tested against other public online hash value generators to establish correctness. The message 'hello world' in SHA-3-256 has the hash '644bcc7e564373040999aac89e7622f3ca71fba1d972fd94a 31c3bfbf24e3938' in hexa-decimal and was checked to be correct. The Hill Implementation is FLTed in accordance with an aspect of the present invention. The Hill Implementation has the SPONGE.m Matlab function that creates the absorption of the message into the hashing state of 1600 bits as per the SHA-3 specification. SPONGE(N,d) XORs input message N to process for a hash of d bits (in this case 256). It applies padding and basically applies bitwise XOR with an all zero bit sequence. The SPONGE function is modified to SPONGEF(N,d,sn256) to have both the message as well as the zero sequence being inverted, XORed and then reverse inverted. As implementation the bitsequences are divided into bytes and are processed in accordance with a standard 256-state addition over GF(256), which is a bitwise XOR. For Matlab purposes the addition is created as a 256-by-256 table sc256 in Matlab. The basic function SHA3 in Hill Implementation would be SHA3(N,d).m which would call function SPONGE(N,d). This has been modified to SHA3F(N,d,sn256) which calls SPONGEF(N,d,sn256). Using standard addition sc256 in SPONGEF(N,d,sn256) will generate the same hash value as SPONGE(N,d) for instance for N='hello world' and d=256. As an illustrative example the inverter inv256b will be used to generate sn256 as the FLT of sc256. The inverter inv256b is a 256-state inverter using identity and exchanging the last and first state: inv256b=[256 2 . . . 254 255 1] in origin 1. This is a self-reversing inverter and rinv256b=inv256b. sn256 is generated from sc256 using the Matlab program as shown in screenshot in FIG. 10. Then SHA3F('hello world', 256, sn256) will generate as hash: 'a020bc821a48ab3d7c9b9b743d6f096561d74cab6bb6f691 4132127eafda2ac6', which is different from the unFLTed hash. Using a random 256 state inverter inv256x=randperm(256) and generating sn256=labtransform(sc256,inv256x) using it in SHA3F ('hello world', 256, sn256) will generate hash: '89941bcb9cbf82b4beb91bdaeb77a226353042de42c586e2 2037438d04fflade', demonstrating the random and unpredictability of applying the FLT successfully to SHA3 and Keccak.

It was already observed that Keccak and SHA3 are bit and permutation oriented. In accordance with an aspect of the invention an n-state inverter which is preferably a reversible inverter is applied to modify an internal state of Keccak. Permutations in Keccak take place in different functions which operate according to an arrangement of bits in a 5 by 5 by 64 array of bits. his array is permuted with the 5 functions in 24 rounds. Each next round has a previous round as input. In the Hill Implementation this is expressed in Matlab as a loop which executes 24 time the permutation function A=Rnd(A,ir), with A being the state and ir the round index. For completeness the permutation functions are: Ap=iota(chi(pI(rho(theta(A)))),ir);, In accordance with an aspect of the present invention, the rounds are interrupted at least once between subsequent rounds. During that interruption the State (which is represented as array Ap [5,5,64]) is converted to a binary sequence of 1600 bits as per the SHA3-256 standard. That sequence is then converted to 200 bytes or 8 bit elements, each element is inverted with a 256-state inverter and a new sequence Sp is created from the inverted bit into a 1600 bit sequence which is then converted to a new array Ap'[5,5,64] and the remaining rounds are executed. This modifies the hash of SHA3 in accordance with the inversion, which in this case is NOT an FLT. Still it is highly effective. For instance interrupting SHA3-256 after round 11 (ir=10 after starting at ir=0) and inverting the reconstituted bit sequence with inv256bm reshape to the new state array Ap' and executing the hash 'hello world' remaining 11-23 will into '07587735c4d53ac9b2624e85932dc8ce3c99cfc21361ffd7c 645e535bfa31bf0'.

The above is an example of modifying the state (or in this case the state sequence) with an n-state inverter. This is already highly effective. One may do the interruption after ir=11 or after the twelfth round, instead after ir=10 using the same inverter. This will modify the hash to '9b43526f5697bc12447f32e5b5a090a014b6bec8249c85c4 23d4c1a1c9581aca'.

The above allows for an almost unlimited but repeatable modification of SHA3. As an illustrative example a 256-state inverter has been used, and one that is very close to identity, still affecting a substantial modification. One may of course use other inverters such as 216-state inverters. On may also modify the sequence in different ways, like bit rotation or shifts. For most purposes a limitation is a repeatability and an efficiency. So one would limit the complexity of the modification and the number of modifications. As an example one may exchange the lanes A(5,2,:) and A(2,3,:) in the state A between rounds ir-10 and ir=11. This will generate for 'hello world' the hash 'f5021facae8cc8bf77eda2fcd5138a587113831cf988e49b3d 94fe5e8c882832'. One may make more than one modification or interruption. However, as these interruption would be secret, it is preferable to limit the number of modification as not to require too many instructions.

The modification as described above is defined as a defined and executed repeatable modification of an internal state of a hashing method. The modification has 2 aspects as provided in accordance with aspects of the present invention. A first modification is a modification of an operation in a hashing method, preferably with an n-state inverter based FLT. This modification leaves the basic dataflow unchanged. Most likely it does not offer additional opportunities for cryptographic attacks. A second modification is a modification of intermediate data during hashing by a predefined intervention. This intervention changes the actual dataflow of the cryptographic method. It may offer opportunities for attacks such as side-channel attacks, as it may indicate a change in instructions.

Established cryptographic methods such as encryption and hashing are subject to significant analysis and attempts to break them. The fact that methods like SHA256 and AES have not been broken yet is a testament to their strength. However, even if not an entire method is broken does not mean that it does not have insecurities. For instance progress has been made in attacking limited rounds of the above methods. Because of the inordinate broad use of these methods it is not inconceivable that a powerful attacker has actually broken the methods, but has not announced the ability to break these methods. Clearly, breaking such methods by a malfeasant allows a majority of message exchange to be read and used against the transmitter and/or receiver. Furthermore, there is no guarantee that in the future these methods will not be broken. It has been observed that parties are collecting encrypted data in the expectation that methods to read this data will become available. From that perspective it may be worthwhile to modify methods like AES and SHA-256 to the extent that they keep at least their level of security, but the modification then increases the time/effort to perform a successful attack or successful future attack.

This is where maintaining the original dataflow comes in. The literature in cryptography has plentiful descriptions of successful attacks on methods that were deemed to be secure. The FLT as provided herein does not change the dataflow or even the meta-properties of the unchanged methods. It is thus not unreasonable to assume that the FLT by itself does not introduce insecurities, because the method in its flow is unchanged. In fact the huge number of possible FLTs increases the security. As described herein, there are modifications in accordance with aspects of the present invention that do change the dataflow and/or the meta-properties of the dataflow. This may not matter much if one uses these methods for generating keywords or passwords. An example is the multi-inverter transformation as illustrated in 1100 in FIG. 11. The FLT uses ONE (1) or at least the same in performance reversible inverter at the inputs of an operation and the corresponding reversing operation at the output. This maintains the meta-properties of the operation. For instance if the operation is described by an addition over GF(n) then the FLTed operation has the same meta-properties, such as being commutative, being associative, being closed, having an inverse ai for each element a so that op(a,ai)=z, etc. A change may be that the zero element in the FLTed operation is no longer 0.

The operation labtransformpp(table,invx1,invx2,invy) allows 3 different inverters or three identical inverters or at least 2 inverters being identity or any other combination of 3 n-state inverters. However, depending on the selected inverters the transformed operation may not longer maintain its meta-properties such as being commutative and associative. While strictly speaking the dataflow is not modified, the data properties have been changed. This modification has been applied in for instance SHA-3 in the initial absorption in the data state. For instance 3 different 256-state inverters have been generated by Matlab randperm(256).

In summary these 256-state inverters are: invx1=[123 99 174 244 . . . 10 12 226 118], invx2=[196 192 77 140 . . . 94 78 4 103] and invz=[97 234 123 44 . . . 100 4 241 202]. First the identity inverter is used to create table sc256 of common addition over GF(256) to generate SHA3F('helloworld', 256,sc256)=
644bcc7e564373040999aac89e7622f3ca71fba1d972fd94a3 1c3bfbf24e3938'.

Then invx1 is used to generate FLTed table sn256 and to generate SHA3F('hello world',256,sn256) which is '34f138f3928ac5ccff5e9306856679359183e0bc7888b7f83 8e36d20baf28f7a'.

Then invx1, invx2 and invz are used to generate transformed table sk256 and to generate SHA3F('hello world', 256,sk256) which is '29e6d6deee10a40f9ae6a141df6c55bda391a412126258383 64620f12cfd10aa'.

The modification thus works very well and as far as checked for other variants has different hashes with no collisions. However, because of the effects on the meta-properties a distinction is made herein between the true FLT which leaves meta-properties unchanged, a modified FLT or mFLT with 3 inverters that are NOT related as in the FLT and a modification in the state of data, such as by at least partial inversion of other modification of data that is not part of the standard that defines the cryptographic method.

The FLT, the mFLT and modifications as provided herein may also be applied in encryption methods such as AES, AES-GCM, ChaCha20-Poly1305 and others. If the modifications are part of a one-way operation (such as in AES-GCM) wherein AES is used to generate a keyword, then any of the modifications may be applied. However, in case of reversible operations, such as AES-encrypt and AES-decrypt one has to take care of maintaining reversibility. For instance AES-GCM or AES Galois/Counter Mode as described in FIPS Special Publication 800-38D and downloaded from https://nvlpubs.nist.gov/nistpubs/legacy/sp/nistspecialpublication800-38d.pdf which is incorporated herein by reference, describes how the ciphertext is created from bitwise XORing cleartext with the generated password. One may FLT or mFLT the addition over GF(n) as disclosed herein to make the encryption more secure. However, security presumably comes from the keyword, not from the XORing. If one applies an FLT or mFLT it is recommended that a transformed function is created that has a limited number of states in common with the not transformed function. One criterion is to create an FLT or mFLT that has fewer than n (in this case 256) states in common for identical inputs. While the hashes clearly have an avalanche effect, the encryption and decryption by bitwise XOR are very predictable. It is thus beneficial to perform a transformation that leaves at least fewer than n output states the same.

Cryptographic hashes are used for one or more cryptographic purposes: including authentication of messages or files, part of digital signatures, encoding of data such as passwords and others. For public applications by parties that do not know each other, a hashing method has to be completely defined. Security comes from hashing of documents in such a way that collision or pre-image attacks are close to impossible. The security comes, at least partially, from the uniqueness of data, enhanced if necessary by salts or paddings or secret parts.

The novel hashing methods are different in the sense that there is always a secret component that is not known to outside the informed devices. The secret part may include an n-state inverter to perform an FLT, a definition of which function and/or operation is FLTed. This has as consequence that devices that do not have access to the secret information are unable to use or apply the modified method. In order to set-up some sort of attack both the data or message and the generated hash may be required to successfully perform an attack. For instance an attacker may suspect that a hash value is generated by a modified hashing method. But by itself, if a hash value is of a standard size like 256-bits, the hash will not reveal that a modified method was used. An attacker would need the original data to perform some form of analysis. For instance by running the message through available and implemented hashing methods and finding that none provides an accompanying hash value. That would indicate that a modified hashing method is applied.

So, two parties or rather two computing devices that communicate over a channel with each other and in some way apply a modified or FLTed hashing method need some basic data. They need to know which basic hashing method is used (like MD5, SHA-256, Keccak, or the like). Then they need to know which functions and/or operations are FLTed or modified, plus in which round or at which stage. Then they need to know how the modification is effected (basically the used inverter in view of the size of word size.). One this data is available to both machines they can use the modified or FLTed hashing method in a manner similar to standard use of hashing.

However, there is another application, in accordance with an aspect of the present invention, that is extremely secure and that is a one-way manner of generating common keywords. The generation of common keywords is an important aspect of Public Key Infrastructure. An underlying assumption is that re-use of keywords in public exchange of encrypted data is a security risk. For that reason there are security protocols such TLS 1.3 that create secure communication between two computer devices over the Internet. Creating a secure keyword by using methods such as RSA or others are part of that. However, most of these methods require an exchange of data between machines, which poses a security risk.

In accordance with an aspect of the present invention, two or more machines that communicate over a physical communication channel, have access to data to perform both a secret modified hashing method. Preferably they may have data that allows them to use at least two different secret modified hashing methods. For example, both machines are programmed to use a secret MD5 hashing and a secret SHA-256 hashing. They both have a same collection of secret 256-state inverter. For example 1000 different 256-state inverters. Though that number is selected for illustrative purposes only. It may be greater or smaller. For simplicity MD5 is FLT modified in mod-232 addition and SHA-256 is FLT modified in Ch(x,y,z). Again, each method may be modified/FLTed in multiple places with different or identical inverters. Each modification may be defined and assigned inverters that may be labeled. This allows a computer to implement the correct FLT as shown earlier above. For simplicity, an FLT in the illustrative example is on one operation and with a single 256-state inverter. A receiving computer has stored a series of inverters, each with a label of sufficient length, for instance 256-bit equivalence. A transmitting computer has the same set of inverters with the same labels. The transmitting computer randomly picks a label and uses the corresponding 256-state secret inverter to FLT SHA256 and hashes with the FLTed SHA256 the label and transmits the generated hash to the receiving computer. The receiving computer uses its own list of inverters and starts hashing the labels with SHA256 until it finds a hash that is the same as the received hash. One may also pre-compute the hashes and identify the correct inverter. Both the machine are now synchronized to use the same FLTed SHA256. An agreement may exist on a basis for hashing a message. This may be a stored random data string that is retrieved from secure storage that both machines know. Both machines may add as a salt some common data such as a written out date for instance. The receiving machine will hash the common data with the FLted SHA256 that generates a secret hash. That hash (which may be converted to ASCII data if so desired, or used as a 256 bit sequence) is now the keyword for symmetric encryption. The transmitting computer has the same data and will create the same keyword. The original receiving computer will encrypt a message, for instance with AES-GCM using the keyword, and transmits it to the original transmitting computer, that has the same keyword and will correctly receive and decrypt the encrypted message.

In order to increase security each computer may use 2 or more FLTed hashing methods using pre-agreed inverters. The FLTed Hashing methods may be different or same methods to be modified. For instance if FLTed MD5 is used one may hash twice, either with the same or different inverters to create 256-bit output. The number of configurations is almost unlimited and depends on the number of inverters that are stored and the number of FLTed hashing methods that are enabled. If so desired, a follow-up message may be transmitted to enable identifying a message to be hashed. If so desired one may even transmit a cleartext message that serves as the basis of a hash, though one should not make attacks not easier than needed. Never will hash and message from which it is derived be transmitted. There will always be an intervening secret hashing that makes it impossible to connect a hash directly to an input from which it was created. Even in case of a cleartext message derived secret hash, the keyword is not revealed as it is part of the encrypted message, which presumably is secure. In case of two or more FLTed hashes, almost any relationship to a message is completely lost and impossible to reconstruct without access to the actual inverters, which by themselves are extremely unpredictable.

One may also synchronize in other ways use of inverters. In that case transmitting a hash may not be necessary. After using an inverter, it may be removed from a list of usable inverters and for instance removed from a computer, by deleting it and overwriting the memory or storage place multiple times with random characters.

In order to enable the implementation of an FLT or other modification of a cryptographic method, including a hashing method, the method and its modification may be represented by a mask with fields that may be filled with relevant data. This is illustrated in FIG. 20 with 2001 providing a generic mask and 2002 providing a filled example. This is an illustrative example only, demonstrating the ability to provide instructions to a computer how to modify a specific hashing method. One may include more fields or use fewer fields. In this example the mask 2001 has 11 fields. The first field is a name for the modification. The second field identifies the type of hashing, with 2002 providing SHA256. The third field provides where the FLT is to be applied. In 2002 this is indicated to be Ch, which is the Ch(x,y,z) operation. It also says Ch707 in 2002, which indicates that an inverter named 707 should be used. In 2001 a field size 1 determines how the operational words in Ch are to be treated. In 2002 it says 8, which means that words of 8 bits have to be used. In this case an entire word of 32-bits is split into 4 words of 8 bits and all words are FLTed with the same inverter. One may include additional fields if one wants to split up the 32-bit word into different sized words and/or wants to FLT each split word with different inverters.

In order to keep the example simple and not confusing, the number of fields has neem limited. However, one of ordinary skill will have no problem to modify or expand the mask. A second set of fields in 2001 offers the opportunity to FLT another operation in the hashing method. For instance, in SHA256 one may also FLT the MAJ operation.

However, in 2002 the fields op2 and size 2 are set to ID (identity) which means that no change is affected. The fields 'state' and 'mod' indicate if an internal state is modified, for instance by an inverter or by exchange in data such as explained earlier above related to SHA3. In 2002 the actual values are ID so no changes will be implemented. The field 'rnd' offers the possibility to set a Round where FLT or changes are implemented. In this case the value is ALL, which means that Ch(x,y,z) in SHA256 is FLTed with 256-state inverter 707 in ALL rounds. The field 'hash' provides the hash of the given name of the modification generated with the FLTed SHA256 as defined. The last field example provides the total number of subsequent hashes, which may be using the same hash again with different parameters, with the same parameters or use a subsequent different hashing method such as SHA3.

The mask as provided assists in managing and implementing desired modifications of hashing methods. The actual computer implementations herein have been illustrated with Matlab programs. One may modify all programs as illustrated with as input the parameters of changes which may be retrieved from the fields of a mask or via a translation table retrieved from a local storage to be imported in the actual program. One may provide as standard programs of modification all modifications already implemented with as a feature that field ID will the parameters for instance as identity inverters or that changes in states will map a state unchanged upon itself.

For illustrative purposes, only very popular hashing methods such as MD5, SHA-256 and SHA3 have been used. There are many more published and probably unpublished hashing methods, including ones that are considered broken, such as SHA-1. Furthermore hashing methods such as SHA3 are based on existing hashing methods such as Keccak and was selected in a competition between other submitted methods. For instance Keccak was declared winner after a final round with BLAKE, Grestl, JH and Skein. However, the competition included many more submissions, included non-allowed entrants. These submissions are listed in Wikipedia site https://en.wikipedia.org/wiki/NIST_hash_function_competition and are incorporated by reference herein. Wikipedia also provides a broad list of published hashes ranging from CRC checks, checksums, etc to cryptographic hash functions at https://en.wikipedia.org/wiki/List_of_hash_functions. This list is incorporated herein by reference. Most methods, if not all, as listed may be modified in accordance with one or more aspects as provided herein.

In certain cases it is beneficial to create a secret check on the authenticity of a message or a document. This is in particular the cases when there is doubt or uncertainty about normally used authenticity or signature methods. In the case of digital signatures, a hash of a document or message is used with a private and public key. One may apply the herein provided modifications to hashing methods to improve the security of authentication or signature. One may provide it as a second check or as a replacement of a first check. If one is unsure about a security of a hashing method, then one should also be careful with a modified version of that hashing method. Accordingly, one should use a specific modification (such as a 256-state inverter) only once, as in that case both the message and the hash are transmitted in combination such as in the DSA and ECDSA as described in Digital Signature Standard (DSS) in FIPS 186-4 downloaded from https://nvlpubs.nist.gov/nistpubs/FIPS/NIST-.FIPS.186-4.pdf which is incorporated herein by reference.

The above provides a very secure, what may be called hyper secure or factorial secure generation of keywords for further cryptographic use such as encryption and signature generation, by public exchange of date. This is a fast and extremely secure alternative to PKI or PKE procedures such as DH, RSA, ECC and even proposed PQ methods that require long computational efforts by a computer. It can be successfully applied by any two or more computers that have access to the same FLT parameters and a pre-established order of operations when applicable. It prevents a lengthy handshake and computational effort as used for instance in aspects of the Transport Layer Security (TLS 1.3) protocol as applied in browser based connections between computers or any other establishment of a common keyword.

Figure 2:
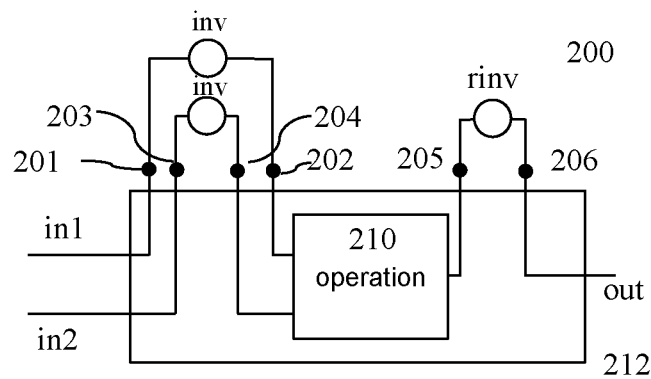

As an example, Internet-of-Things (IoT) devices commonly are forced to use LightWeight cryptography because of lack of sufficient processing power in their computing capabilities. Such devices may be provided with a parameter or parameters for one or more different FLTs and are provided with at least one hashing module. The FLT may be implemented in a plug-in manner as illustrated in FIG. 2. This allows a modification of the FLT by changing the n-state inverter and related n-state reversing inverter in a plug-in manner. A processor in an IoT device or in a server may generate a random message of sufficient length that is transmitted to the receiving processor which applies the required one or more FLTed hashing computations. In general one would provide the burden of generating the message to a server. However, when the IoT device generates a message autonomously, it may generate or use a preprogrammed sequence that is used as the cleartext or public key data and is transmitted with or separate from the encrypted message that is encrypted with the FLTed hash keyword and sent to the server or receiving computer.

The above allows for single step encryption, as no public key exchange going back and forth to establish a keyword as in DH and RSA is required. Multi-step and interactive steps may be applied if so desired, for instance to validate a sender or receiver. For instance a transmitter of a message that will instruct a receiver to perform an action may use multiple steps to authenticate. Each step may include a different FLT. For instance a transmitter may send an encrypted identifier using a keyword generated by a hash FLTed in one way. This may be correctly decoded by a receiver that has access to that specific FLT. The receiver may authenticate in a similar way to the receiver. Only after authentication of the involved parties is an encrypted instruction transmitted by the transmitting party decrypted and executed by the receiving computer. Instead of direct application of FLTed hashes, the FLTed hashes may also be part of a digital signature system as known in the art such as DSA and ECDSA, EdDSA and the like.

Some of the present hashing methods such as Blake2 pride themselves on their security as well as speed of generating the hash. Their FLTed version may be significantly faster than known PKE methods such as RSA and DH and ECC based methods. In cases wherein computers are enabled to apply the same FLT, the use of the FLTed hash as taught herein is faster and more secure than using known PKE methods to create a common keyword.

The above methods may be applied in data exchange such as data exchange between two devices connected to the Internet or two devices connected via a wireless connection. It may be applied in an access system, for instance in a barrier system such as a garage door or entry to a building, a property with a gate, or entry into a room, or a guarded entry. In an example of a garage door opener an opening device, which may be a dedicated device or a programmed processor for instance in a smartphone and a processor that controls an activator of for instance a mechanical latch and/or a motor to open an unlatched garage door. Both processors contain FLTed hashing methods using the same methods and identical FLTs. An opening of a door may then begin with a signal originating from one of the two processors and that is hashed by both processors to create a common keyword. The opener then transmits the computed FLTed hash to the opening device that checks the received hash against a computed hash and opens the door when the two are identical. In a variation a preset password may be encrypted by the opener and decrypted by the opening device to authenticate the opener.

Generating a common keyword from a cleartext or public keyword by using a customized or FLTed hashing method, may be named "generating a secret keyword" which is preferably a secret or private keyword based on an FLTed hashing method. A reason is that multiple hashing methods may be used of which at least one is FLTed. Different keyword generating schemes are contemplated herein. For instance a hash of the public key may be further hashed. One may also split a first FLTed hash of a public key and a second FLTed hash of the public key and concatenate both as a private key or hash the concatenated key again. Many combinations and configurations are fully contemplated. For that reason a common key or secret is derived from a public key by applying at least one FLTed hashing method or from using at least two hashing methods of which at least one is FLTed or at least two different hashing methods of which at least one is FLTed. In using multiple hashing methods be it FLTed or not, the output of one is used as an input or part of an input to the other one.

Other activation operations may use a similar approach by FLTed hashing with one or more hashing methods of which at least one is FLTed, of a public key transmitted by one of two devices of which one is authenticated by the other to activate a device and/or a mechanism.

An FLT of an operation includes an FLT of a computer operation that is a switching function as illustrated in FIG. 1. An FLTed switching function or computer operation applies an FLT so that the FLTed function or operation is different from the FLTed operation. In accordance with an aspect of the present invention the FLTing of the operation or function is realized as a plug-in modification. This is illustrated in FIG. 2 wherein a computer operation 210 is FLTed by n-state inverters "inv" at inputs "in1" and "in2" of the operation and a reversing inverter "rinv" to provide an output "out" of the operation 210. The instructions of the operation 210 are contained in instruction set 212, which is the unmodified or un-FLTed operation. One may consider box 212 as a stand-alone instruction set or function box with connector sets (201,202), (203,294) and (205,206) which allow reception of "inv", "inv" and "rinv" respectively. If one plugs in straight connections or identity inverters into the connectors FIG. 2 represents an unmodified computer function. Herein, an FLTed computer function or operation is one wherein "inv" is not identity. However, the plug-in nature of FIG. 2 allows for different modifications of an operation. In general an FLTed operation herein is an FLT modification with an n-state inverter that is not identity. The use of an identity inverter is not considered to be an FLTed configuration unless mentioned as such. The realization of FIG. 2 allows for an operation to be used in a FLTed mode (the inverter is not identity) and in un-FLTed mode (the inverter is identity).

FIG. 2 may be interpreted as a set of components. In case of programming a processor FIG. 2 may be interpreted as a set of different instructions and data. For instance the operation 210 is a XOR(x,y) operation as used in SHA operating on bytes of 8 bit words for example. One may also apply 16-bits words or 32-bits words. For 8 bits words, the operation 210 is a 256-state operation. Thus an inverter is a reversible 256-state inverter INV256 and corresponding reversing inverter RINV256. In one embodiment the entire inverters may be provided to operation 210. The operation of XORing bytes may be named XOR256. In Matlab for instance that operation is defined by an instruction out=X256 (in1,in2) and executed by filling in the input values of bytes "in1" and "in2." The FLTed version may be defined as outf=XOR256F(in1,in2, INV256, RINV256) wherein the required inverters are provided as parameters. By providing INV256 and RINV256 as identity the un-FLTed version is executed.

The execution of a modification of a computer operation by a rule-based modification of two inputs (i1 and i2) by an inverter rule and a reversing inverter rule is illustrated by a screenshot 1600 of Matlab computer instructions in FIG. 16.

A Hash Based message authentication or HMAC may be required. An HMAC may be keyed. The hash in HMAC may be any of the modern hashing methods. HMAC is defined in an RFC for instance in RFC4868 from https://datatracker.ietf.org/doc/html/rfc4868 which is incorporated herein by reference. The keyed HMAC is defined in rfc2104 in https://www.rfc-editor.org/rfc/rfc2104.html which is incorporated herein by reference. The keyed HMAC is created by bitwise XORing of a secret key with paddings, hashing, concatenating with a message and then hashing and then hashing again. In accordance with an aspect of the present invention a FLTed HMAC may be created by using an FLTed hashing method, by combining a secret key with a padding by an FLTed bitwise XORing, or by both. It is noted that 2 bitwise XORings take place with an outer and an inner padding. One may apply an FLTed XORing to only one to both or to none of the paddings. If no FLT is applied to a padding then the FLT should be applied to at least one of the hashings in the HMAC to create an FLTed HMAC. One is reminded that bitwise XORing of 2 words of k bits can be characterized or described by addition over a finite field $GF(n=2^k)$. One is, again, reminded that XORing two words of k bits is a physical switching operation. FLTing such an operation is physically converting input and output signals of the XORing operation.

In accordance with an aspect of the present invention a protocol that is applied in a secure chipcard or smartcard such as the EMV protocol, is modified with the FLT to create an FLTed chipcard or smartcard or also called Chip and PIN card. EMV is one of the leading companies in chipcard technology. Their specifications include use of encryption (DES, 3DES,AES), public key cryptography (RSA and more recently ECC) and hashing (originally SHA-1) as well as related digital signatures. Another participant in the smartcard business is GlobalPlatform. Cryptographic primitives as recommended by Global Platform were listed in https://globalplatform.org/wp-content/uploads/2019/03/GP_TechnicalNoteCryptoAlgorithmRecs_v1.0_PublicRelease.pdf which is incorporated herein by reference. A cryptographic description of EMV technology is provided in https://eprint.iacr.org/2014/351.pdf which is incorporated herein by reference.

A common thread may be the use of authenticated encryption with associated data (AEAD) and hashing functionality. For instance one finalist is the cipher suite Ascon as downloaded from https://csrc.nist.gov/CSRC/media/Projects/lightweight-cryptography/documents/finalist-round/updated-spec-doc/ascon-spec-final.pdf which is incorporated herein by reference. Different versions or modes are proposed in Ascon. However, all apply bitwise operations on words of bits in encryption as well as hashing. Ascon applies both bitwise XORing and bitwise ANDing of word of bits. As explained earlier, both functions may be represented as $XOR(n=2^k)$ and $AND(n=2^k)$ functions when operated on words of k bits. One may then represent n by for instance its decimal representation and FLT the decimal representation of inputs and outputs by the relevant n-state inverters. For realization the actual inverters are of course represented in its bits form and implemented accordingly. This creates an FLTed Ascon cipher, including FLTed Ascon encryption/decryption and FLTed Ascon hashing which in its un-FLTed form is specified in the NIST published document. Prosed candidate solutions provide different approaches, including a sponge structure as known in Keccak, LFSR constructions, NFSR constructions, permutation functions and the like. Without exception all finalist candidates apply switching operations on words of bits, in general bitwise XORing. Bitwise XORing on words of k bits, as explained earlier may be FLTed with n-state inverters with $n=2^k$, which will increase the security of the proposed Lightweight methods. In the alternative one may apply smaller words of bits or fewer rounds of encryption with FLTed operations to still achieve a similar or even higher level of security with smaller words and/or fewer rounds.

The result of an FLT is that the outcome of the FLTed operation, be it an FLTed encryption, an FLTed hash, an FLTed MAC, an FLTed digital signature, or an FLTed public key operation or any other FLTed cryptographic operation, is entirely different from the un-FLTed operation. That is, if there is a cryptographic operation P with input x that generates y (as $y=P(x)$) then the FLTed operation PF using the same input x will generate yf which is different from y, or $yf=PF(x)$ and $yf \neq y$. In general the intractability of P perpetuates into PF. So if P is cryptographically unbreakable and the FLT is secret than PF is also unbreakable, and likely more so. Accordingly, the FLT improves security.

Increasingly, companies and individuals store data on servers in the Cloud. This may be for capacity reasons. However, more often than not it is for sharing data, either between locations, machines or users. A person may have different computers on different locations and does not want to carry around important data. For that reason, for instance, data is stored in the Cloud and downloaded when needed. Because the stored data is under the responsibility of one party it is easy to apply FLT customized encryption/decryption methods. However, data servers are often managed by a contracting partner and there is no warranty on the security. If data is lost, broken or stolen, even with warranty, the warranty is of course moot. Parties are increasingly aware of their own responsibility on security of remotely stored data. So are contractors who offer customers the opportunity to apply Bring-Your-Own (BYO) cryptography. It is beneficial to customers to customize their BYO cryptography. In that case it is beneficial to apply customized encryption as well as customized authentication to check if data has been modified. In that case FLTed authentication may be applied. Authenticated encryption with associated data (AEAD) may be customized by FLT. Examples of AEADs are AES-GCM as described in FIPS SP 800-38d in https://nvlpubs.nist.gov/nistpubs/Legacy/SP/nistspecialpublication800-38d.pdf which is incorporated herein by reference and ChaCha20 and Poly1305 described in RFC7539 and downloaded from https://datatracker.ietf.org/doc/rfc7539/which is incorporated herein by reference. Both methods have authentication that are not one of the previously described hashing methods. However, both AEADs have authentication (GHASH in AES-GCM and Poly1305 in ChaCha20 that are enabled to be FLTed as described earlier).

Computer or machine cryptography is differently from human cryptography with paper and pencil. One of the distinguishing factors is the amount of computer power both to perform cryptographic operations as well of the incredible amount of computer required to break computer cryptography. Even relatively weak computer cryptography and/or broken cryptographic primitives cannot be processed in a lifetime by a person of ordinary skill or even a group of persons with paper and pencils. Computer cryptography is not merely an order of magnitude out of reach from human computations, it is a multiple of factors out of reach. This to the extent that a human working on the computer cryptographic problem with paper and pencil for a lifetime of 60 years with only breaking to eat and sleep would barely make a dent in the problem.

All above examples have been developed and run in Matlab on a Windows machine. Matlab runs in origin 1.

Figure 12:
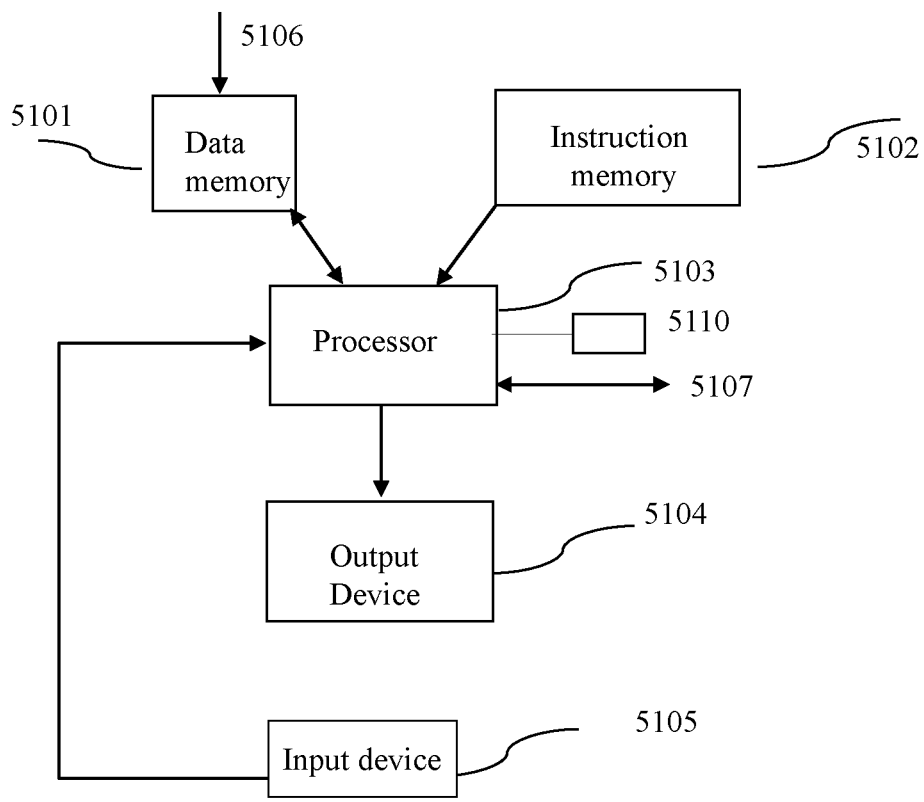
FIG. 12 is a block diagram of a computing device in accordance with an aspect of the present invention.

A system illustrated in FIG. 12 and as described herein is enabled for receiving, processing and generating data. The system is provided with data that can be stored on a memory 5101. Data may be obtained from a sensor or may be provided from a data source. Data may be provided on an input 5106. The processor is also provided or programmed with an instruction set or program executing the methods of the present invention is stored on a memory 5102 and is provided to the processor 5103, which executes the instructions of 5102 to process the data from 5101. Data, such as an image or any other signal resulting from the processor can be outputted on an output device 5104, which may be a display to display data or a loudspeaker to provide an acoustic signal. The processor also has a communication channel 5107 to receive external data from a communication device and to transmit data, for instance to an external device. The system in one embodiment of the present invention has an input device 5105, which may be a keyboard, a mouse, a touch pad or any other device that can generated data to be provided to processor 5103. The processor can be dedicated hardware. However, the processor can also be a CPU or any other computing device that can execute the instructions of 5102, including FPGAs and discrete components. The processor 5103 in some embodiments has integrated or connected to it communication circuitry 5110 with a customized physical interface. A customized interface may be a connector, an antenna, a reader or read/write interface or any other physical interface to transmit and/or receive signals to or from an external device. Accordingly, the system as illustrated in FIG. 12 provides a system for data processing resulting from a sensor or any other data source and is enabled to execute the steps of the methods as provided herein as an aspect of the present invention.

Aspects of the present invention can be advantageously used for and in devices that belong to a controlled community. A controlled community herein means that two devices are instructed, either by locally stored data or from a shared computing device, which cryptographic method to use and how a modified n-state switching function or device is to be determined. Preferably such information is kept confidential between two devices and, if needed, a server. In accordance with an aspect of the present invention, such data is available from a secure server over a secure communication channel.

A computing device herein is a device that contains at least one digital device that generates one or more signals in accordance with at least one switching table. The digital device may be but is not limited to a processor, a controller, a memory or storage device such as RAM, DRAM, Flash memory, ROM, PROM, ePROM, disk drive or any other data storage device, combinational circuitry, integrated circuits, FPGA, PLA and the like. Illustrative examples of a computing device include but are not limited to any computer, a desktop computer, a server computer, a blade computer, a processor, a controller, a laptop computer, a tablet computer, a smartphone, a chip card, a smart card, an RFID, a FPGA, a phone, an opening device such as a FOB, a TV set, a media player. A computing device may be a stand-alone device. A computing device may be part of a system wherein the computing device provides and/or receives and/or processes signals such as data signals.

Figure 13:
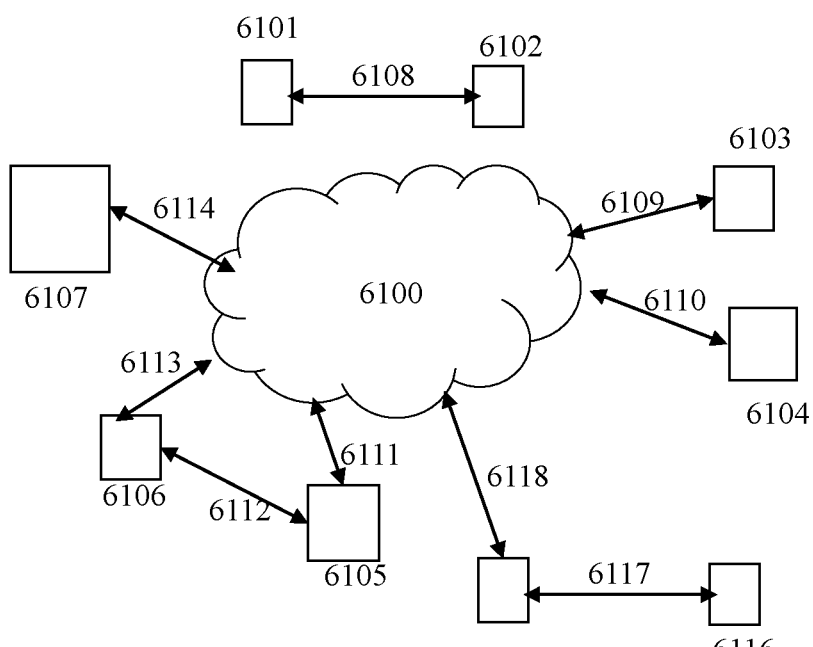
FIG. 13 illustrates network configurations in accordance with various aspects of the present invention.

Several computing device community configurations are illustrated in FIG. 13. FIG. 13 has a communication network 6100. Network 6100 may be a single network such as a wireless or wired network or a combination of networks such as the Internet. The network may be a switched network or a packet based network, a private network or a public network or a virtual private network or any other communication network that enables connection of 2 computing devices and of 3 or more computing devices. In one configuration two computing devices 6101 and 6102 with communication circuitry to transmit, receive or transmit/receive signals are provided. The communication circuitry of 6101 and 6102 can transmit signals over a channel 6108. The channel 6108 is identified as a double arrow. This indicates that the channel is bi-directional, but it does not necessarily mean that 6101 and 6102 do both have to transmit and receive, though they may. For instance 6101 is an opening device or a smartcard or any other transmitting device and 6102 is a computing device that is part of an access mechanism that is being activated by one or more signals from 6101. Device 6101 for instance has cryptographic circuitry that generates opening signals that have to be detected and decrypted by 6102. For that application wherein each device has the appropriate instructions and data stored to complete an authenticated transaction, like opening. In one embodiment of the present invention there is thus only one way transmission by 6101 and receiving of data by 6102. The channel is a direct channel, like a wireless or wired or Near Field Communication (NFC) channel, a USB connection, a Bluetooth connection or any other direct connection. For the transaction itself no other channel is required. The devices 6101 and 6102 may have other communication capabilities, such as equipment to connect to network 6100, but are not shown. Devices 6101 and 6102 have different modified n-state switching functions stored on local memory. These may be updated from time to time.

Devices 6101 and 6102 may also perform some mutual authentication or for instance key exchange. In that case 6108 is a dual use (send and receive) channel and the devices 6101 and 6102 both have send a receive equipment. The same applies to devices 6103, 6104, 6105, 6106, 6107 and 6115 and 6116 and communication channels 6109, 6110, 6117, 6118, 6111, 6112, 6113 and 6114.

Computing devices 6103 and 6104 communicate with each other via channels 6108 and 6110 via network 6100. Cryptographic n-state switching functions may be stored locally and may be provided by secure server 6107 which is connected to network 6100 via channel 6114.

Device 6115 and 6116 communicate directly via a channel 6117. Device 6115 is also able to communicate with secure server 6107 via channel 6114. Devices 6105 and 6106 can directly communicate with each other over channel 6112 and with server 6107 via 6100 over channels 6111 and 6113, respectively. As needed 6105 and 6106 can also communicate via 6111 and 6113 via network 6100. Any of the communication channels, even though illustrated by double sided arrows may be single direction as dictated by practical circumstances.

For instance devices 6115 and 6116 communicate directly via 6112 to complete a transaction, such as withdrawing money from an ATM 6115 machine with a smartcard 6116 and 6115 uses 6118 for verification from 6107 via network 6100. Assume 6116 to be a chipcard or smartcard which is connected to 6115. During an established connection 6116 can be updated with additional or replacement modified n-state switching functions.

Computing devices can be mobile or fixed. For instance 6103 and 6104 are two computing devices that are connected to the Internet, for instance 6103 is a computer, such as a PC, a smartphone, a tablet and 6104 for placing an order and 6104 is a server for processing the order. For instance 6103 is a computing device which may be a server, a PC, a smartphone, a tablet and the like to monitor and/or control an IoT (Internet of Things) device 6104 with a processor such as a camera, a medical device, a security device such as a lock or fire monitor, a thermostat, an appliance, a vehicle or any other IoT device.

One threat to the security of certain methods in cryptography is the expected use of quantum computers with for instance the Shor algorithm to attack certain hard to solve problems. The use of the Lab-transform may harden these knowns methods, especially for n large, for instance for n larger than 70, there are about 10100 different inverters. At that number, the possible variations may be too great to be successfully attacked in a reasonable time. Certainly, if one wants to harden exchanged messages that are currently being intercepted but still resist successful cryptanalysis, against future attacks the use of the Lab-transform is helpful.

It is emphasized and repeated and made explicit that the operations described herein, even when using terms such as addition and multiplication, are machine switching operations determined by switching tables, which are often called logic tables or truth tables. For descriptive purposes symbols such as 0, 1, 2, ..., etc are used. These symbols are merely representations of actual signals, which may be words or combinations of binary signals. Mostly, 0s and 1s do not actually exist inside a computer, but only LOW and HIGH signals which are represented by 0 and 1. The actual value of a signal represented by a 0 may be a range, depending on the technology that is used to realize a switching circuit that implements a switching table. Old technology is for instance relays switching, wherein a 0 may be represented by very large impedance of a circuit while a 1 is represented by a very low impedance. In TTL technology 7400 GHz series the HIGH level derived from a power source is between 1.65-3.6 Volt while ECL is around =5Volt and CMOS may be 3.3 Volt or 5 Volt. In a 256-state machine a single 256-element may be represented by 8 bits.

Suppose that HIGH is 5 Volt and LOW is 0.5 Volt and/or a range around it for instance of + or −1 Volt. The signal represented by symbol 200 would then be, for instance, in binary form [1 1 0 0 1 0 0 0] and in actual signal form (including minor disturbances [4.8 4.9 0.5 0.5 4.9 0.4 0.5 0.4 0.4]. The representation in real signal values is not very helpful and even the binary representation is not easy to grasp. Because 0 and 1 are merely labels other labels may be used also for instance a LOW signal may be represented as R(ed) and a HIGH signal as L(eft). The 256-state signal represented by 200 may also be represented as [R R L L R L L L] which again is not helpful in description, design and/or analysis of switching devices. The binary AND switching device can be represented by its switching table or by the symbol *, meaning a mod-2 multiplication. If one continues to use symbols L and R then the AND function produces Z as a result of inputs X and Y and represented as Z=X*Y. It is not easy to understand if one keeps on using state representation L and R: X*L=L no matter what X is, and R*R=R. Clearly, the use of numerical state representation 0 and 1 is much easier to understand. This sometimes leads to the misunderstanding that an AND circuit performs a multiplication, which is absolutely not the case. In actual signals one may have that with signals 0.55 Volt and 4.96 Volt at inputs of an AND circuit generates (0.55 AND 4.96) 0.56 Volt. This is the proper behavior of an AND device, but no multiplication is performed as 0.55 times 4.96 is definitely not 0.56 Volt.

The trick is for humans to "pretend" that an AND is a modulo-2 multiplication and an XOR device is a modulo-2 addition during a design of a circuit such as a ripple adder. A device such as a ripple adder, performs switching operations in accordance with the switching tables of the XOR and AND switching tables and generates a series of binary signals each in a range between 0.5 Volt and 5 Volt for instance. Some conversion device, such as Nixie tubes, LEDS, or print/display character conversions provides a visible signal that can be interpreted by a human as a numerical character. Up till that display, no actual symbol exists in a switching machine.

Switching devices such as XOR and AND have attractive properties that make design of devices wherein XOR and AND are components much easier. For instance XOR and AND are commutative, which assures that it does not matter on which input one places an X signal or a Y signal. Furthermore, the switching devices are associative. That is, if one has to perform multiple AND or XOR operations, it does not matter in which order these are performed, if they have no intervening operations. The AND and XOR operations distribute which makes combination of signals easier. All those switching operations have equivalent meaning in mathematical operations, making design of circuits described in mathematical terms easier.

Accordingly, whenever terms like addition, multiplication or other arithmetical terms or values are used, they are explicitly and fully intended to cover actual physical switching or processing circuitry.

Polynomial arithmetic is often used to describe certain circuitry. No polynomials exist in a circuit. A polynomial is a series of monomials (usually as a power of one or more variables) with coefficients. For a computing machine/switching device, a polynomial represents a series of signals, represented by coefficients and wherein a location of a coefficient (its signals) in a series of signals is represented by the power of the corresponding monomial. The significance of polynomial representation is in its description of polynomial multiplication, wherein a "location" of a product of terms depends on the location of the terms in the polynomial. The term "polynomial" is an indication that the operation of signals is position dependent. In case of "polynomial multiplication" the combination of signals is performed following rules of polynomial multiplication. All operations herein are switching operations.

It is a specific aspect of the present invention that the methods and systems provided herein are to be implemented or realized on a processor or computer system with at least a memory and communication circuitry to communicate with another computer or processor. For the computer or processor to physically be able to perform instructions in accordance with one or more aspects of the present invention it needs to have physical circuitry to perform the required n-state switching functions. This is not trivial. Prior to the inventor teaching the required n-state Lab-transformed or FLTed switching functions, these functions and devices did not exist. There is no standard or routine computer function that performs the Lab-transform (FLT) or that has circuitry or instructions that implement the addition and multiplication over an alternate finite field. Also finite field operations with the zero element not being 0 and the one element not being 1 were not known prior to this being taught by the inventor.

A system illustrated in FIG. 12 and as described herein is enabled for receiving, processing and generating data. The system is provided with data that can be stored on a memory 5101. Data may be obtained from a sensor or may be provided from a data source. Data may be provided on an input 5106. The processor is also provided or programmed with an instruction set or program executing the methods of the present invention is stored on a memory 5102 and is provided to the processor 5103, which executes the instructions of 5102 to process the data from 5101. Data, such as an image or any other signal resulting from the processor can be outputted on an output device 5104, which may be a display to display data or a loudspeaker to provide an acoustic signal. The processor also has a communication channel 5107 to receive external data from a communication device and to transmit data, for instance to an external device. The system in one embodiment of the present invention has an input device 5105, which may be a keyboard, a mouse, a touch pad or any other device that can generated data to be provided to processor 5103. The processor can be dedicated hardware. However, the processor can also be a CPU or any other computing device that can execute the instructions of 5102, including FPGAs and discrete components. The processor 5103 in some embodiments has integrated or connected to it communication circuitry 5110 with a customized physical interface. A customized interface may be a connector, an antenna, a reader or read/write interface or any other physical interface to transmit and/or receive signals to or from an external device. Accordingly, the system as illustrated in FIG. 12 provides a system for data processing resulting from a sensor or any other data source and is enabled to execute the steps of the methods as provided herein as an aspect of the present invention.

Aspects of the present invention can be advantageously used for and in devices that belong to a controlled community. A controlled community herein means that two devices are instructed, either by locally stored data or from a shared computing device, which cryptographic method to use and how a modified n-state switching function or device is to be determined. Preferably such information is kept confidential between two devices and, if needed, a server. In accordance with an aspect of the present invention, such data is available from a secure server over a secure communication channel. A computing device herein is a device that contains at least one digital device that generates one or more signals in accordance with at least one switching table. The digital device may be but is not limited to a processor, a controller, a memory or storage device such as RAM, DRAM, Flash memory, ROM, PROM, ePROM, disk drive or any other data storage device, combinational circuitry, integrated circuits, FPGA, PLA and the like. Illustrative examples of a computing device include but are not limited to any computer, a desktop computer, a server computer, a blade computer, a processor, a controller, a laptop computer, a tablet computer, a smartphone, a chip card, a smart card, an RFID, a FPGA, a phone, an opening device such as a FOB, a TV set, a media player. A computing device may be a stand-alone device. A computing device may be part of a system wherein the computing device provides and/or receives and/or processes signals such as data signals . . .

Standards include but are not limited to the following published standards or updated versions thereof: SP 800-67, Revision 1, Recommendation for the Triple Data Encryption Algorithm (TDEA) Block Cipher, 2012; FIPS PUB 46-3 Data Encryption Standard (DES), FIPS PUB 180-4 Secure Hash Standard (SHS) 2015 defines the SHA family; FIPS PUB 186-4 Digital Signature Standard (DSS) 2015; FIPS PUB 202 SHA-3 Standard: Permutation-Based Hash and Extendable-Output Functions, 2015; FIPS PUB 198-1, The Keyed-Hash Message Authentication Code (HMAC), 2008; FIPS PUB 197-Advanced Encryption Standard, (AES), 2001; RSA Laboratories PKCS #1 v2.2: RSA Cryptography Standard, Oct. 27, 2012; RSA Laboratories PKCS #3: Diffie-Hellman Key Agreement Standard Revised Nov. 1, 1993; The Elliptic Curve Digital Signature Algorithm (ECDSA), Johnson et al. 2001, Certicom Corporation 2001; Standards For Efficient Cryptography SEC 1: Elliptic Curve Cryptography, version 2, Certicom Research, 2009; OpenPGP Message Format, Memo, Callas et al., 2007, RFC4880, downloaded from https://tools.ietf.org/html/rfc4880; which are all incorporated herein by reference.

The Lab-transform as provided herein modifies existing cryptographic methods and apparatus and/or provides novel cryptographic methods and apparatus. It is believed that underlying approaches of cryptography are known to one of ordinary skill and well documented in technical literature and standards. One book that describes basic symmetric and asymmetric cryptographic approaches is Understanding Cryptography, by Paar et al., Springer-Verlag, Berlin 2010, which is incorporated herein by reference.

A Lab-transformed n-state switching table has a similar meaning as a binary switching table (such as XOR, AND, NAND, etc.) or of a Karnaugh switching table or map which are realized in a circuit that is a memory circuit, a combinational circuit or any other circuit that processes signals. Relationship between realization of digital devices (realization) and functional description of these devices (implementation) is explained in Digital System Implementation by Gerrit A. Blaauw, Prentice Hall, Englewood Cliffs, NJ, 1973 which is incorporated herein by reference.

The terms "2-input/output" and "2-input/single output" are used herein. This indicates a minimum configuration wherein a device has at least 2 inputs and one output and is characterized at least by an n by n matrix wherein one index (for instance row index) represents a state of first input and another index (for instance column index) represents a state of a second input and a content of the matrix defined by the two indices defines a state of the output.

Cryptography devices are used at signal transmitting and signal receiving devices. In certain cases the transmitting devices perform encryption and the receiving devices perform decryption. In other cases both side devices perform the same operation such as hashing of a message. In other cases transmitting and receiving devices perform complementary operations, such as in some public key operations. The herein provided embodiments expressly include a transmitting side cryptographic device and a receiving side cryptographic side.

It is known that a digital circuit can be realized as a Look-up Table or addressable Memory. That is: based on input signals an output line is activated or a memory address is read that provides the related signal representing the required output state. A digital circuit can also be realized as a combinational circuit, for instance built from transistors or CMOS gates or other components. Functionally it does not matter what the realization is as memory and combinational circuit both switch in accordance with the switching table. Physically it may make a difference, for instance in switching speed, required support circuitry, die size, power consumption, etc. are aspects that may be considered.

It is emphasized that a machine like a computer or a processor or a digital device does not "magically" perform an operation determined by a switching table. The machine requires physical circuitry that realizes or implements the desired switching table. This applies to binary as well as to non-binary switching tables. For instance, a computing device that does not have a circuit that realizes an XOR function is unable to perform an XOR function. The XOR circuit may be realized in different forms, as a memory or any other look-up table device, as a combinational circuit and/or as a circuit composed of for instance NAND circuits. No matter how, there must be an identifiable device with two inputs and an output that physically operates in accordance with the XOR table. If such a circuit does not exist in a machine, the machine is unable to generate an output signal from input signals in accordance with a switching table, in the above example the XOR switching table. The same reasoning applies to other binary and non-binary switching tables.

A cryptographic device and its corresponding cryptographic operation may be described as having several functional units. These units may perform bitwise XOR operations, bitwise AND operations, bitwise OR operations, NOT operation of a word of bits, discrete additions and multiplications for instance modulo-n or modulo a polynomial, elliptic curve operations, permutations and the like. All these operations may be represented as a formulistic or mathematics like expression. However, all these operations represent actual circuits and hardware. A computer does not "just" perform a XOR, because a program tells it to do so. There is an actual XOR circuit in the computer that performs this operation. For description it is more convenient for understanding to use the formulistic representation, with the underlying understanding that an actual device which may be called a functional unit exists and performs the function. For instance one may consider an addition over GF ($n=2^k$) a functional unit. One of ordinary skill understands that this actually represents a functional unit using k XOR operations with k XOR circuits or at least one or more XOR circuits. In that sense the functional unit Ch(x,y,z) as defined in FIPS 180-4 is an actual bitwise switching device using AND, XOR and NOT devices. For convenience this other operation may be referred to in their representative and sometimes mathematical appearing name. However, these are all hardware realized circuits. This is clearly explained in Blaauw's Digital System Implementation, Prentice-Hall, Englewood Cliffs, NJ, 1976 where a functional unit may be represented by an APL expression, but is actually a real circuit.

Hashing as described herein is strictly a computer based operation (not a mental one) that has as input data such as a message, a document and/or a file and generates data of a predefined length that depends on the input data. The input data may initially be presented as binary data, text, ASCII data, audio data, video data or any other form of data. The hashing or processing generates output of a certain length (for instance 128 or 256 bit equivalence). Preferably input data that is different will generate different output data or hash or hash value or message digest. The generated hash may be considered to be (hopefully) a unique fingerprint of the input data. For different reasons the hash may not be unique, which is called a collision. A good hash preferably provides no or extremely difficult to construct collisions. Furthermore, a good hash is difficult to apply to reconstruct the message it is derived from and preferably a minor change in the data provides a substantial change in the hash, which may be called the avalanche effect. The literature and published implementations of hashing methods and even standards or RFCs apply different data formats to explain the dataflow inside a hashing method. Used formats are ASCII format, hexadecimal format, binary format and unsigned integer format for instance. Online hashing applications often accept ASCII standard text format and deliver a hexadecimal format hash. One is reminded that ultimately a processor as currently available operates on bits, commonly as words of bits. The other formats are mere representations and as such do not physically exist inside a processor.

Aspects of the present invention teach important effects of modifying a hashing method which is a computer based operation. The modification, such as the FLT, increases the security of the hashing, for instance by preventing known collisions as in MD5. Another aspect is making the generated hash more unpredictable. This aspect may be applied in generating keywords or passwords. Because the keyword (or hash) is kept secret as well the data where it is generated from, it is extremely difficult to predict what the keyword will be. In principle one may use a hashing method that is considered insecure or border-line insecure and modify the method by secret FLT or otherwise secret modification and use a secret (or even a public) data input. The keyword or keyword that is derived from the secret hash is unpublished and may reveal (if that is the correct term) itself only in its use in an encryption. If the encryption method is secure then it will be very difficult to recreate the keyword or password.

Security of the methods provided herein may depend on how well the secrecy of the modifications such as FLTs are maintained. Apart from actually stealing modification data, the modifications itself (without side-channel attacks) do not by themselves reveal the use of modifications. The use of a modification is only revealed when a message is published a hashing method is required and the hash is provided. If the hash is regenerated using the required method and a different hash is generated then that is an indication of an FLT or other modification. A purpose may be to prevent unauthorized parties to authenticate messages. For instance a party may publish several messages of which only one is correct, and may only be authenticated with a secret FLTed hash. Other uses, for instance to counter a man-in-the-middle attack are fully contemplated.

Clearly, a single person in control of hashing on one or more computing machines is in full control of what and how an FLT or modification is used. It may be applied to generate keywords for encryption or to have a private hashing to check if server (in-Cloud) stored data has been modified. The more people are involved, the more risk is introduced. In that case one may "hide" the cryptographic data as is currently applied in what is called "confidential computing" in what is called a Trusted Execution Environment (TEE). To further protect security one may apply FLTs and modifications of sufficient security.

As example FLTs have been applied on bytes or 256-state symbol representation of 8 bits. Theoretically there are 256! or about 10500 different 256-state reversible inverters. This includes identity ([1 2 3 . . . 255 256] in Matlab origin−1), which is excluded from being considered as an FLT inverter, unless explicitly included. Furthermore, different inverters may generate the same FLTed function or even an unmodified function. The inventor has run a Matlab program to generate over 100,000 different 256-state inverters to be applied to FLT a standard addition over GF(256). No duplications or unacceptable FLTs were found. The universe of FLTs is just too great for n−256. Without reservation it is claimed that at least 10200 different FLTs may be generated for n=256. In another program 10,000 different 256-states FLTs were generated wherein the FLTed function had fewer than 150 symbols in common in their switching table. These common states were almost universally distributed over the table. This is a factor 0.0023 and is insignificant in hashing.

In order to maintain a high level of security, one should limit the repeat use of the same modification. This may be achieved by changing the inverter of an FLT. One may also use different inverters for an FLT. SHA-256 operates on a word of 32-bits. One may split this up in 4 8-bit words and FLT each word with the same inverter. One may also use 4 different 256-state inverters.

One may also use different sized inverters. For instance one may split the 32-bit word in 3 9-bit words and one 5-bit word. A 9-bit word is a 512-state word and there are about 101166 different 512-state words. The last word of 5-bits is a 32-state symbol. Even a 32-state symbol has about 1035 reversible 32-state inverters. The advantage of n>256 is an immense increase in security. However, n=256 provides already great security. The advantage of n smaller than 256 like n=128 or n=64 provides a smaller requirement of storage, while still having significant security.

If one desires, a modification like the FLT may be implemented for one round, for different rounds, for all rounds, with different FLTs for different rounds, with FLTs for different functions and/or operations. The increased security has to be balanced against increased complexity of configuration management. However, the FLT approach as provided herein allows and enables many possible configurations that are fully contemplated.

In accordance with another aspect of the present invention a hashing method may be modified by applying an n-state inverter, which is preferably an n-state reversible inverter. In one embodiment an input stream of data is converted in its equivalent 256-state symbol (byte) value and is inverted with the n-state inverter before being processed by the hashing method which may or may not apply an FLT. Computationally the use of 256-state inverters is beneficial because of formatting issues. However, other formats may be applied. For instance a series of 80 data bytes may be split into 8 words of 10 bits, each word being inverted with a 1024-state inverter, creating 8 new 10 bit words. One may reconstitute the byte values if that is convenient for processing or process the 80 new bits. Similarly, one may invert a hash before it is released by a program. A 256-bit hash has 32 bytes. One may invert these bytes with a 256-state inverter. Or use a 1024-state inverter for 250 bits in the hash and use a 64-state inverter for the remaining 6 bits or leave the 6 bits un-inverted. This can easily be done while for instance selecting the first 120 bits and last 130 bits for 1024-state inversion and leave the middle bits unchanged and then present the inverted sequence in hexa-decimal format.

One may also modify or invert intermediate states of a hashing method by exchanging data or by inverting data. It was already shown that this is highly effective in changing a generating a hash. This is related to the avalanche effect, wherein a small change presumably creates a huge change. This changes the flow of data and may introduce flaws that cause insecurity. This would be acceptable for generating keywords, wherein all data is held as private.

The herein provided modifications may be applied in different applications. One application is the storage of secure data, such as account numbers, user names and passwords. When these data are stolen a thief may use known hashing methods to break these hashes in finding pre-images for instance, By using unique FLTs in the hashing method one may prevent successful attacks, as no rainbow tables of these FLTs exist. In that case it may be beneficial to use the more complicated FLTs, for instance with multiple inverters, as disclosed above.

In general the hashing standards may include straightforward single function bitwise operations such as bitwise XOR. The NIST FIPS 180-4 document provides several multi-function bitwise operations. They include (4.1) in FIPS 180-4: $Ch(x,y,z)=(x \wedge y) \oplus (\neg x \wedge z)$; $Parity(x,y,z)=x \oplus y \oplus z$; $Maj(x,y,z)=(x \wedge y) \oplus (x \wedge z) \oplus (y \wedge z)$. Also used are addition modulo-$2^w$. In certain cases multiplication mod-$2^w$ may be used. For all these operations inputs are words of bits and output is a word of bits. It has already been explained that words may have a size of 32-bits, which may be inconvenient for applying tables as used herein. One explicit aspect of the present invention is that any bitwise operation has at least two words of bits as input. In accordance with an aspect of the present invention a word of n bits may be split up in at least 2 smaller words of bits. These smaller bitsized words may be inverted with the required inverter or reversing inverter and then re-assembled in a word of n bits again. For instance a word of 32-bit may be split up in 4 words of 8-bits (or 256-state). If the word is an input word, each 8-bit word is inverted with a 256-state inverter and the inverted words are recombined into a 32-bit word to perform the bitwise operation. The result is then inverted accordingly. In the alternative one may also follow a complete path of FLT of 4 FLTed 256-state functions. The 4 results are recombined into a 32-bit word without further need for inversion (as inversion was already done in the FLT). One test for this working is by using the identity inverter. Using the identity inverter on the data and the result should be identical to not using an inverter.

There are many documented and published hashing applications with published specification. 1) Among the most popular are SHA-2 defined message digests, as published in FIPS 180-4 available from https://doi.org/10.6028/NIST.FIPS.180-4. It defines 7 hash algorithms, including SHA-1, SHA-256, SHA-384, SHA-512, etc. 2) SHA-3 published and available from https://nvlpubs.nist.gov/nistpubs/FIPS/NIST.FIPS.202.pdf. 3) MD5 Message Digest published as rfc1321 and a specification is available at https://www.ietf.org/rfc/rfc1321.txt. 4) MD6 as proposed as NIST SHA-3 candidate available from http://people.csail.mit.edu/rivest/md6_report.pdf. 5) CubeHash, submitted as a SHA-3 candidate. It has been tweaked several times and specification and documentation are available from http://cubehash.cr.yp.to/index.html. 6) BLAKE was also a SHA-3 candidate and went through different upgrades. It is currently specified as BLAKE2 (in flavors BLAKE2b and BLAKE2s) and is specified as RFC7693 and is available from https://datatracker.ietf.org/doc/html/rfc7693 and a version Blake3 is specified in specification available at https://github.com/BLAKE3-team/BLAKE3-specs/blob/master/blake3.pdf. All of the descriptions and specifications as found on the cited URLs and sub-pages are incorporated herein by reference.

An overview of SHA-3 candidates in the related NIST competition is provided on SHA-3 Zoo at https://ehash.iaik.tugraz.at/wiki/The_SHA-3_Zoo. The winner of the completion was Keccak now published as SHA-3. All candidates to the SHA-3 competition are cited on this website and have URLs referring to their description. Anyone of them using bitwise binary operations may be modified as described herein above. All pages and sub-pages and reference pages of https://ehash.iaik.tugraz.at/wiki/The_SHA-3_Zoo are incorporated herein by reference, as any of the mentioned hashing methods using bitwise operations may be included in generating a keyword, be it in modified or unmodified form as long as one modified hashing method is included. The term SHA-3 herein covers all configurations of SHA-3 as defined in FIPS 202, including SHA-3-224, SHA3-256, SHA3-384 and SHA3-512.

Standards, including hashing methods and application standards, as mentioned herein are largely a fixation of a state-of-the-art at that moment. Certain candidates that were rejected at standard competitions such as SHA-3 have evolved while a selected solution as standard has been fixated by the need of keeping a stable standard for at least a while. This may have as a consequence that candidates that did not win to become a cryptographic standard may after years of development have a performance that is faster and more secure than the selected standard. Modification using n-state inverters as disclosed herein may help in improving standard methods that have been bypassed in security. The disclosed methods herein may also be applied to further improve security of already highly secure hashing methods. The initial values are generally 32-bit or 64-bit words. MD5 for instance uses 4 bytes or 32-bit initial values.

One may apply an n-state inverter to these initial values. For instance a 32-bit word is 4 bytes. Preferably one should use an n-state inverter that does not significantly biases the outcome of the inversion to a certain outcome. This is also the reason that one preferably should stick to reversible inverters which have a uniform distribution of symbols. Hashing is a one-way operation and in that sense one may apply non-reversible inverters. However, such inverters necessarily introduce a bias because at least one symbol repeats in the inversion. Use of non-reversible inverters is contemplated, but preferably should be used on a very limited scale.

Many of the herein modified hashing methods use initial hash values or hash constants. One may leave these initial values unchanged. However, certainly in generating passwords, at least changing the order of constants and initial values may be helpful in generating different hashes and thus passwords.

All aspects of the present inventions are explicitly directed to machine cryptography, which is the processing of signals by a machine processor with discrete electronic components of which certain components are kept secret to the outside world. The circuits or functions as recited herein may appear to be mathematical. This is because functional aspects of computer circuits are often described by terms that are commonly used in human conversations. It has been shown herein that the actual circuits described by these terms are in effect deterministic physical devices that switch between levels or states. For instance, a device that performs bitwise XORing of 8-bit words, may be described as an addition over GF(256). However, the device itself, without any translation of inputs or outputs to direct human interpretation, is merely a XORing device and nothing else. The realization of discrete circuits to perform switching operations that may be interpreted as an arithmetical operation is generally called 'machine arithmetic' which is an engineering discipline to design computing machinery. The machine cryptography aspects are emphasized by for instance the Ch(x,y,z) function in SHA-256, which is nothing but a mixing of signals, without further arithmetical interpretation. Another example is the use of permutations in SHA-3 wherein confusion is created by reordering sequences of binary signals. The claimed aspects of the present invention are specifically directed to unpredictable but repeatable and designed mixing and/or confusing and/or modifying of signals and compressing the signals into an unpredictable output by a machine.

The aspects of the present invention are useful, extremely useful in effect. It allows to conduct private and secure business over the Internet and important economic infrastructure, while preventing increasing and more sophisticated attacks by hackers, data-thieves and other malfeasants that threaten the usefulness of the Internet.

The purpose of creating a hash is to create a processable binary electrical or optical signal. None of the aspects as disclosed herein can be performed in the mind by a human or performed by a human with paper and pencil or even multiple humans with paper and pencil. Or would be impractical. There are several reasons for that. A first reason is the avalanche effect. Even a minor error will cause a tremendous change in the output result, which makes manual execution practically impossible and infeasible, even if sufficient speed could be applies. However, manual speed of a hash even at highest possible manual speed is impractical. A Youtube Video at https://youtu.be/y3dqhixzGVo by Ken Shirriff shows a manual performance of a single round of SHA256 on a fixed length message (of less than 512 bits). This single round on merely one block of data already takes 17 minutes. During this round it is clear that several errors are corrected that could have perpetuated. Furthermore, Mr. Shirriff does not take a break. The total SHA256 includes 64 rounds. That means that at that tempo a manual execution of SHA256 without any FLTs would take at least 18 hours of work without a break and without making even a single error. Hashing of larger files for instance preferably greater than 10 kB, more preferable greater than 100 KB, even more preferable greater than 1 MB and even more preferable greater than 20 MB, rather than short strings may take orders of magnitude longer. Furthermore, SHA256 uses constants that have to be tracked and entered. Thus it may take weeks or months if not years to compute manually a hash of a larger file. Accordingly, it is completely impractical to manually perform the steps of hashing, be it modified or not. Furthermore, a human does not generate an electrical or optical signal.

On top of that, security of hashing is created by it being infeasible to create either a collision or a preimage from a known message and its hash, even with an advanced computer system. If it is difficult or time consuming and impractical to manually compute a hash, it is completely impossible to attack a secure hash manually. This is especially the case for aspects of the present invention wherein an attacker has to attempt possible modifications, greater than 10100 for n=256. At this time no reasonable, feasible or otherwise functional manual and/or computer attacks are available to successfully attack the modified hashing as provided herein within a time frame of less than 100 years and most likely within the timeframe of the existence of the universe, even if a computer is enabled to perform more than 1020 hashes per second, which currently no computer can do.

In illustrative examples herein a binary word of 32-bits may be split into 4 words of 8 bits and then be inverted. The output word in a corresponding position in an output 32-bit word is then reversed inverted. This establishes an FLT for a bitwise operation on for instance 8 bit words. One should preferably maintain through a round of operations the order of words. Bits in a selected word do not have to be neighboring bits. Selecting non-neighboring bits has the effect of an additional permutation and adds to unpredictability. In case of splitting n bits in two or more words, only one or more than one word may be inverted While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention.

The invention claimed is:

1. A computing device to process message data and having a transmission channel connected to another computing device, comprising:
   a memory enabled to hold processor instructions;
   a processor enabled to retrieve instructions from the memory, the instructions enable the processor to perform steps including:
   computing a hash value from the message data, wherein the computing includes a transformed n-state computer operation that is a transformation of an n-state computer operation, the n-state transformed computer operation having a first input enabled to receive a first n-state data element and a second input enabled to receive a second n-state data element and an output enabled to generate an n-state output data element with n being an integer greater than 2, the transformed n-state computer operation being created from the n-state operation by a first input of the n-state computer operation having a first n-state inverter, a second input of the n-state computer operation of the n-state computer operation having a second n-state inverter and an output of the n-state computer operation having an output n-state inverter, none of the n-state inverters being identity;
   generating the hash value based on one or more n-state data elements derived from the message data, processed by the transformed n-state computer operation and generated on the output of the transformed n-state computer operation; and
   transmitting by the computing device over the communication channel connected to the another computing device at least one of the hash value and the data.

2. The computing device of claim 1, further comprising:
   the first and second n-state inverters being identical and reversible and the output n-state inverter being a reversing inverter of the first n-state inverter that is reversible, wherein the first and output n-state inverters in combination establish identity.

3. The computing device of claim 2, wherein:
   n is $2^k$ ($2^k$) with k an integer greater than 2, and the n-state computer operation is selected from the group of computer operations consisting of bitwise XOR operations, bitwise AND, bitwise OR operations, bitwise NAND operations, bitwise NOR operations and bitwise EQUAL operations, each on words of at least 2 bits.

4. The computing device of claim 2, wherein:
   the n-state computer operation is an addition modulo-$2^w$ with w an integer greater than 2.

5. The computing device of claim 2, wherein the computing of the hash value is performed with a dataflow in accordance with a hashing method selected from the group consisting of SHA-1, SHA-224, SHA-256, SHA-384, SHA-512 and MD5.

6. The computing device of claim 2, wherein the hash value and the data are transmitted to the another computing device and the another computing device computes the hash value based on the transformed n-state computer operation from the received data.

7. The computing device of claim 2, wherein the processing of n-state input data includes implementing the n-state computer operation by a stored n by n switching table.

8. The computing device of claim 1, wherein the data is transmitted to the another computing device and is processed by the another computing device with the transformed n-state computer operation to generate a password based on the hash value computed by the another computing device for an encryption of a message transmitted between the computing device and the another computing device.

9. The computing device of claim 1, wherein
the n-state computer operation is a bitwise operation on words of k bits with k an integer greater than 2 and the n-state computer operation is part of a computer operation on q bits with q greater than k.

10. The computing device of claim 1, wherein the hash value is part of a digital signature.

11. A method, comprising:
computing by a processor in a computing device of a hash value from message data, wherein the computing includes a transformed n-state computer operation which is a transformation of an n-state computer operation, the n-state computer operation having a first input enabled to receive a first n-state data element and a second input enabled to receive a second n-state data element and an output enabled to generate an n-state output data element with n being an integer greater than 2, the transformed n-state computer operation being created from the n-state operation with a first input of the n-state computer operation having a first n-state inverter, a second input of the n-state computer operation of the n-state computer operation having a second n-state inverter and an output having an output n-state inverter, wherein an n-state output element of the transformed n-state computer operation is provided on an output of the output n-state inverter and none of the n-state inverters being identity; and
transmitting by the computing device over a communication channel connected to the computing device at least one of the hash value and the data to another computer device.

12. The method of claim 11, further comprising:
the first and second n-state inverters are identical and reversible and the output n-state inverter being a reversing inverter of the first n-state inverter, wherein the first and output n-state inverters in combination establish identity.

13. The method of claim 12, wherein:
n is $2^k$ (2^k) with k an integer greater than 2, and the n-state computer operation is selected from the group of computer operations consisting of bitwise XOR operations, bitwise AND, bitwise OR operations, bitwise NAND operations, bitwise NOR operations and bitwise EQUAL operations, each on words of at least 2 bits.

14. The method of claim 12, wherein:
the n-state computer operation is an addition modulo-$2^w$ with w an integer greater than 2.

15. The method of claim 12, wherein the computing of the hash value is performed with a dataflow in accordance with a hashing method selected from the group consisting of SHA-1, SHA-224, SHA-256, SHA-384, SHA-512, MD5, SHA-3-224, SHA3-256, SHA3-384 and SHA3-512.

16. The method of claim 12, wherein the hash value is part of a digital signature.

17. The method of claim 11, wherein the hash value and the data are transmitted to the another computing device and the another computing device computes the hash value based on the transformed n-state computer operation from the received data.

18. The method of claim 11, wherein the processing of n-state input data includes implementing the transformed n-state computer operation by a stored n by n switching table.

19. The method of claim 11, wherein the n-state computer operation is a bitwise operation on words of k bits with k an integer greater than 2 and the n-state computer operation is part of a computer operation on q bits with q greater than k.

* * * * *